United States Patent
Ohsawa

(10) Patent No.: US 6,622,360 B2
(45) Date of Patent: Sep. 23, 2003

(54) ROLLER TURRET INCLUDING ROLLERS MOUNTED ON SUPPORT PORTIONS OF ROLLER SHAFTS, WHICH ARE ECCENTRIC WITH RESPECT TO STUD PORTIONS FIXED IN HOLES IN TURRET BODY

(75) Inventor: Yoshihisa Ohsawa, Aichi-ken (JP)

(73) Assignee: Takahiro Engineering Works Ltd., Nagoya (JP)

( * ) Notice: Subject to any disclaimer, the term of this patent is extended or adjusted under 35 U.S.C. 154(b) by 0 days.

(21) Appl. No.: 09/895,405

(22) Filed: Jul. 2, 2001

(65) Prior Publication Data

US 2001/0034931 A1 Nov. 1, 2001

Related U.S. Application Data

(62) Division of application No. 09/399,724, filed on Sep. 20, 1999, now Pat. No. 6,279,219.

(30) Foreign Application Priority Data

Sep. 24, 1998 (JP) .......................................... 10-269263

(51) Int. Cl.⁷ ................................................. B23B 3/16
(52) U.S. Cl. .......................... 29/42; 29/35.5; 29/48.5 R
(58) Field of Search ............................ 28/35.5, 407.01, 28/705, 460, 428, 434, 48.5 R, 42, 47; 74/813 R, 569, 815, 84 R, 826; 156/91

(56) References Cited

U.S. PATENT DOCUMENTS 3,456,529 A    7/1969  Petroff
3,896,689 A    7/1975  Catin
4,541,297 A *  9/1985  Fujita ......................... 74/424.6
4,944,198 A    7/1990  Natale et al.
5,097,718 A    3/1992  Sahara

FOREIGN PATENT DOCUMENTS

EP         0123456 A2   1/2000

* cited by examiner

Primary Examiner—John C. Hong
(74) Attorney, Agent, or Firm—Oliff & Berridge, PLC

(57) ABSTRACT

A roller turret including a turret body having a plurality of mounting holes formed therein such that the mounting holes are arranged in a rotating direction of the turret body, a plurality of roller shafts each including a roller support portion and a stud portion eccentric with respect to the roller support portion and fitted in the corresponding mounting hole, a plurality of rollers rotatably mounted on the roller support portions of the respective roller shafts, and a device provided for each mounting hole, for fixing the stud portion to the turret body, at a desired angular position of the corresponding roller shaft. The roller turret may be manufactured by a method which includes the steps of preparing the turret body, preparing the roller shafts having the rollers rotatably mounted on the roller support portions, preparing a preliminary roller turret assembly wherein each roller shaft is rotatably fitted at the stud portion in the corresponding mounting hole, adjusting an angular pitch of the adjacent rollers, by rotating the roller shafts, and fixing all of the roller shafts to the turret body after the angular pitch adjusting step. Also disclosed are various devices including the roller turret and methods of manufacturing these devices.

34 Claims, 26 Drawing Sheets

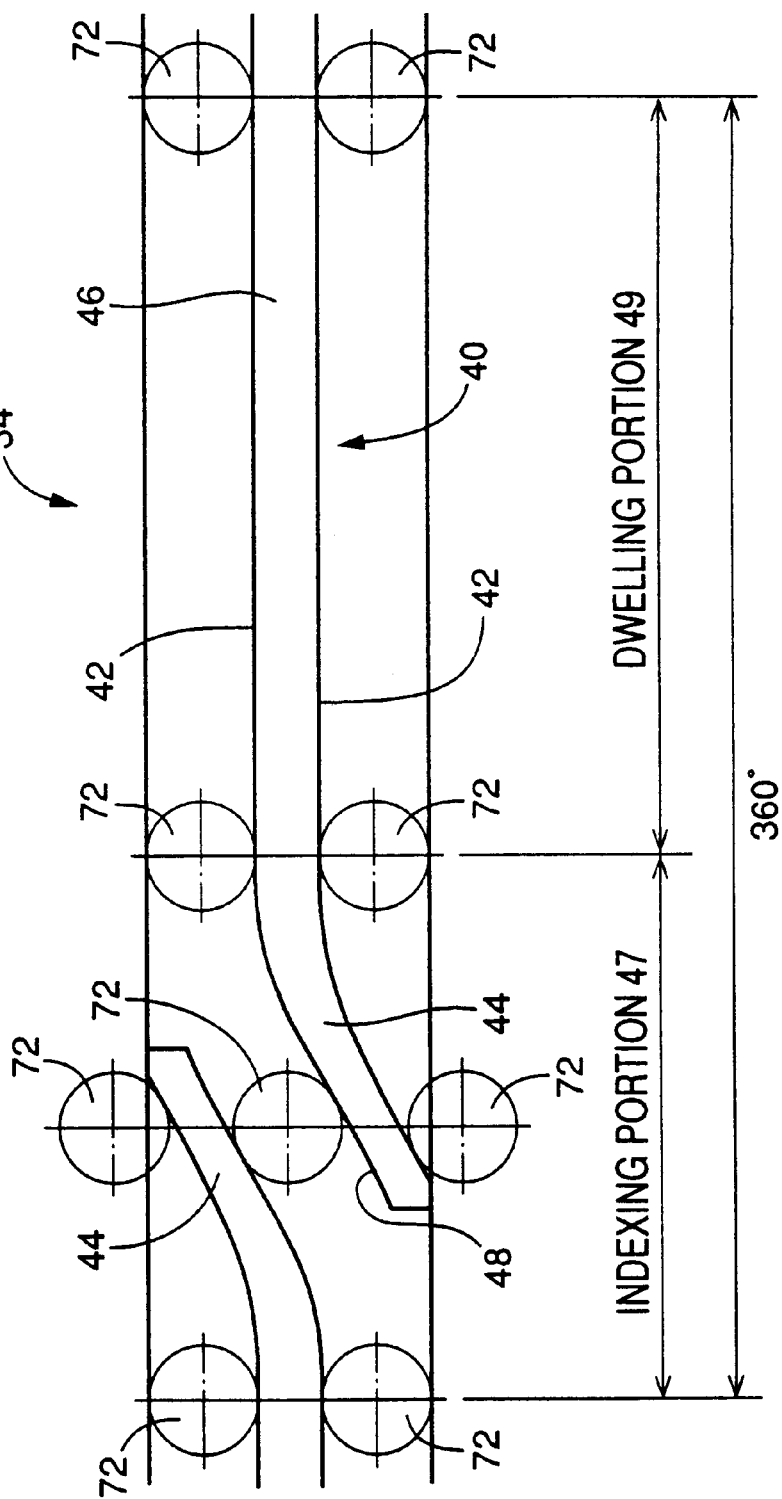

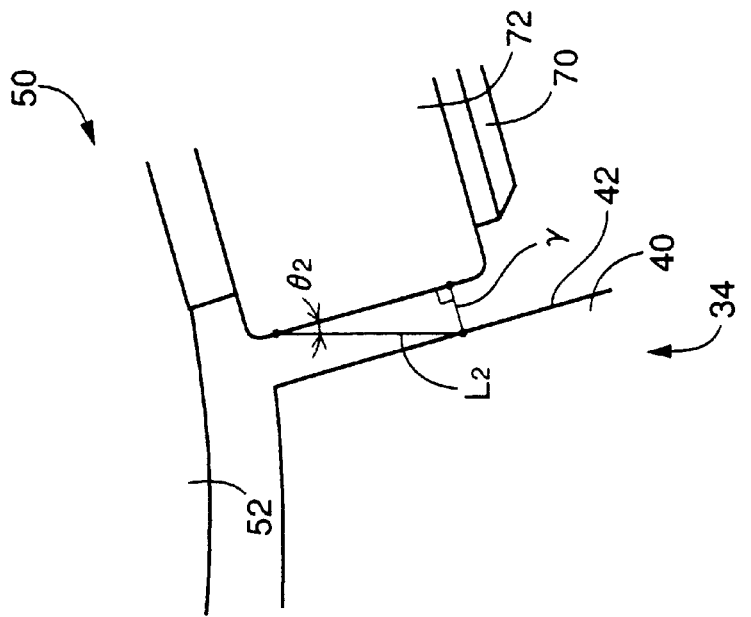
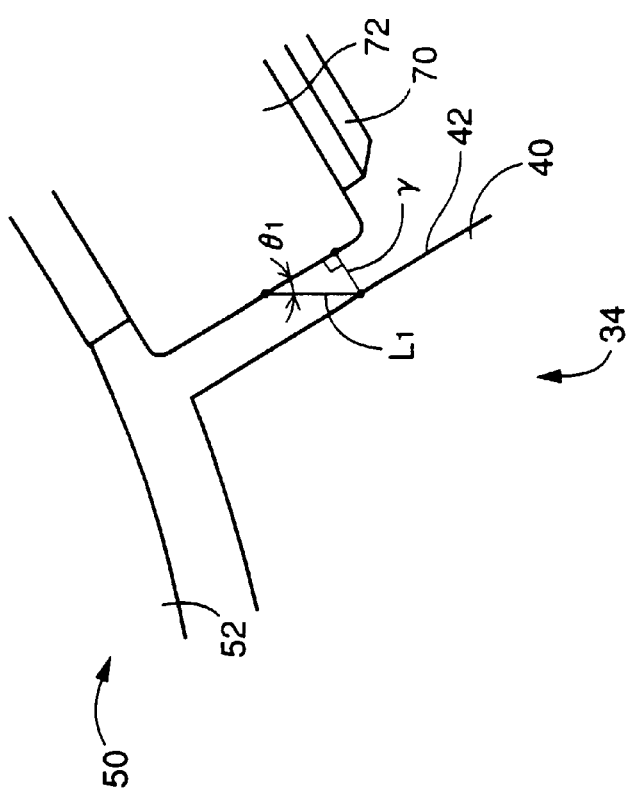
FIG. 9A
FIG. 9B

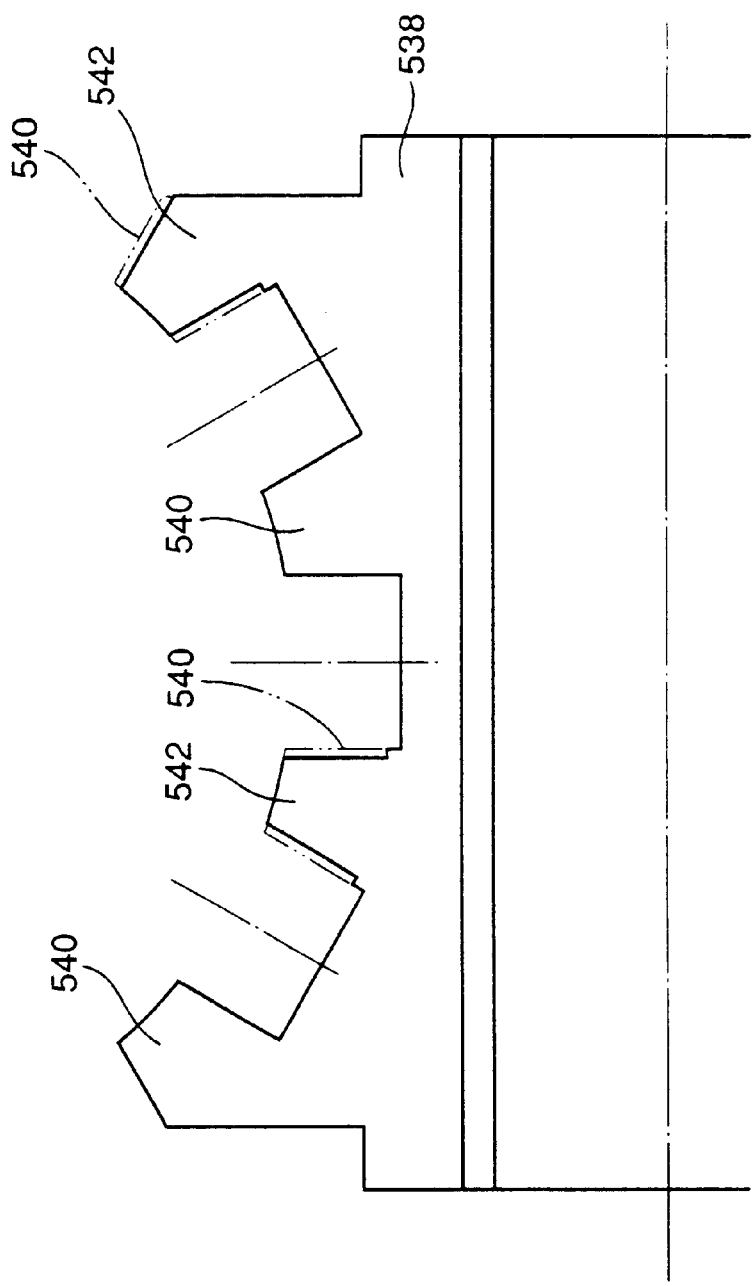

ROLLER TURRET INCLUDING ROLLERS MOUNTED ON SUPPORT PORTIONS OF ROLLER SHAFTS, WHICH ARE ECCENTRIC WITH RESPECT TO STUD PORTIONS FIXED IN HOLES IN TURRET BODY

This is a division of application Ser. No. 09/399,724, filed Sep. 20, 1999 now U.S. Pat. No. 6,279,219.

This application is based on Japanese Patent Application No. 10-269263 filed Sep. 24, 1998, the content of which is incorporated hereinto by reference.

BACKGROUND OF THE INVENTION

1. Field of the Invention

The present invention relates in general to a roller turret, a method of manufacturing the roller turret, a roller turret cam index device, and a roller turret type rotary motion transmitting device, and more particularly to techniques for improvement of accuracy of pitch of rollers used in the roller turret.

2. Discussion of the Related Art

Generally, a roller turret includes a turret body rotatable about an axis thereof, a plurality of roller shafts provided on the turret body, and a plurality of rollers rotatably supported by the respective roller shafts. Each of the roller shaft includes a stud portion fitted in a mounting hole formed in the turret body, and a roller support portion which is concentric or coaxial with the stud portion and which supports the roller rotatably. The roller support portion of the roller shaft is disposed outside the turret body, so that the roller also disposed outside the roller is rotatably supported by the roller support portion.

Such a roller turret may be combined with a globoidal cam, a barrel cam, or a plate cam unit which is a combination of a plurality of plate cams (usually, two plate cams). The roller turret cooperates with the globoidal cam, the barrel cam and the plate cam unit, to constitute a globoidal cam index device, a barrel cam index device, and a parallel cam index device, respectively. The roller turret combined with the globoidal cam is generally called "a roller gear". In the present application, the roller turret combined with the globoidal cam is referred to as "a spur roller gear" as distinguished from "a face roller gear", which is the roller turret combined with the barrel cam. Those roller turrets are referred to as the spur roller gear and the face roller gear, in view of their similarity in configuration to a spur gear and a face gear. The roller turret combined with the plate cam unit, on the other hand, is referred to as "a zigzag roller turret", in view of a pattern of arrangement of the rollers. The globoidal cam index device, the barrel cam index device and the parallel cam index device are collectively referred to as "a roller turret index device".

In the spur roller gear, the roller shafts are disposed on the turret body so as to extend in the radial direction of the turret body such that the axes of the roller shafts are perpendicular to the axis of rotation of the turret body. In the face roller gear and the zigzag roller gear, the roller shafts are disposed on the turret body so as to extend in the axial direction of the turret body such that the axes of the roller shafts are parallel to the axis of rotation of the turret body. The globoidal cam, the barrel cam and the plate cam units are collectively referred to as "a roller turret cam". Each of these roller turret cams includes a dwelling portion and an indexing portion with which the roller turret engages during rotation of the roller turret cam, so that the roller turret is held stationary while it is held in engagement with the dwelling portion, and is rotated while it is held in engagement with the indexing portion.

The spur roller gear is combined with a double enveloping worm to provide a spur roller gear type speed reducing device, while the face roller gear is combined with a cylindrical worm to provide a face roller gear type speed reducing device. Such a double enveloping or cylindrical worm has a thread which corresponds to a rib formed on the globoidal and barrel cams and which does not include a dwelling portion and therefore has a constant lead. A rotary motion of the worm at a constant speed will cause a rotary motion of the spur or face roller gear at a comparatively lower constant speed. The speed ratio of the spur or face roller gear with respect to the double enveloping or cylindrical worm can be increased to 1.0 by increasing the number of starts of the thread or tooth of the worm. In this case, the spur or face roller gear and the worm cooperate to constitute a spur or face roller gear type rotary motion transmitting device. Further, a spur or face roller gear type speed increasing device may be obtained where the spur or face roller gear is used as an input-side device while the double enveloping or cylindrical worm is used as an output-side device. The speed reducing device, rotary motion transmitting device (in a narrow sense) and speed increasing device, which have been described above, are collectively referred to as a rotary motion transmitting device in a broad sense. The spur roller gear type rotary motion transmitting device and the face roller gear type rotary motion transmitting device are referred to as a roller turret type rotary motion transmitting device. Where the roller gear type rotary motion transmitting device is used in combination with a drive device capable of rotating the worm (or roller gear) such that the worm is stopped at a desired angular position, the roller gear (or worm) can be stopped at a corresponding angular position.

In the conventional roller turret cam index device, it is difficult to improve the indexing accuracy of the roller turret, namely, the accuracy of stopping the roller turret at the desired angular position. Accordingly, the conventional roller turret type rotary motion transmitting device suffers from a problem of difficulty to improve the accuracy of rotary motion transmission (the accuracy of relative angular position of the roller turret and the worm). This difficulty is primarily due to difficulty to improve the accuracy of pitch of the rollers in the roller turret.

The mounting holes in which the roller shafts are partly received are formed in the turret body such that the roller shafts are equiangularly arranged and spaced apart from each other in the circumferential direction of the turret body. Even if the mounting holes are formed by machining with a high degree of accuracy of their positions, the mounting holes inevitably have an angular positioning error of about ±5 seconds. Usually, the stud portion of each roller shaft is press-fitted in the mounting hole with some amount of interference. Since the amount of interference is on the order of single-digit microns ($\mu$), the roller shafts whose diameters of the stud portions have different amounts of deviation from the nominal value must be fitted in the appropriately selected mounting holes whose diameters also have different amounts of deviation from the nominal value. That is, the diameters of the stud portions of the roller shafts which have been produced are classified into a plurality of diameter groups. On the other hand, the diameters of the mounting holes formed in the roller turret are are measured. The combinations of the roller shafts and the mounting holes are determined so that the amount of interference between the stud portion of each roller shaft and the corresponding mounting hole is held within an optimum range. However, the matching of the diameters of the roller shafts with respect to the diameters of the mounting holes is a cumbersome procedure. Although the stud portion of the roller shaft may be fitted in the mounting hole with a clearance within a predetermined tolerance, this clearance fit is likely to deteriorate the accuracy of pitch of the rollers and reduce the strength of fixing of the roller shaft in the mounting hole. Alternatively, the stud portion of the roller shaft may be press-fitted in the mounting hole with a sufficiently large amount of interference, an excessively large amount of interference therebetween may lead to inclination or misalignment of the axis of the roller shaft relative to the centerline of the mounting hole, resulting in lowering of the accuracy of pitch of the rollers.

Further, it is impossible to establish a perfect alignment of the axis of the turret body about which the mounting holes are equiangularly spaced apart from each other by a machining operation on the turret body, with the axis of rotation of the end product, namely, the axis of rotation of the index device or rotary motion transmitting device. That is, the axis or center about which the mounting holes are equiangularly spaced apart from each other may more or less deviate from the axis of rotation of the turret body, and this deviation results in an angular positioning error of the mounting holes, and consequently causes deterioration of the roller pitch accuracy of the end product. If the turret body consists of a plurality of pieces which are fixed together, the misalignment or deviation of the two axes indicated above may be reduced to within about 2–3 microns. However, this solution is not satisfactory.

Further, the dimensional errors of the components associated with the rollers may also cause the roller pitch error of the roller turret. Where the roller is mounted on the roller support portion of the roller shaft via a needle bearing interposed therebetween such that the roller support portion and the roller respectively function as an inner race and an outer race of a roller bearing, for instance, a variation of the outside diameter of the roller support portion and variations of the inside and outside diameters of the roller will cause an error of the roller pitch of the roller turret. Therefore, it is required to minimize the overall diameter error of an assembly of the roller support portion, needle bearing and roller. However, the overall diameter error of that assembly cannot be actually reduced to a value smaller than 2–3 microns.

In addition, misalignment of the actual axis of rotation of the turret body with respect to the nominal axis due to inaccuracy of bearings used for rotatably supporting the turret body will cause the same result as if the roller turret had a roller pitch error. To avoid this problem, it is required to use high-precision bearings for supporting the turret body with high accuracy. In this case, the cost of manufacture of the roller turret assembly is undesirably increased. In some cases, the amount of misalignment cannot be sufficiently reduced even if expensive high-precision bearings are used for rotatably supporting the roller turret.

As described above, there are various causes for the roller pitch error of the roller turret. Each of the errors arising from the respective causes must be minimized. For instance, it is required to improve the accuracy of machining to form the mounting holes, the accuracy of mounting of the roller shafts on the turret body, and the dimensional accuracy of the components associated with the rollers. In this instance, however, the roller pitch error is still relatively large due to a cumulative error including the errors generated by the different causes. For instance, the roller turret of the roller turret cam index device inevitably suffers from an indexing error or angular positioning error of about ±10 seconds. Since the cost of manufacture of the roller turret progressively or exponentially increases with an increase in the required degree of accuracy, the roller pitch error of the roller turret cannot be further reduced at a practically acceptable cost.

The globoidal cam index device, barrel cam index device, spur roller gear type rotary motion transmitting device and face roller gear type rotary motion transmitting device have a further problem that the angular positioning or indexing accuracy is deteriorated due to vibration of the spur or face roller gear, which is generated due to a clearance or gap between the outer circumferential surface of the rollers and the rib of the globoidal or barrel cam or the thread of the worm. Each roller of the roller gear is moved in a groove defined by two portions of the rib of the globoidal or barrel cam or the thread of the worm, which two portions are spaced apart from each other in the axial direction of the cam or worm. To permit the roller to move in the groove in rolling contact with the mutually facing surfaces of the walls of the groove, it is necessary to provide a clearance between the surfaces of the walls and the outer circumferential surface of the roller. This clearance causes vibration or operating noise of the roller gear, which deteriorates the angular positioning or indexing accuracy and the rotary motion transmitting accuracy of the index device or rotary motion transmitting device.

SUMMARY OF THE INVENTION

It is therefore an object of the present invention to provide an inexpensive roller turret having a high degree of accuracy of pitch of its rollers.

Another object of the invention is to provide a roller turret cam index device including such a roller turret.

A further object of the invention is to provide a roller turret type rotary motion transmitting device including such a roller turret.

A still further object of the invention is to provide a method of manufacturing such a roller turret.

A yet further object of the invention is to provide a method of manufacturing such a roller turret cam index device.

Still another object of the invention is to provide such a roller turret type rotary motion transmitting device.

One of the objects indicated above may be achieved according to any one of the following modes of the present invention, each of which is numbered like the appended claims and depends from the other mode or modes, where appropriate, to indicate possible combinations of technical features or elements within the principle of the invention. However, it is to be understood that the present invention is not limited to the following modes and combinations of the technical features.

(1) A method of manufacturing a roller turret which includes a turret body and a plurality of roller shafts each of which carries a roller rotatably mounted thereon, the method comprising: a step of preparing the turret body having a plurality of mounting holes formed therein such that the mounting holes are arranged in a rotating direction of the turret body; a step of preparing the plurality of roller shafts each including a roller support portion on which the roller is rotatably mounted, and a stud portion which is eccentric with respect to the roller support portion; a preliminary assembling step of preparing a preliminary roller turret assembly wherein each of the roller shafts is rotatably fitted at said stud portion in a corresponding one of the mounting holes; an angular pitch adjusting step of adjusting an angular pitch of adjacent ones of the plurality of rollers, by rotating the roller shafts; and a fixing step of fixing all of the roller shafts to the turret body body after the angular pitch adjusting step.

Examples of the roller turret manufactured by the method of the present invention include a spur roller gear, a face roller gear and a zigzag type roller turret, which have been described above. A roller turret type rotary motion transmitting device may be constituted by combining the spur roller gear with a double enveloping worm, or by combining the face roller gear with a cylindrical worm. These spur roller gear and face roller gear that are used in the roller turret type rotary motion transmitting device may be manufactured by the present method.

The turret body and the roller shafts may be manufactured by a manufacturer who assembles the roller turret, or by another manufacturer who does not manufacture the roller turret. In the former case, the "step of preparing the turret body" and the "step of preparing the plurality of roller shafts" are considered to be a step of manufacturing the turret body and the roller shafts and thereby preparing these turret body and roller shafts. In the latter case, these two steps are considered to be a step of purchasing the turret body and the roller shafts and thereby preparing these turret body and roller shafts.

Since the stud portion and the roller support portion of each roller shaft are eccentric with respect to each other, rotation of the roller shaft will result in rotation of the axis of the roller support portion about the axis of the stud portion, so that the position of the axis of the roller support portion in the rotating direction of the turret body is changed. Accordingly, rotation of the roller shaft permits adjustment of an angular interval between the two adjacent rollers mounted on the corresponding two adjacent roller shafts one of which is rotated. In the roller gear, the "position of the axis of the roller support portion in the rotating direction of the turret body" indicated above is, more precisely, the position of the axis of the roller support portion in a direction of tangency to the pitch circle of the rollers at the angular or circumferential position of the turret body at which the roller shaft in question is fixed. After the angular pitch adjusting step is completed, all of the roller shafts are fixed to the turret body so that the adjusted angular intervals between the adjacent rollers are maintained.

The angular pitch of the adjacent rollers is conveniently represented by an angle about the axis of rotation of the roller turret (turret body), which is defined by the axes of rotation of the two adjacent rollers. However, the angular pitch may be represented by a distance between the axes of the two adjacent rollers at a given axial position of the rollers on their axes (at a given radial position of the turret body, e.g., on the pitch circle of the rollers). In the present invention wherein the roller shafts having the mutually eccentric stud and roller support portions are rotated to adjust the angular pitch of the rollers, the axes of the roller support portions of all of the roller shafts do not lie on a single plane perpendicular to the axis of the roller turret, in a strict sense, where the roller turret is a spur roller gear. Where the roller turret is a face roller gear or a zigzag roller turret, the axes of the roller support portions of the roller shafts do not lie on a single circle having a center on the axis of the turret body. Therefore, if the angular pitch of the rollers is represented by the distance between the axes of the adjacent rollers, the actual distance does not accurately represent the angular pitch. Actually, however, the angular positioning or indexing accuracy of the spur roller gear in meshing engagement with a dwelling portion of a globoidal cam is not significantly influenced by a variation in the positions of the axes of the rollers in the axial direction of the turret body (spur roller gear). Similarly, the angular positioning or indexing accuracy of the face roller gear in meshing engagement with a dwelling portion of a barrel cam is not significantly influenced by a variation in the positions of the rollers in the radial direction of the turret body (face roller gear). Therefore, the variations in the positions of the rollers in the axial and radial directions of the turret body may be ignored. On the other hand, while the spur roller gear or face roller gear is in meshing engagement with an indexing portion of the globoidal cam (barrel cam) or a worm, the variations in the positions of the rollers in the axial direction of the turret body will significantly influence the angular position of the spur roller gear or face roller gear (hereinafter referred to as "roller gear"), even when the positions of the rollers in the rotating or circumferential direction of the turret body remain unchanged. Therefore, the variations may not be ignored while the roller gear is in meshing engagement with the worm or the indexing portion of the globoidal or barrel cam. However, rotating the roller shafts will result in simultaneous change in the positions of the rollers of the spur roller gear in both of the axial and rotating directions of the turret body, and simultaneous change in the positions of the rollers of the face roller gear in both of the radial and rotating directions of the turret body. Accordingly, a change in the angular position of the spur roller gear or face roller gear due to changes change in the positions of the rollers of the roller gear in the axial and radial directions of the turret body may be considered to result from a change in the angular position of the roller gear due to changes in the positions of the rollers in the rotating direction of the turret body. Actually, the angular positions of the spur roller gear are adjusted by adjusting the positions of the rollers in the axial and rotating directions of the turret body, while the angular positions of the face roller gear are adjusted by adjusting the positions of the rollers in the radial and rotating directions of the turret body. Practically, however, this adjustment of the angular positions of the spur or face roller gear may be considered to be effected by only the adjustment of the positions of the rollers in the rotating direction of the turret body, that is, by only the adjustment of the angular pitch of the rollers.

The angular positions of the zigzag type roller turret in the parallel cam index device are determined by engagement of the two adjacent rollers with indexing portions in the form of cylindrical cam surfaces of two plate cams of a plate cam unit. In the zigzag type roller turret, the rollers are alternately located at two different positions in the axial direction of the turret body, so that the two adjacent rollers have different positions in the axial direction of the turret body. As in the case of meshing engagement of the spur roller gear or face roller gear with the worm or the dwelling portion of the globoidal or barrel cam, the position of the roller in the radial direction of the turret body as well as that in the rotating direction of the turret body is changed by rotation of the corresponding roller shaft. For the same reason explained above, the adjustment of the angular positions of the zigzag type roller turret may practically be considered to be effected by only the adjustment of the positions of the rollers in the rotating direction of the turret body, that is, by only the adjustment of the angular pitch of the rollers.

In the sense described above, the terms "angular pitch adjustment of the rollers" and "adjustment of angular intervals between the adjacent rollers" are applicable to the spur or face roller gear in meshing encagement with the worm or the dwelling portion of the globoidal or barrel cam, and to the zigzag type roller turret in meshing engagement with the plate cam unit.

The present method of manufacturing a roller turret, which includes an angular pitch adjusting step of adjusting the angular pitch of adjacent ones of the rollers by rotating the roller shafts each having the mutually eccentric roller support and stud portions, makes it possible to eliminate an error in the angular pitch of the rollers, which may result from various errors such as: an error in the positions of the mounting holes formed in the turret body, in the rotating direction of the turret body; a misalignment between the axis of rotation of the turret body when the mounting holes are formed by machining, and the axis of rotation of the turret body as incorporated in the cam index device; a dimensional error of the components associated with the rollers; and a runout of bearings supporting the rollers. Namely, the present method eliminates the angular pitch error of the rollers, which is derived from all possible factors except out-of-roundness of the rollers and misalignment of the axis of each roller and the axis of the corresponding roller shaft. The present method makes it possible to reduce the angular pitch error of the rollers, without having to enhance the dimensional and positional accuracies of the mounting holes, the dimensional accuracies of the roller shafts, rollers and the related components on the roller gear, and without having to use high-precision bearings for supporting the roller gear. Further, the present method eliminates a need of press-fitting the roller shafts into the mounting holes, which requires difficult and cumbersome control of the dimensions of the roller shafts and the mounting holes. Thus, the present method permits economical manufacture of the roller gear with a high degree of angular pitch accuracy of the rollers. Although the instant method requires the angular pitch adjustment step, the method as a whole permits an improvement in the angular pitch of the rollers of the roller gear, while reducing the cost of manufacture of the roller gear.

It is noted that the present invention was made in an effort to economically manufacture a high-precision roller turret whose angular pitch error is held within ±10 seconds. Although the manufacture of the high-precision roller turret having such an extremely high degree of angular pitch accuracy is desirable, the present method is also applicable to the manufacture of a roller turret having an ordinary angular pitch accuracy. According to the present invention, such an ordinary roller turret can be manufactured even if the dimensional and positional accuracies of the mounting holes formed in the turret body and the accuracy of the bearings supporting the roller turret are considerably low. The roller shaft inevitably suffers from a displacement within the mounting hole due to a gap or clearance between the stud portion of the roller shaft and the mounting hole, if the roller shaft is rotatably fitted in the mounting hole at its stud portion. For manufacturing a roller turret having an extremely high degree of angular positioning accuracy, it is required to position the roller shaft in the preliminary assembling step such that the stud portion is held in close contact with a predetermined circumferential portion of the inner circumferential surface of the mounting hole, as in the following mode (2) of this invention, such that the axis of the stud portion is slightly offset from the centerline of the mounting hole in the radial direction of the mounting hole. However, where the required angular positioning accuracy of the roller turret can be achieved in the presence of some amount of gap or clearance between the stud portion and the mounting hole, it is not essential to position the roller shaft such that the stud portion is held in close contact with the predetermined circumferential portion of the inner circumferential surface of the mounting hole.

Where the angular pitch adjustment step is implemented while the roller turret is in engagement with the roller turret cam, as described below, it is necessary to fix the roller shafts to the turret body in the preliminary assembling step, in order to prevent displacement of the roller shafts due to a relatively small load which acts on the roller shafts in the angular pitch adjustment step. However, the angular pitch adjusting step may be implemented without engagement of the roller turret with the roller turret cam, by utilizing an optical measuring device or an image processing device. IN this case, the roller shafts need not be fixed to the turret body. For instance, images of the two adjacent rollers of the spur roller gear are taken, and the distance between the same predetermined points on the two adjacent rollers (for example, on the pitch circle of the rollers) is measured. The measured distance is compared with the nominal value to calculate an error. One of the two adjacent roller shafts is rotted so as to adjust the distance to the nominal value, for thereby adjusting the angular interval between the two adjacent rollers.

(2) A method according to the above mode (1), wherein the preliminary assembling step comprises positioning each roller shaft such that the stud portion is held in close contact with a predetermined portion of an inner circumferential surface of a corresponding one of the mounting holes, and the fixing step comprises filling a gap between an outer circumferential surface of the stud portion and the inner circumferential surface, with a filler material.

With the stud portion of each roller shaft being held in close contact with the predetermined circumferential portion of the inner circumferential surface of the mounting hole, the roller shaft can be accurately positioned even in the presence of some amount of clearance or gap between the stud portion and the mounting hole. For instance, a setscrew may be provided in the turret body, so as to be movable toward a centerline of each mounting hole, so that the stud portion of the roller shaft is forced with a movement of the setscrew, onto the predetermined circumferential portion of the inner circumferential surface of the mounting hole. Thus, the stud portion can be positioned in the radial direction of the mounting hole and fixed in the mounting hole, by tightening the setscrew, so that the roller shaft is prevented from being displaced even when some amount of load acts on the roller shaft. The use of the setscrews for fixing the roller shafts to the turret body is effective to prevent displacement of the rollers in the angular pitch adjusting step wherein the roller turret is rotated in meshing engagement with the roller turret cam. This rotation of the roller turret in the angular pitch adjusting step may be effected after the angular interval adjustment is completed for some of the rollers by rotating the corresponding roller shafts, that is, before the adjustment is completed for all of the rollers. The angular pitch adjustment can be implemented for selected ones of the rollers and can be repeated for the same rollers, by loosening and tightening the corresponding setscrews, so that all angular intervals between the adjacent rollers can be adjusted to the nominal angular pitch value. Further, the use of the setscrews provide easy and economical means for provisionally fixing the roller shafts to the turret body. After the angular pitch adjusting step is completed, the gap between the stud portion of each roller shaft and the corresponding mounting hole is filled with the filler material, to prevent displacement of the stud portion within the mounting hole, and to maintain a high degree of angular pitch accuracy of the roller turret.

(3) A method according to the above mode (2), wherein the filler material is an adhesive agent for bonding the stud portion to the turret body.

In the above mode of the method, an adhesive agent is used as the filler material for filling the gap between the stud portion of each roller shaft and the corresponding mount hole, so that the roller shaft is firmly bonded to the inner circumferential surface of the mounting hole. As a result, the rigidity of each roller shaft is improved, and the roller turret maintains a high degree of angular pitch accuracy with high stability.

(4) A method according to any one of the above modes (1)–(3), wherein the angular pitch adjusting step comprises: assembling the preliminary roller turret assembly and a roller turret cam having a dwelling portion such that the preliminary roller turret assembly meshes with the dwelling portion; rotating the roller turret cam and detecting a plurality of angular positions of the roller turret assembly at which the roller turret assembly is in meshing engagement with the dwelling portion of the roller turret cam; and rotating the roller shafts to adjust angular intervals between adjacent ones of the plurality of angular positions, to adjust each of the angular intervals to a nominal value of the angular pitch of the plurality of rollers.

The roller turret cam indicated above may be a globoidal cam, a barrel cam or a plate cam unit, for instance. The globoidal and barrel cams are cams having a rib which includes a dwelling portion for establishing the angular positions of the roller turret. The plate cam unit is a cam not having a rib.

The roller turret cam may be a cam which is operated or used in combination the roller turret, or a master roller turret cam which is used for the sole purpose of implementing the angular pitch adjusting step during manufacture of the roller turret in question. The use of the master roller turret cam is effective particularly where the roller turret is operated or used in combination with a roller turret cam which does not have a dwelling portion, or in combination with a worm.

The angular pitch of the rollers of the roller turret can be adjusted to the nominal value, by adjusting all angular intervals between the adjacent angular positions of the roller turret to the nominal value of the angular pitch. Accordingly, the method according to the above mode (4) permits the roller turret to have a high degree of angular pitch accuracy and therefore a high degree of angular positioning or indexing accuracy, in any of the following cases: where the roller turret is combined with a roller turret cam to provide a roller turret cam index device; where the roller turret in the form of a spur roller gear or a face roller gear is combined with a double enveloping worm or a cylindrical worm, to provide a roller turret type rotary motion transmitting device; and where the roller turret in the form of a spur roller gear or a face roller gear is combined with a globoidal or barrel cam not having a dwelling portion, to provide a spur roller gear type rotary motion transmitting device or a face roller gear type rotary motion transmission device.

By effecting the angular pitch adjusting step while the roller turret is in meshing engagement with a roller turret cam having a dwelling portion, the roller turret can be stopped at a plurality of angular positions which are established by engagement of the dwelling portion of the roller turret cam with respective pairs of the adjacent rollers of the roller turret, without accurately controlling the angular positions at which the roller turret cam is stopped. The angular pitch of the rollers of the roller turret can be easily adjusted by eliminating a deviation of each of the actually detected angular intervals between the adjacent angular positions of the roller turret, with respect to the nominal angular pitch value.

(5) A roller turret comprising: a turret body having a plurality of mounting holes formed therein such that the mounting holes are arranged in a rotating direction of the turret body; a plurality of roller shafts each including a roller support portion and a stud portion eccentric with respect to the roller support portion and fitted in a corresponding one of the plurality of mounting holes; a plurality of rollers rotatably mounted on the roller support portions of the plurality of roller shafts, respectively; and fixing means provided for each of the mounting holes, for fixing the stud portion of the corresponding roller shaft to the turret body, at a desired angular position of the corresponding roller shaft.

The angular pitch of the rollers of the roller turret can be adjusted by rotating the roller shafts, so that the roller turret has a high degree of angular pitch accuracy. After the angular pitch of the rollers has been adjusted, each roller shaft is fixed to the turret body by the fixing means, so as to prevent deterioration of the angular pitch accuracy due to rotation or inclination of the roller shaft due a load acting thereon.

(6) A roller turret according to the above mode (5), wherein the fixing means includes a plurality of setscrews provided for the plurality of roller shafts, respectively, each of the setscrews being disposed in the turret body such that each setscrew is movable toward a centerline of a corresponding one of the mounting holes, in a direction intersecting said centerline, for forcing the stud portion of the corresponding roller shaft onto an inner circumferential surface of the corresponding mounting hole.

Only one setscrew is provided for each of the mounting holes. Alternatively, two or more setscrews may be provided for each mounting hole. For example, there are provided an inner setscrew for contacting the stud portion of the corresponding roller shaft, and an outer setscrew in series with the inner setscrew. In this case, the outer setscrew functions as a lock screw for locking the inner setscrew after the stud portion is fixed in the mounting hole by the inner setscrew. Alternatively, a plurality of setscrews may be arranged in parallel, that is, spaced apart from each other in the axial direction of the stud portion, so that the stud portion is fixed at two axial positions by the two setscrews.

The fixing means including the setscrews permits the roller shafts to be selectively fixed to the turret body or released from the turret body to permit rotation of the roller shafts, as needed, so that the angular pitch adjustment procedure can be repeated until the angular interval between the adjacent rollers is adjusted to the desired value (nominal pitch value). Namely, the setscrew for the appropriate roller shaft is first loosened, the roller shaft is then rotated to adjust the angular interval between the adjacent rollers in question, and the setscrew is finally tightened to fix the roller shafts to the turret body. These steps are repeated until the angular interval has been adjusted as needed.

The setscrews used as the fixing means in the above mode (6) of the present invention may be replaced by a combination of a radially outwardly extending flange which is formed on the stud portion of each roller shaft and which is has a through-hole formed therethrough in the axial direction of the roller shaft, and a headed screw which extends through the through-hole of the flange and which is screwed into a tapped hole formed in the turret body, so that the roller shaft is fixed by the headed screw to the turret body. The through-hole is preferably an arcuate elongate hole extending along a circular arc whose center lines on the axis of the stud portion. For positioning the roller shaft in the radial direction, at least a part of the stud portion may be a tapered part which is engageable with a tapered portion of the mounting hole. The tapered part of the stud portion has a diameter which decreases in the axial direction from the roller support portion toward a distal end of the stud portion, and the tapered portion of the mounting hole has a taper angle corresponding to that of the tapered part of the stud portion, so that the tapered part of the stud portion is engageable with the tapered portion of the mounting hole. For positioning the roller shaft in the axial direction as well as in the radial direction, the roller shaft may include a radially outwardly extending flange portion so that the flange portion is held in abutting contact with a surface of the turret body. The tapered part of the stud portion and the tapered portion of the mounting hole may be provided where the fixing means includes the setscrews described above.

(7) A roller turret according to the above mode (5) or (6), wherein the fixing means includes a filler material for filling a gap between an outer circumferential surface of the stud portion and an inner circumferential surface of the corresponding mounting hole, so that the roller turret is fixed by the filler material to the turret body at the stud portion.

Between the outer circumferential surface of the stud portion of each roller shaft and the inner circumferential surface of the corresponding mounting hole, there is left a gap or clearance which permits the roller shaft to be rotated. With this gap being filled with the filler material, the roller shaft is fixed to the turret body. Unlike a screw, the filler material does not permit repeated fixing and releasing of the roller shaft to and from the turret body. However, the filler material filling the gap assures firm fixing of the roller shaft to the turret body. Where the fixing means includes both the setscrew and the filler material for each roller shaft, the setscrew may be used for provisionally fixing the roller shaft, while the filler material may be used for permanently fixing the roller shaft. The fixing means may include the filler material and a screw other than the setscrew, such as a headed screw.

Even where the fixing means does not include a setscrew or a headed screw, the roller shaft may be provisionally fixed to the turret body after the angular pitch adjustment is completed after the gap indicated above is filled with the filler material. For instance, the roller shaft may be provisionally fixed in the mounting hole at the predetermined angular position, owing to a force of friction between the stud portion and the mounting hole. To this end, the stud portion of the roller shaft may have a tapered part whose diameter decreases in the axial direction from the roller support portion toward a distal end of the stud portion. In this case, the mounting hole has a tapered portion having a taper angle corresponding to that of the tapered part of the stud portion, so that the tapered part of the stud portion is engageable with the tapered portion of the mounting hole, for provisionally fixing the roller shaft to the turret body at the desired angular position, owing to the force of friction between the tapered surfaces of the stud portion and the mounting hole.

(8) A roller turret according to the above mode (7), wherein the filler material is an adhesive agent for bonding the stud portion to the turret body.

The above mode (8) of the invention has the same advantage as the mode (3) described above with respect to the manufacturing method.

(9) A roller turret according to any one of the above modes (6)–(8), wherein the roller shaft has an abutting surface which faces in an axial direction of the roller shaft from the roller support portion toward a distal end of the stud portion, and the stud portion has a tapered surface which is inclined such that a distance between the tapered surface and the distal end of the stud portion in an axial direction of the stud portion decreases in a radially outward direction of the stud portion, each setscrew being held in engagement with the tapered surface for holding the abutting surface in abutting contact with a surface of the turret body which faces in an axial direction of the roller shaft from the distal end of the stud portion toward the roller support portion.

The abutting surface of the roller shaft may be provided on the stud portion or the roller support portion. In either of these cases, the end face of the stud portion or roller support portion may be used as the abutting surface. Alternatively, the abutting surface may be provided on an intermediate portion of the roller shaft located between the stud portion and the roller support portion.

With the setscrew held in engagement with the tapered surface of the stud portion, the roller shaft is axially moved toward the bottom of the mounting hole, due to an axial component of a force which is applied from the setscrew to the tapered surface. As a result, the abutting surface is held in abutting contact with the turret body. In addition, the stud portion is forced onto the inner circumferential surface of the mounting hole, by a radial component of the force acting on the tapered surface. Thus, the roller shaft is positioned by the setscrew and the abutting and tapered surfaces, in both the axial and radial directions.

(10) A roller turret according to the above mode (9), wherein the stud portion includes an axially intermediate part which has an annular groove formed in an outer circumferential surface thereof, the tapered surface consisting of one of opposite surfaces defining the annular grove.

In the above mode (10), the setscrew engages one of the opposite surfaces which defines the annular groove formed in the outer circumferential surface of the axially intermediate part of the stud portion, so that the stud portion is pushed in the radial direction onto the inner circumferential surface of the mounting hole, and is axially displaced toward the bottom of the mounting hole. Thus, the roller shaft can be smoothly axially moved for engagement of the abutting surface with the surface of the turret body, without an inclination relative to the centerline of the mounting hole. Further, since the tapered surface is provided by one of the opposite surfaces of the annular groove, the setscrew is engageable with the tapered surface irrespective of the angular position of the stud portion, that is, irrespective of the angular position of the roller shaft which has been rotated to adjust the angular pitch of the rollers.

(11) A roller turret according to the above mode (9) or (10), wherein the roller support portion has a larger diameter than the stud portion, and the abutting surface consists of a shoulder surface between the roller support portion and the stud portion.

The roller shaft constructed according to the above mode (11) wherein the shoulder surface between the roller support portion and the stud portion functions as the abutting surface is relatively simple in configuration and is accordingly economical to manufacture. However, the abutting surface may be provided by a radially outwardly extending flange portion formed between the roller support portion and the stud portion, more precisely, by one of opposite surfaces of the flange portion which is on the side of the stud portion.

In this arrangement, the diameter of the roller support portion may be made equal to or even smaller than that of the stud portion. Therefore, this arrangement is desirable where the distance between the adjacent rollers is relatively small.

(12) A roller turret according to any one of the above modes (9)–(11), wherein each setscrew has a tapered end face engageable with the tapered surface of the stud portion.

In the above mode (12) wherein the setscrew has the tapered end face, the surface area of contact of the setscrew with the tapered surface of the stud portion of the roller shaft can be made relatively large, permitting the roller shaft to be fixed to the turret body with a relatively large force.

(13) A roller turret according to any one of the above modes (9)–(12), further comprising a thrust piece interposed between the abutting surface of the roller shaft and the surface of the turret body, so that the abutting surface is held in abutting contact with the surface of the turret body through the thrust piece.

The thrust piece provided according to the above mode (13) is suitably used in the roller turret according to the above mode (11). In this case, the thrust piece having a diameter larger than the inside diameter of the roller is disposed between the surface of the turret body and the abutting surface which is formed between the roller support portion and the stud portion. Where the diameter of the thrust piece is smaller than the outside diameter of the roller, only a radially inner portion of the roller is in frictional contact with the thrust piece during operation of the roller turret, so that the friction resistance between the roller and the thrust piece is reduced.

(14) A roller turret according to any one of the above modes (7)–(13), wherein the turret body has a filler passage formed for each of the plurality of mounting holes, the filler passage being open at one of opposite ends thereof in an outer surface of the turret body and at the other end to the corresponding mounting hole.

The filler material is injected through the filler passage to fill the gap between the outer circumferential surface of the stud portion of the roller shaft and the inner circumferential surface of the mounting hole.

(15) A roller turret according to the above mode (7) or (8), wherein the stud portion of each roller shaft has an annular groove formed in the outer circumferential surface, and the turret body has a filler passage formed for each of the plurality mounting holes, the filler passage being open at one of opposite ends thereof in an outer surface of the turret body and at the other end to a portion of the corresponding mounting hole which is substantially aligned with the annular groove in the stud portion in an axial direction of the stud portion.

The annular groove promotes the delivery of the filler material in the circumferential direction of the stud portion, around the stud portion, assuring the filling of the entirety of the gap between the outer circumferential surface of the stud portion and the inner circumferential surface of the mounting hole.

(16) A roller turret according to the above mode (15), wherein the roller shaft has an abutting surface which faces in an axial direction of the roller shaft from the roller support portion toward a distal end of the stud portion, and the fixing means includes a plurality of setscrews provided for the plurality of roller shafts, respectively, each of the setscrews being disposed in the turret body such that each setscrew is movable toward a centerline of a corresponding one of the mounting holes, in a direction intersecting said centerline, the annular groove being defined by opposite surfaces one of which is a tapered surface which is inclined such that a distance between the tapered surface and the distal end of the stud portion in a axial direction of the stud portion decreases in a radially outward direction of the stud portion, each setscrew being held in engagement with the tapered surface for holding the abutting surface of the roller shaft in abutting contact with a surface of the turret body which faces in an axial direction of the roller shaft from the distal end of the stud portion toward the roller support portion.

The annular groove which serves to deliver the filler material into the above-indicated gap provides the tapered surface with which the setscrew is engageable. Accordingly, it is not necessary to form another annular groove for providing the tapered surface for the setscrew, in addition to the annular groove for delivering the filler material. The annular groove is preferably located in an axially intermediate part of the stud portion.

(17) A roller turret according to any one of the above modes (14)–(16), wherein the turret body has at least one air breather passage which is open at one of opposite ends thereof to an atmosphere and at the other end to the corresponding mounting hole.

The at least one air breather passage permits air to be discharged therethrough from the mounting hole, and facilitates the delivery of the filler material into the mounting hole, more precisely, into the gap between the outer circumferential surface of the stud portion and the inner circumferential surface of the mounting hole, so that the gap is more stably filled with the filler material.

(18) A roller turret according to the above mode (17), wherein the at least one air breather passage includes an air breather hole which is open at the other end to a portion of the corresponding mounting hole which is near a bottom of the corresponding mounting hole.

Since the air is discharged from the mounting hole through the air breather hole, the filler material can easily flow toward the bottom of the mounting hole.

(19) A roller turret according to the above mode (17) or (18), wherein the at least one air breather passage includes at least one air breather groove formed in at least one of (a) an abutting surface formed on the roller shaft so as to face in an axial direction of the roller shaft from said roller support portion toward a distal end of the stud portion, and (b) a surface of the turret body which is in abutting contact with the abutting surface.

Since the air is discharged from the mounting hole through the air breather groove, the filler material can easily flow toward the open end of the mounting hole.

(20) A roller turret according to the above mode (7) or (8), wherein at least one of (a) an intermediate part of the outer circumferential surface of the stud portion and (b) an intermediate part of the inner circumferential surface of the mounting hole which corresponds to the intermediate part of the outer circumferential surface has an annular groove, and the turret body has a communication hole which communicates at one of opposite ends thereof with the annular groove and is open at the other end in an outer surface of the turret body, the annular groove and the communication hole cooperating to define a filler passage for filling the gap with the filler material, and wherein at least one of the turret body and the roller shaft has an annular recessed portion communicating with an open end of the mounting hole, and further has a first air passage which communicates at one of opposite ends thereof with the annular recessed portion and is open at the other end thereof to an atmosphere, and the turret body has a second air passage which is open at one of opposite ends thereof to a bottom portion of the mounting hole and at the other end thereof to the atmosphere, the first and second air passages providing an air breather passage for permitting air to be discharged from the mounting hole.

The air present in a portion of the above-indicated gap between the annular groove and the open end of the mounting hole is discharged into the atmosphere through the annular recessed portion and the first air passage, permitting easy flow of the filler material into that portion of the gap. The annular recessed portion communicating with the entirety of the circumference of the gap permits the air to be discharged from the entire circumferential portion of the gap through the first air passage. If the first air passage were closed by the filler material before the air around the entire circumference of the stud portion is discharged, the air could not be discharged smoothly through the first air passage. To prevent this drawback, the first air passage preferably communicates with the annular recessed portion, at a circumferential position at which the corresponding circumferential portion of the gap can be filled with the filler material with most difficulty. On the other hand, the air in the other portion of the gap between the annular groove and the bottom of the mounting hole is discharged into the atmosphere through the second air passage. A space defined by the bottom of the mounting hole and the distal end face of the stud portion communicates with the entire circumferential portion of the gap, and therefore permits the air to be discharged from the entire circumferential portion of the gap through the second air passage. Thus, the above form (20) of the invention assures adequate filling of the gap with the filler material.

(21) A roller turret according to the above mode (7) or (8), wherein the turret body has a filler passage for filling the gap with the filler material, the filler passage being open at one of opposite ends thereof to an atmosphere and at the other end thereof to a bottom portion of the mounting hole, and at least one of the roller shaft and the turret body has at least one air breather passage which is open at one of opposite ends thereof to an open end of the mounting hole and at the other end thereof to the atmosphere.

The filler material is injected into the above-indicated gap through the bottom portion of the mounting hole. The air breather passage facilitates the flow of the filler material from the bottom portion of the mounting hole toward the open end portion.

(22) A roller turret according to the above mode (21), wherein the at least one air breather passage includes an annular recessed portion communicating with the open end of the mounting hole, and a communication passage which communicates at one of opposite ends thereof to the annular recessed portion and is open at the other end thereof to the atmosphere.

The above description on the annular recessed portion and the first air passage in the above mode (20) applies to the annular recessed portion and the communication passage in the above mode (22).

(23) A roller turret according to any one of the above modes (5)–(22), wherein each of the plurality of roller shafts carries two mutually concentric rollers mounted on the roller support portion such that the two mutually concentric rollers are rotatable independently of each other.

In the roller turret according to the above mode (23), one of the two rollers (referred to as "double-roller assembly") rotatably mounted on each roller shaft is adapted to engage one of opposite surfaces of a groove defined by two portions of a rib of a globoidal or barrel cam or a tooth of a worm, which two portions are spaced apart from each other in the axial direction of the cam or worm, while the other of the two rollers is adapted to engage the other of the opposite surfaces of the groove. The engagement of the two rollers with the surfaces of the groove takes place without a clearance therebetween, so that there does not exist a backlash therebetween at any angular position of the cam or worm. Where only one roller is mounted on the roller shaft, some clearance must be provided between the outer circumferential of the roller and the opposite surfaces of the groove, for permitting the roller to pass the groove, so that some backlash is inevitably left between the roller and the groove. In the present roller turret wherein the two rollers of the double-roller assembly on each roller shaft are adapted to engage the respective two different surfaces defining the groove. In this arrangement wherein a clearance is provided between each of the two rollers and one of the two surfaces of the groove, the double-roller assembly as a whole does not have a clearance with respect to the groove. Further, one of the two rollers of the double-roller assembly may be arranged to engage, without a clearance, the other surfaces of the rib of the cam or tooth of the tooth of the worm, which surfaces do not contribute to defining the groove. Thus, the present arrangement permits smooth rolling contact of the rollers with the surfaces of the rib or tooth of the cam or worm, without a backlash, at all angular positions of the cam or worm. The roller turret according to the above mode (23) is suitably used for a device which is required to operate with reduced operating vibration and noise. Namely, the present roller turret may be combined with a globoidal cam, a barrel cam or a worm, to provide a globoidal cam index device, a barrel cam index device, a spur roller gear type rotary motion transmitting device, or a face roller gear type rotary motion transmitting device, which assures high degrees of motion transmitting accuracy and angular positioning or indexing accuracy, and significantly reduced operating vibration and noise.

However, the complete elimination of the backlash is not essential in the above mode (23) of the invention, provided the backlash is not larger than $8\mu$ or $5\mu$. Where the single-roller assembly is used, a considerably large amount of clearance must be provided between the roller and the groove, to permit the roller to smoothly pass the groove, in the presence of dimensional errors of the roller and the groove.

(24) A method of manufacturing a roller turret cam index device including a roller turret cam and a roller turret which engage each other such that the roller turret cam and the roller turret are rotatable about respective two axes that are spaced apart from each other and intersect each other, the method comprising: a step of preparing a turret body having a plurality of mounting holes formed therein such that the mounting holes are arranged in a rotating direction of the turret body; a step of preparing a plurality of roller shafts each including a roller support portion on which the roller is rotatably mounted, and a stud portion which is eccentric with respect to the roller support portion; a preliminary roller turret assembling step of preparing a preliminary roller turret assembly wherein each of the roller shafts is rotatably fitted at the stud portion in a corresponding one of the mounting holes; a preliminary index device assembly step of preparing a preliminary index device, by assembling the preliminary roller turret assembly and the roller turret cam within a housing; an angular pitch adjusting step of adjusting an angular pitch of adjacent ones of the plurality of rollers of the preliminary roller turret assembly, by rotating the roller shafts; and a fixing step of fixing all of the roller shafts to the turret body after the angular pitch adjusting step.

In the roller turret cam index device manufactured by the method according to the above mode (24) of this invention, the roller turret cam may be a globoidal cam or a barrel cam, for example, while the roller turret may be a spur roller gear or a face roller gear, for example.

The present method permits economical manufacture of the roller turret cam index device which has a high degree of angular positioning or indexing accuracy owing to the angular pitch adjustment of the rollers by rotating the roller shafts.

(25) A method according to the above mode (24), wherein the angular pitch adjusting step comprises: attaching a rotation angle detector to the housing, for detecting an angle of rotation of the preliminary roller turret assembly; rotating the roller turret cam to rotate the preliminary roller turret assembly; detecting angular positions of the preliminary roller turret assembly at which the preliminary roller turret assembly is in meshing engagement with a dwelling portion of the roller turret cam, on the basis of output signals of the rotation angle detector; and rotating the roller shafts such that each of angular intervals between adjacent ones of the angular positions is adjusted to a nominal value of the angular pitch.

The angular intervals between the adjacent angular positions of the preliminary roller turret assembly can be readily detected by the output signals of the rotation angle detector attached to the housing of the device to detect the angle of rotation of the preliminary roller turret assembly. The angular pitch of the preliminary roller turret assembly can be established by rotating the roller shafts such that each of the angular intervals between the adjacent angular positions of the roller turret is equal to the nominal angular pitch value.

(26) A method according to the above mode (24), wherein the angular pitch adjusting step comprises rotating the roller turret cam to rotate the preliminary roller turret assembly, by an electric motor which is connected to the roller turret cam and whose angles of rotation in opposite directions can be controlled.

The roller turret cam can be readily rotated by a desired angle, by the electric motor connected thereto, so that the angular pitch adjustment is facilitated. For instance, the electric motor is commanded, by a worker or operator, to be operated to rotate the roller turret cam by an angle necessary for rotating the roller turret by an angle corresponding to the nominal angular pitch, so that the roller whose roller shaft is to be rotated to adjust the angular interval engages the roller turret cam. The electric motor is then commanded by the worker to be operated to rotate the roller turret cam by an angle necessary for rotating the preliminary roller turret assembly to bring the roller in question whose roller shaft is to be rotated, to a predetermined angular pitch adjusting position of the preliminary roller turret assembly at which the roller shaft carrying the roller in question is rotated to adjust the angular interval. After the angular interval adjustment is completed for the roller in question, the electric motor is operated in the reverse direction to rotate the roller turret cam to return the preliminary roller turret assembly to the angular position at which the roller in question engages the roller turret cam. Alternatively, the electric motor is commanded by the worker to be operated to rotate the roller turret cam by the number of revolutions necessary for rotating the preliminary roller turret assembly so that all of the rollers successively engage the dwelling portion of the roller turret cam. In this case, the angular positions of the preliminary roller turret assembly at which the individual rollers engage the dwelling portion of the roller turret cam are automatically detected.

(27) A roller turret cam index device including a roller turret cam and a roller turret which engage each other such that the roller turret cam and the roller turret are rotatable about respective two axes that are spaced apart from each other and intersect each other, wherein the roller turret comprises: a turret body having a plurality of mounting holes formed therein such that the mounting holes are arranged in a rotating direction of the turret body; a plurality of roller shafts each including a roller support portion and a stud portion eccentric with respect to the roller support portion and fitted in a corresponding one of the plurality of mounting holes; a plurality of rollers rotatably mounted on the roller support portions of the plurality of roller shafts, respectively; and fixing means provided for each of the mounting holes, for fixing the stud portion of the corresponding roller shaft to the turret body, at a desired angular position of the corresponding roller shaft.

The roller turret cam index device according to the above mode (27) has the same advantages as described above with respect to the roller turret according to the above mode (5).

The present roller turret cam index device is simpler in construction than an index device which uses a coupling device including coupling members for improved indexing accuracy of the index device. The present roller turret cam index device is advantageous in the indexing speed over the index device using the coupling device wherein the coupling members must perform engaging and releasing actions for each indexing action.

In the present roller turret cam index device, the roller turret may be rotated in a predetermined one direction or in opposite directions, and may have a single indexing pitch or two or more different indexing pitch values. A typical example of the roller turret cam index device according to the above mode (27) is an intermittently indexing device wherein the roller turret cam has a single dwelling portion, and the rollers provided on the roller turret sequentially engages the rib of the roller turret cam each time the roller turret cam is rotated through 360°, so that the roller turret is intermittently rotated in the predetermined one direction at the predetermined angular pitch. However, the roller turret cam may have a plurality of indexing portions, which may consist of or include indexing portions (helical portions) which are inclined in opposite directions. Further, the roller turret cam index device may be adapted such that changing of the rollers which engage the rib of the roller turret cam takes place two or more times during one full revolution of the roller turret cam, or such that the roller turret is rotated in the opposite directions within an angular range less than 360° of the roller turret. In the later case, the rollers need not be arranged along the entire circumference of the roller turret. Any roller turret having three or more rollers may be used in the present roller turret cam index device, which can be so called in a broad sense.

(28) A roller turret cam index device according to the above mode (27), wherein each of the plurality of roller shafts carries two mutually concentric rollers rotatably mounted on the roller support portion such that the two mutually concentric rollers are rotatable independently of each other, and the roller turret cam includes a rib having two portions which are spaced apart from each other in an axial direction of the roller turret cam and which have respective two opposite surfaces defining a groove therebetween, the two opposite surfaces of the groove being shaped such that one of the two rollers mounted on each roller shaft is engageable with one of the two opposite surfaces while the other of the two rollers is engageable with the other of the two opposite surfaces.

In the roller turret cam index device according to the above mode (28), the amount of backlash between the roller and the groove of the roller turret cam is made smaller (not larger than 5μ) than in the roller turret cam index device wherein only one roller is mounted on each roller shaft of the roller turret, as described above with respect to the above mode (23) of the invention. The backlash may be even eliminated. With the backlash being extremely small or eliminated, the roller turret cam index device can operate under a strict operating condition, with reduced vibration and noise.

(29) A method of manufacturing a roller turret type rotary motion transmitting device including a worm and a roller turret which engage each other such that the roller turret cam and the roller turret are rotatable about respective two axes that are spaced apart from each other and intersect each other, wherein the roller turret comprises: a step of preparing a turret body having a plurality of mounting holes formed therein such that the mounting holes are arranged in a rotating direction of the turret body; a step of preparing a plurality of roller shafts each including a roller support portion on which the roller is rotatably mounted, and a stud portion which is eccentric with respect to the roller support portion; a preliminary roller turret assembling step of preparing a preliminary roller turret assembly wherein each of the roller shafts is rotatably fitted at the stud portion in a corresponding one of the mounting holes; an angular pitch adjusting step of (a) installing the preliminary roller turret assembly in a jig equipped with a master roller turret cam which is identical with the worm except in that the master roller turret cam has a rib including a dwelling portion, (b) rotating the master roller turret cam to rotate the preliminary roller turret assembly, (c) detecting angular positions of the preliminary roller turret assembly at which the preliminary roller turret assembly is in meshing engagement with the dwelling portion of the master roller turret cam, and (d) rotating the roller shafts such that each of angular intervals between adjacent ones of the angular positions is adjusted to a nominal value of the angular pitch; a fixing step of fixing all of the roller shafts to the turret body after the angular pitch adjusting step, whereby the roller turret is prepared; and assembling the roller turret and the worm within a housing, to obtain the roller turret type rotary motion transmitting device.

The roller turret type rotary motion transmitting device manufactured by the method according to the above mode (29) of this invention may be a spur roller gear type rotary motion transmitting device or a face roller gear type rotary motion transmitting device. These rotary motion transmitting devices fall within the rotary motion transmitting device in a broad sense, and may be classified into a rotary motion transmitting device in a narrow sense, a speed reduction and a speed increasing device.

The roller turret type rotary motion transmitting device may serve as a roller turret type speed reducing device where the worm is used as an input device while the roller turret is used as an output device. In the speed reducing device, the ratio of the rotating speed of the roller turret as the output speed to the rotating speed of the worm as the input speed is smaller than one. Alternatively, the roller turret type rotary motion transmitting device may serve as a roller turret type speed increasing device where the roller turret is used as the input device while the worm is used as the output device. In the speed increasing device, the ratio of the rotating speed of the worm as the output speed to the rotting speed of the roller turret as the input speed is larger than one. Where the worm has a multiple-start thread or tooth (number of starts is two or more), the worm has a relatively large lead, and a rotary motion of the worm is transmitted to the roller turret at a speed ratio of one. Thus, the roller turret type rotary motion transmitting device (in a broad sense) serves as a rotary motion transmitting device in a narrow sense.

The use of the master roller turret cam having a dwelling portion to implement the angular pitch adjusting step permits easy positioning of the preliminary roller turret assembly at the angular positions determined by engagement of the rollers with the dwelling portion. The angular pitch of the preliminary roller turret assembly can be readily adjusted by rotating the roller shafts so that each of the actually detected angular intervals between the adjacent angular positions of the preliminary roller turret assembly is equal to the nominal value of the angular pitch. The roller turret whose angular pitch has been adjusted by using the jig equipped with the master roller turret cam is removed from the jig, and is assembled with the worm within the housing of the roller turret type rotary motion transmitting device. In this assembling step, there arises some degree of assembling error, which is generally negligibly small. The assembling error can be minimized where the bearings eventually incorporated in the rotary motion transmitting device to rotatably support the roller turret are installed in the jig together with the preliminary roller turret assembly. In this case, the roller turret installed in the rotary motion transmitting device does not suffer from an indexing error due to runout of the bearings, and assures a further improvement in its indexing accuracy.

(30) A roller turret type rotary motion transmitting device including a worm and a roller turret which engage each other such that the roller turret cam and the roller turret are rotatable about respective two axes that are spaced apart from each other and intersect each other, wherein the roller turret comprises: a turret body having a plurality of mounting holes formed therein such that the mounting holes are arranged in a rotating direction of the turret body; a plurality of roller shafts each including a roller support portion, and a stud portion which is eccentric with respect to the roller support portion; a plurality of rollers rotatably mounted on the roller support portions of the plurality of roller shafts, respectively; and fixing means provided for each of the mounting holes, for fixing the stud portion of the corresponding roller shaft to the turret body, at a desired angular position of the corresponding roller shaft.

The roller turret type rotary motion transmitting device according to the above mode (30) has the same advantage as described above with respect to the above mode (5), and can serve as a spur roller gear type or face roller gear type rotary motion transmitting device in a broad sense, which has a high degree of rotary motion transmitting accuracy.

(31) A roller turret type rotary motion transmitting device according to the above mode (30), wherein each of the plurality of roller shafts carries two mutually concentric rollers rotatably mounted on the roller support portion such that the two mutually concentric rollers are rotatable independently of each other, and the roller turret cam includes a rib having two portions which are spaced apart from each other in an axial direction of the roller turret cam and which have respective two opposite surfaces defining a groove therebetween, the two opposite surfaces of the groove being shaped such that one of the two rollers mounted on the each roller shaft is engageable with one of the two opposite surfaces while the other of the two rollers is engageable with the other of the two opposite surfaces.

In the roller turret type rotary motion transmitting device according to the above mode (31), the amount of backlash between the roller and the groove of the worm is made smaller (not larger than 5μ) than in the roller turret type rotary motion transmitting device wherein only one roller is mounted on each roller shaft of the roller turret, as described above with respect to the above mode (23) of the invention. The backlash may be even eliminated. With the backlash being extremely small or eliminated, the roller turret type rotary motion transmitting device can operate under a strict operating condition, with reduced vibration and noise.

(32) A roller turret type rotary motion transmitting device according to the above mode (30) or (31), further including a housing body, a bearing, and a bearing housing supported by the housing body, and wherein the roller turret further comprises a turret shaft which is rotatable with the turret body and rotatably supported by the bearing housing through the bearing such that radial and axial movements of the turret shaft and inclination of the turret shaft in all directions relative to the bearing housing are prevented, and wherein the turret body, the turret shaft, the bearing and the bearing housing constituting a sub-assembly which is removably mounted on the housing body.

In the roller turret type rotary motion transmitting device according to the above mode (32) wherein the turret body, the turret shaft, the bearing and the bearing housing constitute a sub-assembly, these components of the sub-assembly can be easily built in an assembling jig equipped with a master roller turret cam having a dwelling portion, so that those components are assembled into the sub-assembly and the angular pitch of the adjacent rollers carried by the turret body is adjusted. After the assembling operation using the assembling jig, the sub-assembly is removed from the jig, and is then mounted on the housing body of the rotary motion transmitting device. After the angular pitch adjustment of the rollers is completed, there is no need to disassemble the sub-assembly into the components, in order to assemble those components in the housing body of the rotary motion transmitting device. The present arrangement wherein the turret body, the turret shaft, the bearing and the bearing housing constitute the sub-assembly is free from deterioration of the angular pitch accuracy of the rollers due to a misalignment of the axis of the turret shaft of the roller turret relative to the bearing housing, which would arise if the turret body, turret shaft, bearing and bearing housing are disassembled after the angular pitch adjustment of the rollers using the assembling jig and are re-assembled in the housing body to obtain the rotary motion transmitting device. Although those components may be disassembled after the angular pitch adjustment and re-assembled in the housing body of the rotary motion transmitting device, the rollers can be protected from deterioration of the angular pitch accuracy, according to the present arrangement which permits the sub-assembly to be mounted on the housing body without disassembling after the angular pitch adjustment using the assembling jig. Namely, a high degree of accuracy of the angular pitch of the rollers established by the adjustment using the jig can be maintained in the rotary motion transmitting device.

In the present roller turret type rotary motion transmitting device according to the above mode (32), the turret shaft is supported by the bearing at one axial end portion thereof. However, the turret shaft may be supported by a bearing at the other axial end portion. The bearing which is one of the components of the above-indicated sub-assembly and which is disposed at one axial end portion of the turret shaft functions to establish alignment of the turret shaft (turret body) relative to the housing body of the rotary motion transmitting device in the radial and axial directions. It will be understood that an auxiliary bearing may be provided for supporting the turret shaft at the other axial end portion, when the turret shaft is subject to a relatively large load and has a relatively large mount of elastic deformation. The principle of this invention covers the provision of this auxiliary bearing.

(33) A roller turret type rotary motion transmitting device according to claim 30, wherein each of the plurality of roller shafts rotatably carries a corresponding one of the plurality of rollers, and the worm has a plurality of ribs defining a plurality of grooves, each of the grooves being defined by two opposite surfaces of adjacent ones of the ribs, the two opposite surfaces being shaped such that each of the rollers is engageable with one of the two opposite surfaces but is not engageable with the other of the two opposite surfaces.

It is desirable to increase the number of the ribs of the worm as the speed ratio of the worm and the roller turret approaches "1" (1/1). When the speed ratio is equal to "1", for example, the worm desirably has twelve ribs. Where the number of ribs which simultaneously engage the roller turret is "4" or larger, for example, only one roller supported on each roller shaft is sufficient provided at least every other rib (every second rib) of the four or more ribs is shaped such that it does not contact the two adjacent rollers on its opposite sides. In this arrangement, each roller which contacts one of the two adjacent ribs does not contact the other of these two adjacent ribs. Typically, at least every other rib of all of the initially shaped ribs is further shaped to have recessed portions in its opposite surfaces. These ribs which have the recessed portions and which do not contact the rollers do not perform any function with respect to the rollers, and merely exist between the ribs which function to transmit a rotary motion from the worm to the roller turret through the rollers. Accordingly, those ribs having the recessed portions may be entirely removed.

(34) A parallel cam index device including a plate cam unit and a zigzag type roller turret which engage each other such that the plate cam unit and the zigzag type roller turret are rotatable about respective two axes that are spaced apart from each other and are parallel to each other, the plate cam unit including a first plate cam and a second plate cam which are concentric with each other and rotatable together, and the zigzag type roller turret including a first roller turret portion and a second roller turret portion which are concentric with each other and rotatable together, the first and second turret portions including a first and a second group of rollers, respectively, the rollers of the first and the roller of the second groups being arranged alternately in a rotating direction of the zigzag type roller turret such that the rollers of the first group and the rollers of the second group are alternately located at respective two axial positions of the roller turret, the rollers of the first group engaging the first cam plate while the roller of the second group engaging the second plate cam, wherein each of the first and second roller turret portions comprises: a turret body having a plurality of mounting holes formed therein such that the mounting holes are arranged in the rotating direction of the zigzag type roller turret; a plurality of roller shafts each including a roller support portion on which a corresponding one of the rollers is rotatably mounted, and a stud portion which is eccentric with respect to the roller support portion and fitted in a corresponding one of the plurality of mounting holes; and fixing means provided for each of the mounting holes, for fixing the stud portion of the corresponding roller shaft to the turret body, at a desired angular position of the corresponding roller shaft.

The turret body of the zigzag type roller turret may consist of a single plate member or a plurality of plate members.

Where the turret body consists of a single plate member, the single plate member may be constructed to have a plurality of mounting holes formed along a circle having a center at the axis of rotation of the roller turret, and the roller shafts are fitted at their stud portions in the respective mounting holes such that the roller support portions of the roller shafts extend alternately in the opposite axial directions of the plate member (turret body). The rollers are rotatably mounted on the roller support portions of the roller shafts, so that the rollers are alternately located at respective two axial positions of the turret body. In this arrangement, the single plate serves as both the turret body of the first roller turret portion and the turret body of the second roller turret portion. Where the turret body of the zigzag type roller turret consists of a plurality of plate members, for example, three plate members, these three plate members are arranged in parallel with each other and spaced apart from each other in the axial direction of the roller turret. The roller shafts carrying the rollers of the first group are supported at their opposite ends by an intermediate one of the three plate members and one of the two outer plate members, while the roller shafts carrying the rollers of the second group are supported at their opposite ends by the intermediate plate member and the other of the two outer plate members. In this arrangement, the intermediate plate member cooperates with one and the other of the two outer plate members to constitute the first and second roller turret portions, respectively.

In the present parallel cam index device, the angular pitch of the zigzag type roller turret can be adjusted by rotating the roller shafts, so that the index device assures a high degree of angular positioning or indexing accuracy.

It is to be understood that the features of the above modes (5) through (23) may be provided in or applied to the method of manufacturing a roller turret according to any one of the above modes (1)–(4), a method of manufacturing a roller turret cam index device according to any one of the above modes (24)–(26), a roller turret type cam index device according to the above mode (27) or (28), a method of manufacturing a roller turret type rotary motion transmitting device according to the above mode (29), a roller turret type rotary motion transmitting device according to the above mode (30) or (33), and a parallel cam index device according to the above mode (34).

BRIEF DESCRIPTION OF THE DRAWINGS

The above and other objects, features, advantages and technical and industrial significance of this invention will be better understood by reading the following detailed description of presently preferred embodiments of the invention, when considered in connection with the accompanying drawings, in which:

FIG. 4 is a developed view of a globoidal cam incorporated in the globoidal cam index device of FIG. 1;

FIGS. 9A and 9B are views for explaining different angles of contact of the roller with indexing and dwelling portions of a globoidal cam, and different movement distances of the globoidal cam upon adjusting a pre-load of the roller acting on the cam;

FIG. 28 is a view for explaining a method of manufacturing the worm of FIG. 25.

DETAILED DESCRIPTION OF THE PREFERRED EMBODIMENTS

Figure 1:
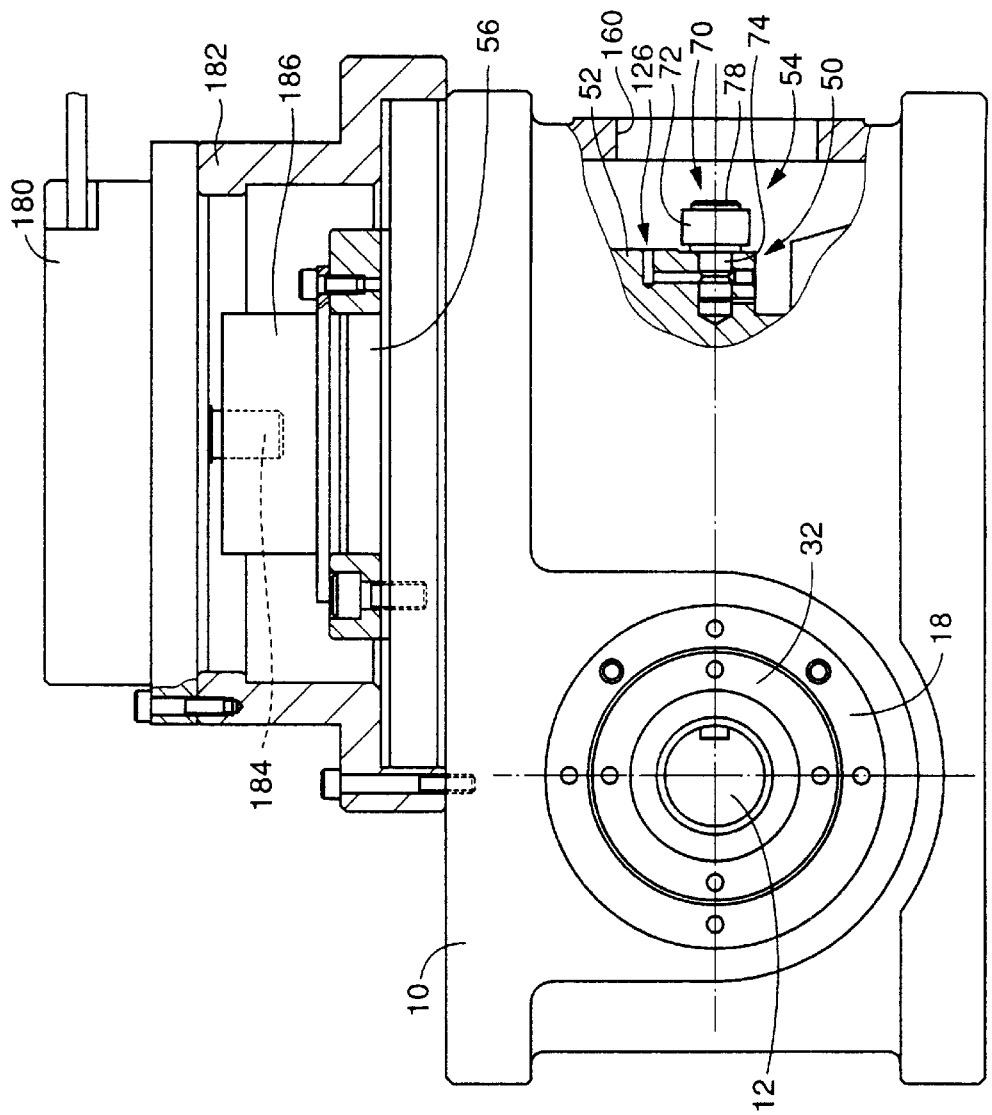
FIG. 1 is a front elevational view partly in cross section of a globoidal cam index device constructed according to one embodiment of this invention and including a rotation angle detector.
Figure 2:
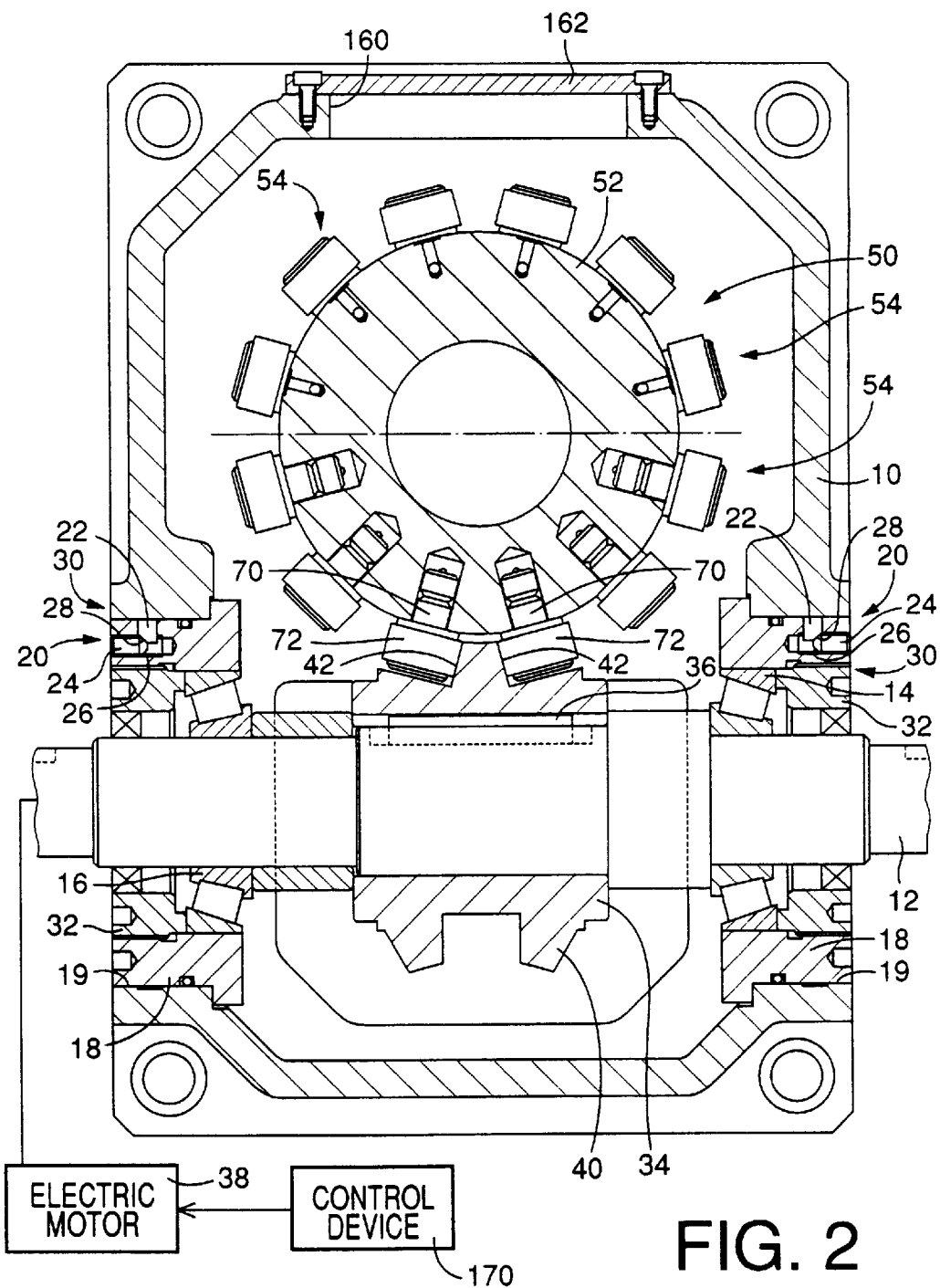
FIG. 2 is a plan view in cross section of the globoidal cam index device of FIG. 1.
Figure 3:
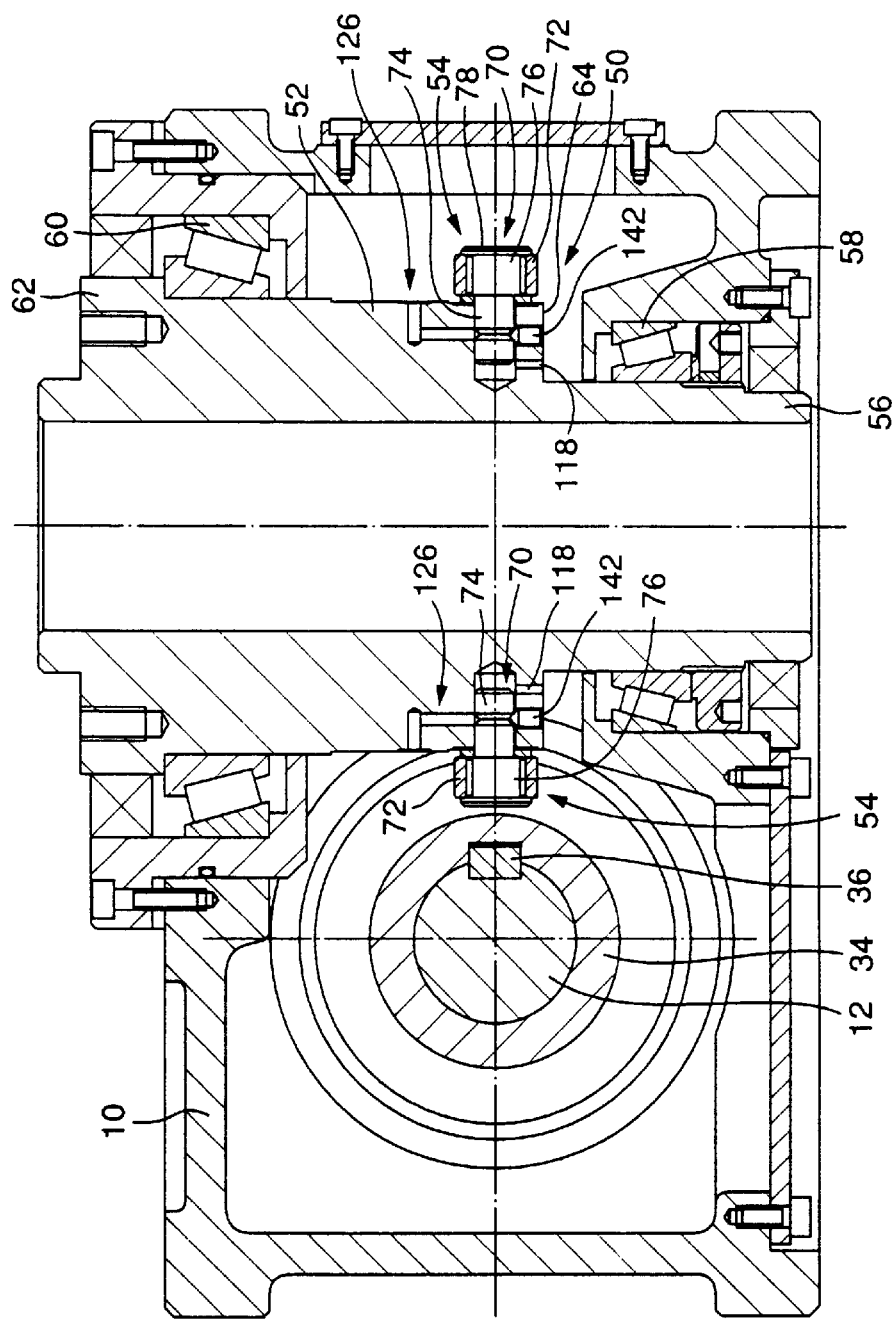
FIG. 3 is a front elevational view in vertical cross section of the globoidal cam index device.

Referring first to FIGS. 1–3, there is shown a globoidal cam index device. In these figures, reference numeral 10 denotes a housing on which there is rotatably mounted a cam shaft 12 via bearings 14, 16 as shown in FIG. 2. The cam shaft 12 functions as an input shaft of the globoidal cam index device. The bearings 14, 16 are tapered roller bearings, which are one type of roller bearings. The tapered roller bearings 14, 16 are adapted to receive both a thrust load and a radial load.

The bearings 14, 16, which are supported by the housing 10 through respective eccentric collars 18, support the cam shaft 12 rotatably at two positions which are spaced apart from each other in the axial direction of the cam shaft 12. Each of the two eccentric collars 18 is a ring-shaped member and has inner and outer circumferential surfaces which are eccentric with respect to each other and whose centers are offset from each other in the radial direction. The eccentric collars 18 are fitted in respective fitting holes 19 formed in the housing 10. By rotating the eccentric collars 18, the axis of the cam shaft 12 is moved in the radial direction, so that a distance between the axis of the cam shaft 12 and an axis of rotation of a roller gear 50 (which will be described) is changed or adjusted.

After the adjustment of the distance indicated above, the eccentric collars 18 are fixed in the housing 10 by respective locking devices 20. As shown in FIG. 3, each of the locking devices 20 includes an engaging member 22 and threaded member 24. The engaging member 22 engages the eccentric collar 18 such that the engaging member 22 is movable in the radial direction of the eccentric collar 18. The threaded member 24 is screwed in a tapped hole formed in the eccentric collar 18 such that the threaded member 24 is movable in the axial direction of the eccentric collar 18 by rotation of the threaded member 24. The threaded member 24 has a tapered surface 26 at an inner end thereof, while the engaging member 22 has an inclined surface 28. The threaded member 24 is engageable at its tapered surface 26 with the inclined surface 28 of the engaging member 22 when the threaded member 24 is moved inwardly of the eccentric collar 18. As the threaded member 24 is moved inwardly with its tapered surface 26 in contact with the inclined surface 28, the engaging member 22 is pushed radially outwardly of the eccentric collar 18 and is forced onto the housing 10, whereby the eccentric collar 18 is fixed to the housing 10.

It will be understood that the eccentric collars 18 serve as a center distance adjusting member for adjusting the distance between the axis of the cam shaft 12 and the axis of the roller gear 50, and cooperate with the locking devices 20 to constitute a center distance adjusting device 30 for adjusting the distance indicated above.

Adjusting screws 32 are screwed in the respective two eccentric collars 18, for thereby preventing the outer races of the bearings 14, 16 from being removed. By adjusting the axial positions of the adjusting screws 32 relative to the eccentric collars 18, it is possible to adjust a pre-load acting on the tapered rollers of each bearing 14, 16, and the axial position of a globoidal cam 34 which is mounted on the cam shaft 12 as described below. It will be understood that the two adjusting screws 32 constitute a pre-load adjusting device for adjusting the pre-load of the bearings 14, 16, and an axial shaft position adjusting device for adjusting the axial position of the cam shaft 12.

A roller turret cam or roller gear cam in the form of the globoidal cam 34 is mounted on an axial portion of the cam shaft 12 located between the two bearings 14, 16 such that the globoidal cam 34 is neither rotatable nor axially movable relative to the cam shaft 12. A key 36 is interposed between the cam shaft 12 and the globoidal cam 34, to prevent relative rotation of the cam shaft 12 and the globoidal cam 34, so that a rotary motion of the cam shaft 12 is transmitted to the globoidal cam 34. Thus, the key 36 serves as a relative movement preventing means for preventing the relative rotation and axial movement between the cam shaft 12 and the globoidal cam 34, and a rotary motion transmitting means for transmitting the rotary motion of the cam shaft 12 to the globoidal cam 34.

The cam shaft 12 is rotated by an electric motor 38 equipped with a brake shown in FIG. 2. The electric motor 38 is a rotary-motion electric motor which is one type of electric motors serving as a drive power source. The electric motor 38 is controlled (turned on and off) by a control device 170 also shown in FIG. 2. The control device 170 is constituted principally by a computer. A detector device in the form of a limit switch (not shown) is provided to detect a predetermined angular position of the globoidal cam 34 (at which the roller gear 40 engages a dwelling portion 49 of the globoidal cam 34). The electric motor 38 is turned off in response to an output signal of the limit switch so that the rotation of the globoidal cam 34 is stopped at the predetermined angular position. A detector device other than the limit switch, for instance, a photoelectric switch may be used for detecting the predetermined angular position of the globoidal cam 34.

The globoidal cam 34 has a rib 40 formed on its outer circumferential surface, as shown in FIG. 2. The rib 40 has opposite rib surfaces 42 each of which is tapered following a taper which is defined by the outer circumferential surfaces of two adjacent rollers 72 (which will be described) of the roller gear 50 when the two adjacent rollers 74 simultaneously contact the opposite rib surfaces 42, as indicated in FIG. 2. As shown in FIG. 4, which is a developed view of the globoidal cam 34, the rib 40 includes two helical or lead portions 44 and one radial or non-lead portion 46. The helical portions 44 are inclined relative to a plane perpendicular to the axis of the globoidal cam 34, and has the corresponding lead angle with respect to that plane, while the radial portion 46 extends in the radial direction of the globoidal cam 34, and does not have a lead angle. The two helical portions 44 are formed at respective to axial end portions of the globoidal cam 44, and are spaced apart from each other in the axial direction so as to define a groove 48 therebetween.

When the globoidal cam 34 is rotated by meshing engagement with the roller gear 50, the roller gear 50 is rotated while the rollers 72 engage the helical portions 44, and is held stationary while the rollers 72 engages the radial portion 46. In this sense, the axial portion of the globoidal cam 34 at which the helical portions 44 are formed is referred to as "an indexing portion 47", while the portion of the cam 34 at which the radial portion 46 is formed is referred to as "a dwelling portion 49". The globoidal cam 34 used in the present embodiment is a single dwell type globoidal cam wherein only one radial portion 46 is provided in the dwelling portion 49. The helical or lead portions 44 and the radial or non-lead portion 46 may be considered to be the indexing and dwelling portions, respectively.

As shown in FIGS. 2 and 3, a roller turret in the form of the roller gear 50 indicated above is incorporated in the housing 10 such that the roller gear 50 is in meshing engagement with the globoidal cam 34. The roller gear 50, which is a spur roller gear, includes a turret body 52, and a plurality of cam followers 54, namely, 12 cam followers 54, in this specific embodiment. The turret body 52 is formed concentrically or coaxially and integrally with a roller turret shaft in the form of a roller gear shaft 56, as shown in FIG. 3. The turret body 52 is provided by an axially intermediate portion of the roller gear shaft 56, which is rotatably supported by the housing 10 via two bearings 58, 60, such that the axis of the roller gear shaft 56 is perpendicular to the axis of the cam shaft 12. The roller gear shaft 56 serves as an output shaft. Thus, the globoidal cam 34 and the roller gear 50 which mesh with each other are disposed rotatably about the respective axes which are perpendicular to and spaced apart from each other.

The roller gear shaft 56 has an axial end portion which extends axially outwardly from the bearing 60 and which has a radially outwardly extending flange portion 62. The other axial end portion at which the roller gear shaft 56 is supported by the bearing 58 has a smaller diameter than the turret body 52. Between this other axial end portion and the turret body 52, there is provided a shoulder surface 64 which extends in the radial direction of the roller gear shaft 56.

The 12 cam followers 54 have the same construction, and are supported on the turret body 52 in the same manner.

As shown in FIG. 50A, each of the cam followers 54 includes a roller shaft 70 and the above-indicated roller 72 rotatably supported on the roller shaft 70. The roller shaft 70, which is a stepped cylindrical member, includes a stud portion 74, a roller support portion 76 having a larger diameter than the stud portion 74, and a head portion 78 having a larger diameter than the roller support portion 76. The roller support portion 76 is located between the stud portion 74 and the head portion 78, and there is provided a shoulder surface in the form of an abutting surface 80 between the stud portion 74 and the roller support portion 76. This abutting surface 80 faces in the axial direction from the roller support portion 78 toward the distal end of the stud portion 74.

While the roller support portion 76 and the head portion 78 are concentric with each other, the roller support portion 76 and the stud portion 74 are eccentric with respect to each other. The stud portion 74 has an annular groove in the form of an annular Vee-groove 84 formed in an axially intermediate portion of an outer circumferential surface 82 thereof. One of the opposite surfaces defining the Vee-groove 84 which is located on the side of the distal end of the stud portion 74 (which is remote from the roller support portion 76) is a tapered surface 90 which is inclined such that the distance of the tapered surface 90 to the distal end of the stud portion 74 in the axial direction of the stud portion 74 is larger at the outer end of the tapered surface 90 as seen in the radial direction of the stud portion 74, than at the inner end of the tapered surface 90.

Figure 8:
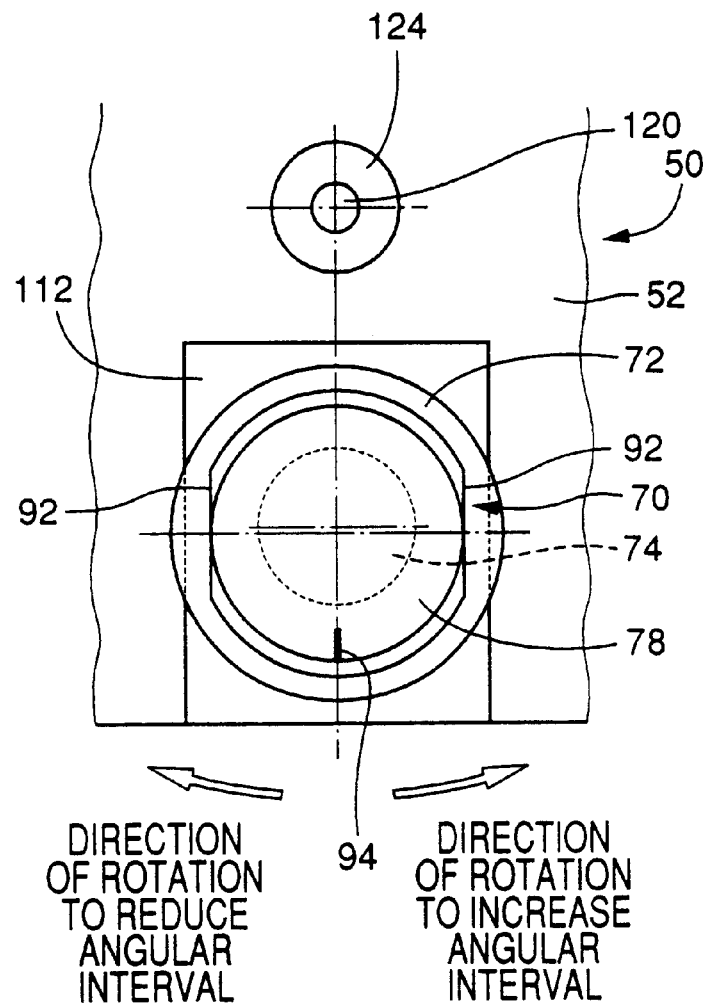
FIG. 8 is an elevational view showing the roller shaft and the roller together with an adhesive filler inlet.

The head portion 78, which is concentric with the roller support portion 76, has two parallel engaging faces 92, as shown in FIG. 8. These two parallel engaging faces 92 are formed by cutting off respective two circumferential portions of the head portion 78 which are opposite to each other in a diametric direction of the head portion 78 perpendicular to a direction of eccentricity (vertical direction as seen in FIG. 8) in which the roller support portion 76 is eccentric with respect to the stud portion 74. The thus formed two parallel engaging faces 92 are parallel to the direction of eccentricity indicated above. The end face of the head portion 78 has an eccentricity direction indicator 94 which indicates the direction of eccentricity of the roller support and stud portions 76, 74. This indicator 94 is a straight line segment which extends in the radial direction of the head portion 78 parallel to the direction of eccentricity and which is located near the periphery of the head portion 78. More specifically described, the indicator 94 is located at one of two circumferential positions of the head portion 78 which are opposite to each other in the diametric direction parallel to the direction of eccentricity. The above-indicated one of the two circumferential positions of the head portion 78 is more distant from the axis of the stud portion 74 than the other circumferential position. Namely, the indicator 94 is located at the lowermost circumferential position of the head portion 78 as seen in FIG. 8.

The roller 72 is rotatably mounted on the outer circumferential surface of the roller support portion 76 through a plurality of rollers in the form of a cylindrical array of needle rollers 98 interposed therebetween. It can be said that the array of needle rollers 98 cooperates with the radially inner portion of the roller 72 and the radially outer portion of the roller support portion 76 to constitute a roller bearing for rotatably supporting the roller 72 (radially outer portion thereof) on the roller support portion 76. In this sense, the radially outer portion of the roller support portion 76 and the radially inner portion of the roller 72 may be considered to function as the inner and outer races of the roller bearing.

The stud portions 74 of the roller shafts 70 are fixedly received in respective mounting holes 110 formed in the turret body 52. In the present embodiment wherein the 12 cam followers 54 are used, the 12 mounting holes 110 are formed in the turret body 52 such that the mounting holes 110 are equiangularly spaced apart from each other in the circumferential or rotating direction of the turret body 52, and such that the mounting holes 110 extend in the radial direction of the turret body 52. All of the 12 mounting holes 110 have the same dimensions. Each of the mounting holes 110 is a blind hole having a circular shape in transverse cross section, extending in the radial direction of the turret body 52 and open in the outer circumferential surface of the turret body 52.

Figure 5A:
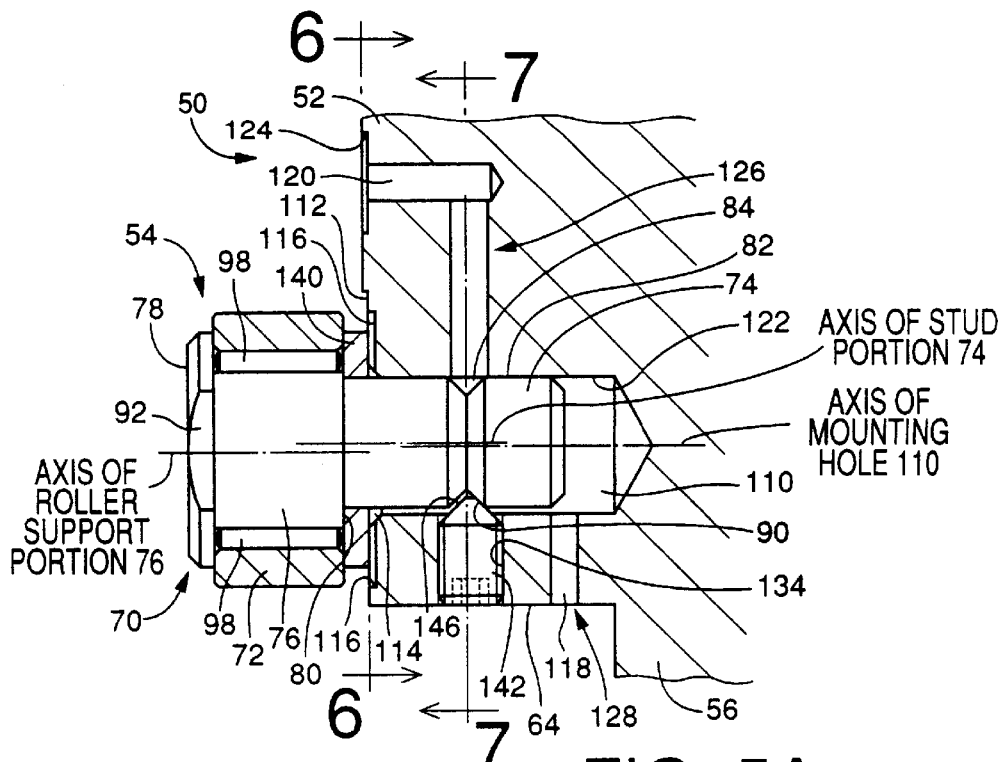
FIGS. 5A and 5B are front elevational views in cross section of a roller shaft and a roller in the device of FIG. 1.
Figure 6:
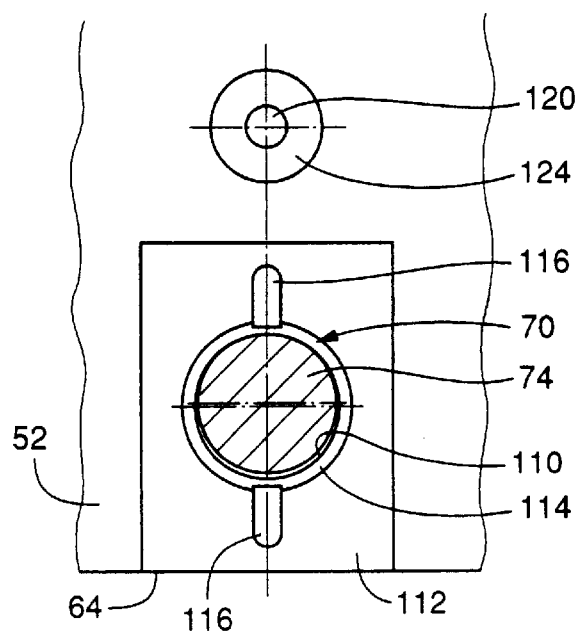
FIG. 6 is a cross sectional view of the roller shaft taken along line 6—6 of FIG. 5A in a plane tangent to the outer circumferential surface of a roller turret in the device of FIG. 1.

The outer circumferential surface of the turret body 52 is cut at portions thereof in which the respective mounting holes 110 are open, so that flat seats 112 are provided corresponding to the mounting holes 110. As a result, the outer profile of the turret body 52 in transverse cross section at the axial position at which the mounting holes 110 are formed includes 12 straight portions which correspond to the respective flat seats 112 and which are equiangularly spaced apart from each other along a circle which has a center on the axis of the turret body 52, as shown in FIG. 2. The mounting holes 110 are open in the respective flat seats 112. As shown in FIG. 5A and FIG. 6, each mounting hole 110 is chamfered at its open end to provide an annular recessed portion in the form of a chamfer portion 114, which communicates with a pair of air breather grooves 116 formed in the flat seat 112. The two air breather grooves 116 extend in the radial direction of the mounting hole 110, and are opposed to each other in the diametric direction of the mounting hole 110 which is parallel to the axial direction of the roller gear 50 (turret body 52). The air breather grooves 116 are open to the atmosphere at their ends remote from the annular chamfer portion 114. Thus, the air breather grooves 116 serve as a first air passage for communication of the mounting hole 110 with the atmosphere through the annular chamfer portion 114.

The turret body 52 further 12 air breather holes 118 each of which communicates at one end thereof with a bottom portion of each mounting hole 110 and is open at the other end in the shoulder surface 64 indicated above, as shown in FIG. 5A. The air breather hole 118 serves as a second air passage for communication of the bottom portion of the mounting hole 110 with the atmosphere.

The turret body 52 further has 12 communication passages 120 each of which is provided for communication of the annular Vee-groove 84 of the stud portion 74 of each roller shaft 70 with the atmosphere when the roller shaft 70 is fixed at its stud portion 74 in the mounting hole 110. Each communication passage 120 is open at one end thereof in the outer circumferential surface of the turret body 52, and at the other end in an inner circumferential surface 122 of the mounting hole 110. The communication passage 120 consists of a radial portion which extends in the radial direction of the turret body 52 and is open in the outer circumferential surface of the turret body 52, and an axial portion which extends in the axial direction of the turret body 52 and is open in the inner circumferential surface 122. The open end of the axial portion of the passage 120 is located such that the innermost edge of the open end as seen in the radial direction of the turret body 52 is offset in the radially inner direction by a small distance from the tapered surface 90 of the Vee-groove 84 when the stud portion 74 is correctly fitted in the mounting hole 110, as shown in FIG. 5A. The area of the outer circumferential surface of the turret body 52 in which the radial portion of the passage 120 is open is recessed to provide an adhesive filler inlet 124.

It will be understood that the Vee-groove 84 and the communication passage 120 cooperate to provide an adhesive filler passage 126, and that the chamfer portion 114, the first air passage in the form of the air breather grooves 116 and the second air passage in the form of the air breather hole 118 cooperate to provide an air breather passage.

Figure 7:
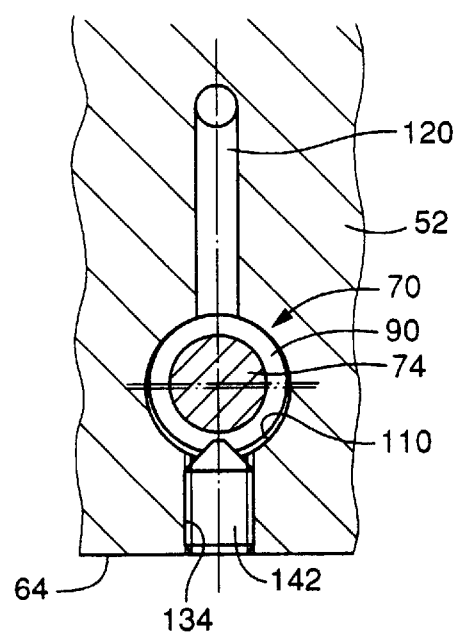
FIG. 7 is a cross sectional view of the roller shaft taken along line 7—7 of FIG. 5A in a plane parallel to an annular Vee-groove formed in the circumferential surface of the roller shaft.

As shown in FIGS. 5A and 7, the turret body 52 further has a tapped hole 134 formed in the axial direction thereof and in the radial direction of the mounting hole 110. The tapped hole 134 is open at one end thereof in the shoulder surface 64, and at the other end to the mounting hole 110 at a circumferential position thereof which is opposite to the open end of the axial portion of the communication passage 120 in the diametric direction of the mounting hole 110. The tapped hole 134 is concentric with the axial portion of the communication hole 120, as shown in the cross sectional views of FIGS. 5A and 7. Namely, the open end of the tapped hole 134 is also located such that the innermost edge of the open end as seen in the radial direction of the turret body 52 is offset in the radially inner direction by a small distance from the tapered surface 90 of the Vee-groove 84 when the stud portion 74 is correctly fitted in the mounting hole 110.

Each roller shaft 70 carrying the roller 72 rotatably mounted on its roller support portion 76 and a thrust piece 140 fitted on the stud portion 74 is fitted in the mounting hole 110 at its stud portion 74, and is fixed to the turret body 52 by a setscrew 142 screwed in the tapped hole 134. The chamfer portion 114 serves as a guide for facilitating insertion of the stud portion 74 into the mounting hole 110. The thrust piece 140 has an outside diameter which is larger than the inside diameter of the roller 72 and smaller than the outside diameter of the roller 72, so that only the radially inner portion of the roller 72 contacts the thrust piece 140, whereby the friction resistance of the thrust piece 140 to a rotary motion of the roller 72 is made relatively small.

The setscrew 142 has a tapered surface 146 at its end. The tapered surface 146 has the same taper angle as the tapered surface 90 of the Vee-groove 84. The setscrew 142 screwed in the tapped hole 134 in the turret body 52 has an axis extending in the radial direction of the mounting hole 110. Since the open end of the tapped hole 134 and the tapered surface 90 are offset from each other in the axial direction of the mounting hole 110, a radial movement of the setscrew 135 with its tapered surface 142 in sliding contact with the tapered surface 90 as shown in FIG. 5A will cause an axial movement of the stud portion 74 in the radially inward direction of the turret body 52, as well as application of a force to the stud portion 74 in its radial direction thereby forcing the stud portion 74 onto the inner circumferential surface 122 of the mounting hole 110 as shown in FIG. 7. Thus, the roller shaft 70 is positioned relative to the turret body 52 in both of the axial and radial directions. The stud portion 74 is forced by the setscrew 142 at a circumferential portion thereof onto the inner circumferential surface 122 in the axial direction of the roller gear 50 (turret body 52). As shown in FIG. 6, one of the two air breather grooves 116 extending in the axial direction of the roller gear 50 communicates with a circumferential portion of the annular chamfer portion 114 which corresponds to the above-indicated circumferential portion of the stud portion 74 at which the stud portion 74 is forced onto the inner circumferential surface 122. The other air breather groove 116 communicates with a circumferential portion of the chamfer portion 114 at which the stud 74 is not forced onto the inner circumferential surface 122.

With the stud portion 74 of the roller shaft 70 being axially moved into the mounting hole 110 by the setscrew 142 in the radially inward direction of the turret body 52, the thrust piece 140 is squeezed between the abutting surface 80 of the roller shaft 70 and the flat seat 112 of the turret body 52. Since the flat seat 112 is a flat surface, the abutting surface 80 is stably seated on the flat seat 112 through the thrust piece 140. The roller 72 and the array of needle rollers 98 are sandwiched between the head portion 78 of the roller shaft 70 and the thrust piece 140, with small amounts of axial gap or clearance therebetween, so as to permit rotation of the roller 72 and needle rollers 98 while substantially inhibiting axial movements of the roller 72 and array of needle rollers 98.

Figure 5B:
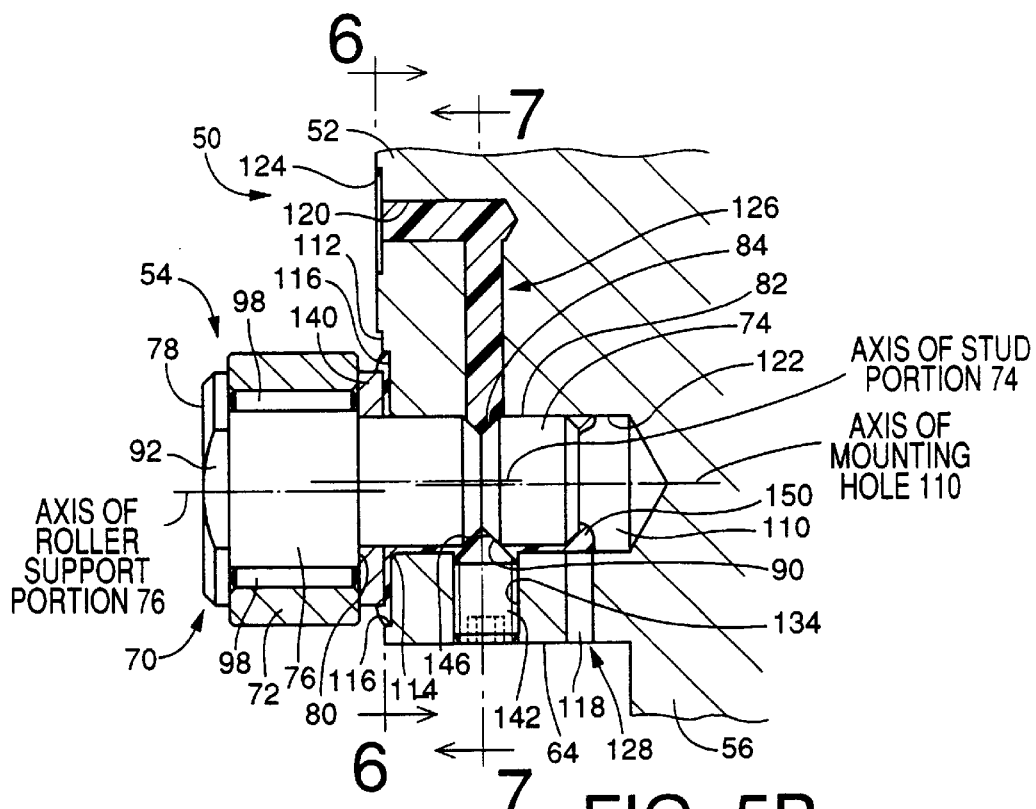

Each roller shaft 70 of the 12 cam followers 54 is fixed to the turret body 52 by the setscrew 142 after the angular pitch between the adjacent rollers 72 is adjusted as described below in detail. Then, a clearance or gap between the outer circumferential surface 82 of the stud portion 74 and the inner circumferential surface 122 of the mounting hole 110 is filled with a filler material in the form of an adhesive agent 150, as shown in FIG. 5B, so that the roller shaft 70 is bonded at its stud portion 74 to the turret body 52. In the present embodiment, a material called "LOCK TIGHT" (trade name) available from Nihon Lock Tight Kabushiki Kaisha (Japan) is used as the adhesive agent 150. The LOCK TIGHT is an anaerobic adhesive which is hardened at room temperature in the absence of air. The present embodiment uses LOCK TIGHT 290 in a liquid phase having a relatively low viscosity, which includes dimethacrylate ester as a major component.

It will be understood that the adhesive agent 150 and the setscrew 142 serve as fixing means for fixing the roller shaft 70 at its stud portion 74 at a desired angular position. It is noted that the gap between the outer circumferential surface 82 of the stud portion 74 and the inner circumferential surface 122 of the mounting hole 110 is shown in FIGS. 5A and 5B, as being larger than the actual amount.

In the globoidal cam index device according to the present embodiment of the invention, the axes of rotation of the rollers 72 extend in the radial direction of the roller gear 50 and are perpendicular to the axis of rotation of the roller gear 50. The globoidal cam 34 (cam shaft 12) and the roller gear 50 are positioned relative to each other such that a plane which is perpendicular to the axis of rotation of the roller gear 50 and which includes the axes of the rollers 72 also includes the axis of rotation of the globoidal cam 34. As the globoidal cam 34 is rotated by the drive source in the form of the electric motor 38, the two or three rollers 72 of the 12 rollers 72 are sequentially brought into meshing engagement with the rib 40 of the globoidal cam 34. Since the globoidal cam 34 is a single thread cam, one full rotation of the globoidal cam 34 will cause one of the rollers 72 which have been in meshing engagement with the rib 40, to be released from the globoidal cam 34, and cause another roller 72 to come into meshing engagement with the rib 40. While the roller gear 50 meshes with the dwelling portion 49 of the globoidal cam 34, the two adjacent rollers 72 engage the opposite surfaces 42 of the rib 40, as indicated in FIG. 4. While the roller gear 50 meshes with an intermediate part of the indexing portion 47 of the globoidal cam 34, the three adjacent rollers 72 engage the rib 40, as also indicated in FIG. 4. The intermediate one of the three adjacent rollers 72 engages the groove 48 defined by the helical or lead portions 44 of the rib 40, while the other two non-intermediate rollers 72 engage the surfaces 42 of the helical portions 44 which are opposite to their surfaces 42 defining the groove 48.

For permitting the intermediate one of the three adjacent rollers 72 to move in the groove 48, the diameter of the rollers 72 must be made smaller than the width of the groove 48, so that a clearance is left between the outer circumferential surface of the roller 72 and the opposite surfaces 42 of the groove 48. However, the presence of this clearance causes clearances between the other two rollers 72 and the surfaces 42 of the helical portions 44 which are opposite to the surfaces 42 defining the groove 48. Further, there are left clearances between the two rollers 72 and the radial or non-lead portion 46 of the rib 40. These clearances at the dwelling portion 49 of the cam 34 lower the angular positioning or indexing accuracy of the roller gear 50. In view of these drawbacks, the present globoidal cam index device is provided with the center distance adjusting device 30 for radially shifting the axis of the globoidal cam 34 toward the axis of the roller gear 50, to adjust the distance between the axes of the roller gear 50 and the globoidal cam 34, such that the two rollers 72 of the three adjacent rollers 72 engage the surfaces 42 of the helical portions 44 of the rib 40 in the indexing portion 47, while the two adjacent rollers 72 engage the opposite surfaces 42 of the radial portion 46 of the rib 40 in the dwelling portion 49.

As indicated in FIGS. 9A and 9B, an angle of contact $\theta_1$ of the roller 72 with the helical portions 44 of the rib 40 in the indexing portion 47 (FIG. 9A) of the globoidal cam 34 is larger than an angle of contact $\theta_2$ of the roller 72 with the radial portion 46 of the rib 40 in the dwelling portion 49 (FIG. 9B) of the cam 34. Since a clearance $\gamma$ between the roller 62 and the surface 42 of the rib 40 in the indexing portion 47 is the same as that in the dwelling portion 49, a distance $L_1$ of radial movement of the globoidal cam 34 required for engagement of the roller 72 with the helical portions 44 in the indexing portion 47 is smaller than a distance $L_2$ of radial movement of the cam 34 required for engagement of the roller 72 with the radial portion 46 in the dwelling portion 49.

The distances $L_1$ and $L_2$ of radial movements of the globoidal cam 34 are calculated according to the following equations (1) and (2), respectively:

$$L_1 = \gamma / \sin \theta_1 \quad (1)$$

$$L_2 = \gamma / \sin \theta_2 \quad (2)$$

In the present embodiment wherein the 12 rollers 72 are equiangularly arranged on the roller gear 50 in its circumferential direction, the angular pitch of the rollers 72 is 30°. Accordingly, the angle between the axes of the two non-intermediate rollers 72 of the three adjacent rollers 72 in the indexing portion 47 of the globoidal cam 34 is 60°, and the angle of contact $\theta_1$ of each of these two rollers 72 with the corresponding helical portion 44 of the rib 40 in the indexing portion 47 is 30°, as indicated in FIG. 9A. The angle between the axes of the two adjacent rollers 72 in the dwelling portion 49 of the cam 34 is 30°, and the angle of contact $\theta_2$ of each of these two rollers 72 with the radial portion 46 of the rib 40 in the dwelling portion 49 is 15°, as indicated in FIG. 9B. Therefore, $\sin\theta_1$, is larger than $\sin\theta_2$, and the distance $L_1$ is smaller than the distance $L_2$.

If the axis of the globoidal cam 34 is radially shifted by the distance $L_2$ to bring the two adjacent rollers 72 into contact with the opposite surfaces 42 of the radial portion 46 of the rib 40 in the dwelling portion 49 of the cam 34, the pre-load of the two non-intermediate rollers 72 of the three adjacent rollers 73 which acts on the helical portions 44 in the indexing portion 46 of the cam 34 is excessively large, disturbing smooth rolling of those two non-intermediate rollers 72 on the surfaces 42 of the helical portions 44. If the axis of the cam 34 is radially shifted by the distance $L_1$ to bring the two non-intermediate rollers 72 into contact with the helical portions 44 in the indexing portion 47, there is still left some amount of clearance between the two adjacent rollers 62 and the radial portion 46 in the dwelling portion 49, so that the angular positioning or indexing accuracy of the roller gear 50 is not improved to a satisfactory extent.

The globoidal cam index device is required to assure a high degree of angular positioning accuracy of the roller gear 50. In the present embodiment, local portions of the surfaces 42 of the helical portions 44 which are opposite to the surfaces 42 defining the groove 48 are formed into approximately ideal profiles, by an automatic machining operation according to an appropriate machining control program, so as to prevent an excessive pre-load of the two non-intermediate rollers 72 on those machined surfaces 42 of the helical portions 44 when the axis of the globoidal cam 34 is radially shifted toward the axis of the roller gear 50 by the center distance adjusting device 30 to establish an optimum distance between the axes of the roller gear 50 and the globoidal cam 34 so that the two adjacent rollers 72 contact the surfaces 42 of the radial portion 46 of the rib 40 with an optimum amount of pre-load acting on the radial portion 46, so as to eliminate a backlash therebetween. To meet the above requirement, the surfaces 42 of the helical portions 44 which are opposite to the surfaces 42 defining the groove 48 may be locally subjected to a manual grinding operation rather than the automatic machining operation according to the machining control program.

When the three adjacent rollers 72 engage the intermediate part of the indexing portion 47 of the globoidal cam 34, the axis of the intermediate one of these three rollers 72 which engages the groove 48 is parallel to the direction in which the axis of the cam 34 is shifted toward and away from the roller gear 50 by the center distance adjusting device 30, namely, the angle of contact of the intermediate roller 72 with the rib 40 is zero, so that a shifting of the globoidal cam 34 toward the roller gear 50 will not change the amount of clearance between the intermediate roller 72 and the surfaces 42 defining the groove 48. As the point of contact of the intermediate roller 72 with the opposite surfaces 42 defining the groove 48 is moved from the intermediate part of the indexing portion 47 toward the ends of the indexing portion 47, the angle of contact of the intermediate roller 72 with one of the opposite surfaces 42 changes from zero in the negative direction, while that of the intermediate roller 72 with the other of the opposite surfaces 42 changes from zero in the positive direction. A shifting of the axis of the globoidal cam 34 toward the axis of the roller gear 50 by the center distance adjusting device 30 will merely cause the intermediate roller 72 to be moved away from the above-indicated one of the opposite surfaces 42 of the groove 48, and will not cause the angle of contact of the intermediate roller 72 with the other surface 42 of the groove 48 to exceed the angle of contact of the two adjacent rollers 72 with the surfaces 42 of the radial portion 46. Accordingly, the shifting of the globoidal cam 34 will not cause an excessive amount of pre-load of the intermediate roller 72 acting on the opposite surfaces 48 of the groove 48.

As shown in FIGS. 1 and 2, the housing 10 has a window 160 formed on one of diametrically opposite sides of the axis of the roller gear 50 which is remote from the point of engagement of the roller gear 50 with the globoidal cam 34. That is, the window 160 is located at a position corresponding to a pitch adjusting circumferential position of the roller gear 50 which is 180°-spaced from the point of engagement of the roller gear 50 wit the cam 34 in the circumferential direction of the roller gear 50. As described below, when the circumferential position of the desired roller shaft 70 is adjusted to adjust the pitch of the adjacent rollers 72, the roller gear 50 is rotated until the corresponding cam follower 54 is located at the pitch adjusting position, so that the roller shaft 70 is accessed through the window 160. The window 160 is normally closed by a closure plate 162.

There will next be described a method of manufacturing the roller gear 50 and the globoidal cam index device which are constructed as described above. Initially, the turret body 52 having the 12 mounting holes 110, and the 12 cam followers 54 including the roller shafts 70 each carrying the roller 72 rotatably mounted on the roller support portion 76 are prepared. The manufacture of the roller gear 50 includes a step of preparing the turret body 52, and a step of preparing the cam followers 54. Accordingly, the manufacture of the globoidal cam index device includes those steps of preparing the turret body 52 and the cam followers 54.

Then, a preliminary roller turret assembly in the form of a preliminary roller gear assembly is prepared by attaching the prepared 12 cam followers 54 such that the 12 roller shafts 70 are rotatably fitted at their stud portions 74 in the respective mounting holes 110. Thus, the manufacture of the roller gear 50 and the manufacture of the globoidal cam index device include a preliminary assembling step of preparing the preliminary roller turret assembly (preliminary roller gear assembly). In this step, the stud portion 74 of each roller shaft 70 is inserted into the mounting hole 110, and is fixed to the turret body 52 by screwing the setscrew 142 into the tapped hole 134, for forcing the stud portion 74 against the inner circumferential surface 122 of the mounting hole 110. At this time, each roller shaft 70 is located at the predetermined original circumferential position in which the eccentricity direction indicator 94 extends in the axial direction of the roller gear 50 and is located at the lowermost circumferential position of the head portion 78, as shown in FIG. 8. In this original circumferential position of the roller shaft 70, the nominal angular pitch of the rollers 72 is established, and the amount of adjustment of the angular pitch of the rollers 72 that can be made is maximum in both of the increasing and decreasing directions. With the roller shaft 70 fixed to the turret body 52 with the setscrew 142 held in pressing contact with the stud portion 74, the roller shaft 70 is held stationary with high stability while the roller gear 50 is rotated under a non-load condition.

The step of preparing the preliminary roller gear assembly is followed by a step of preparing a preliminary index device, wherein the prepared preliminary roller gear assembly and the globoidal cam 34 are built in the housing 10. Initially, the globoidal cam 34 is mounted on the cam shaft 12 with the key 36 interposed therebetween to prevent relative rotation of the cam 34 and the shaft 12. Then, the cam shaft 12 with the globoidal cam 34 is rotatably supported in the housing 10 through the bearings 14, 16, and the roller gear shaft 56 integral with the turret body 52 is rotatably supported in the housing 10 through the bearings 58, 60, such that the roller gear 50 meshes with the globoidal cam 34. Subsequently, the eccentric collars 18 are rotated to adjust the distance between the axes of the roller gear 50 and the globoidal cam 34, while the adjusting screws 32 are rotated to adjust the axial position of the globoidal cam 34, so that the rollers 72 contact the rib 40 with a suitable amount of pre-load, and without a clearance over the entire axial dimension of the rollers 72. The axial position of the globoidal cam 34 can be adjusted by alternately rotating the two adjusting screws 32 in a plurality of steps, by a small angle in each step, so that the globoidal cam 34 is slowly moved in the appropriate one of the opposite axial directions. After the distance between the axes of the globoidal cam 34 and the roller gear 50 and the axial position of the globoidal cam 34 have been suitably adjusted, the eccentric collars 18 are fixed to the housing 10 in position by the locking devices 20, and the adjusting screws 32 are fixed to the housing 10 by suitable locking means.

Then, an angular pitch adjusting step of adjusting the angular pitch between the adjacent rollers 72 is implemented. To implement to this pitch adjusting step, a rotation angle detector in the form of an encoder 180 is attached the housing 10 via a bracket 182, for detecting an angle of rotation of the roller gear shaft 56, as shown in FIG. 1. The encoder 180 includes an input shaft 184 which is connected to a coupling 186 fixed to the roller gear shaft 56, so that the input shaft 184 is rotated with the roller gear shaft 56.

In this condition, a worker assigned to implement the pitch adjusting step rotates the cam shaft 12, so that the 12 rollers 72 sequentially engage the rib 40 of the globoidal cam 34. The roller gear 50 is stopped at 12 angular positions during one full rotation thereof. When any two adjacent rollers 72 on the roller gear 50 have come into engagement with the radial portion 46 of the rib 40 in the dwelling portion 49 of the cam 34, the rotation of the cam shaft 12 is stopped. Then, the worker reads and records the output of the encoder 180, which is indicated on a suitable digital display and which represents the angle of rotation of the roller gear 50 from a predetermined reference angular position. The angle is digitally indicated on the display in units of degree (°), minute (') and second ("). The angle of rotation as detected by the encoder 180 represents one of the 12 angular positions, that is, 12 indexing positions of the roller gear 50. The angular spacing or interval between the adjacent two angular or indexing positions is an indexing angle of the roller gear 50. In the present globoidal cam index device, the roller gear 50 is intermittently rotated at the nominal angular interval of 30°=360° divided by the number (12) of the rollers 72. The angles of rotation of the roller gear 50 from the reference angular position are detected at all of the 12 angular positions, and the 12 angular intervals are obtained from the detected angles. The obtained angular intervals are checked to see if any one of the 12 angular intervals is substantially equal to the nominal angular interval of 30° (nominal angular pitch of the rollers 72). If any one of the angular intervals is substantially equal to the nominal value, the angular pitch adjustment of the rollers 72 is initiated with the three adjacent rollers 72 associated with this angular interval substantially equal to the nominal value.

The two adjacent rollers 72 of the roller gear 50 contact the opposite surfaces 42 of the radial portion 46 of the rib 40 in the dwelling portion 49 of the globoidal cam 34. Therefore, a fact that the angular interval between the two adjacent angular positions is substantially equal to the nominal value of 30° means that a difference between the angle of rotation of the roller gear 50 detected when the two adjacent rollers 72 contact the opposite surfaces 42 of the radial portion 46 in the dwelling portion 49 and the angle of rotation detected when the upstream one of these two adjacent rollers 72 and another roller 72 further upstream of this upstream roller 72 as viewed in the rotating direction of the roller gear 50 contact the radial portion 46 is substantially equal to the nominal angular interval. Accordingly, an angular interval of the three adjacent rollers 72 indicated above are considered to be substantially equal to the nominal value. To check the next angular interval, the angle of rotation of the roller gear 50 is detected when the next upstream roller 72 has come into engagement with the radial portion 46 of the rib 40, and a difference between this angle of rotation and the last detected angle of rotation is obtained. If this difference does not represent the nominal angular interval, it means that the angular interval between the above-indicated next upstream roller 72 and the adjacent roller 72 downstream of this roller 72 deviates from the nominal value. Accordingly, the angular pitch adjustment must be implemented with respect to the above-indicated next upstream roller 72.

To implement the angular pitch adjustment of the roller 72 in question, the worker rotates the cam shaft 12 to rotate the roller gear 50 until the cam follower 54 including the roller 72 in question is located at the pitch adjusting circumferential position at which the roller shaft 70 of the cam follower 54 in question can be accessed through the window 160 by removing the closure plate 162. The worker loosens the setscrew 142 by using a tool extending through the window 160, and then rotates the roller shaft 70 with a suitable tool engaging the engaging faces 92 of the head portion 78, so as to establish the nominal angular pitch.

As discussed above, the roller shaft 70 is located at its original circumferential position of FIG. 8 before the angular pitch adjustment (when the amount of the pitch adjustment is zero). The roller shaft 70 is rotated by a suitable angle from this original circumferential position in the clockwise direction as seen in FIG. 8 to reduce the angular interval when the detected angular interval is larger than the nominal value, and in the counterclockwise direction to increase the angular interval when the detected angular interval is smaller than the nominal value. By rotating the roller shaft 70 in the clockwise direction, the axis of the roller 72 in question is shifted toward the adjacent roller 70 which is located downstream of the roller 72 in question in the rotating direction of the roller gear 50. Conversely, the axis of the roller 72 in question is shifted away from the adjacent roller 70 located downstream of the roller 72 in question, by rotating the roller shaft 70 in the counterclockwise direction. In FIG. 8, the axis of the roller 72 is shifted to the left when the roller shaft 70 is rotated in the clockwise direction, and is shifted to the right when the roller shaft 70 is rotated in the counterclockwise direction.

Figure 10A:
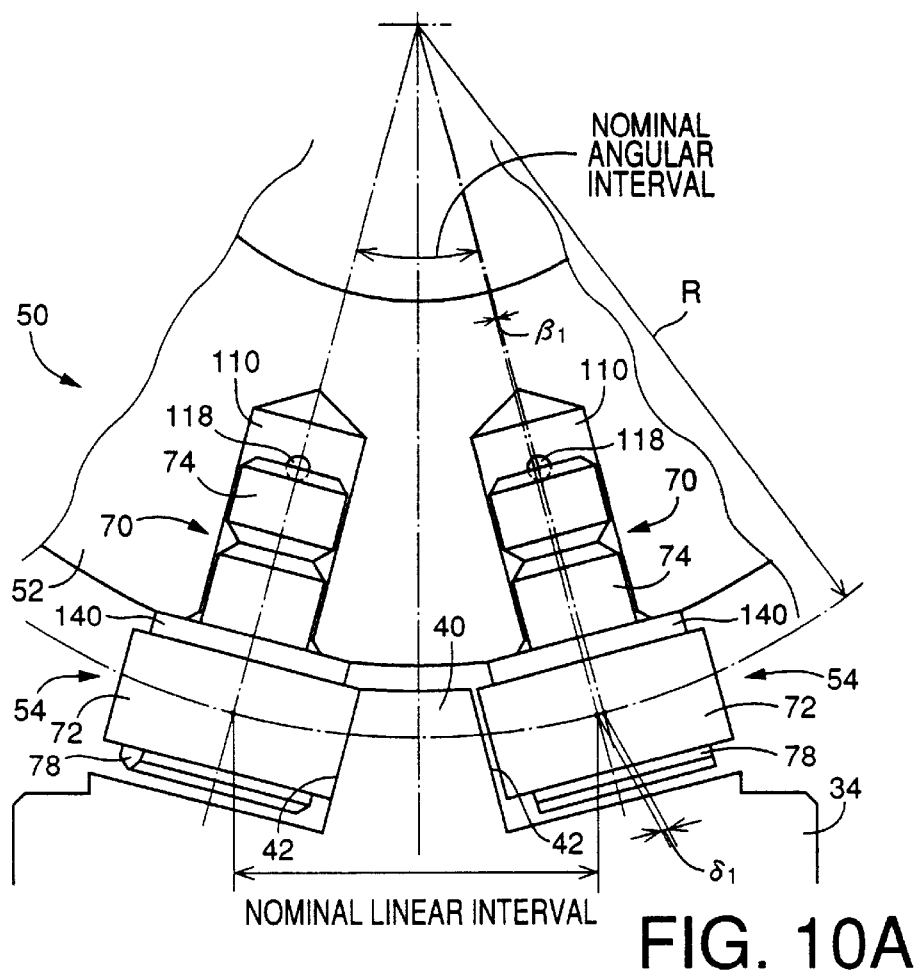
FIGS. 10A and 10B are views for explaining an adjustment of a pitch error between the adjacent rollers, showing the rollers before the adjustment.
Figure 10B:
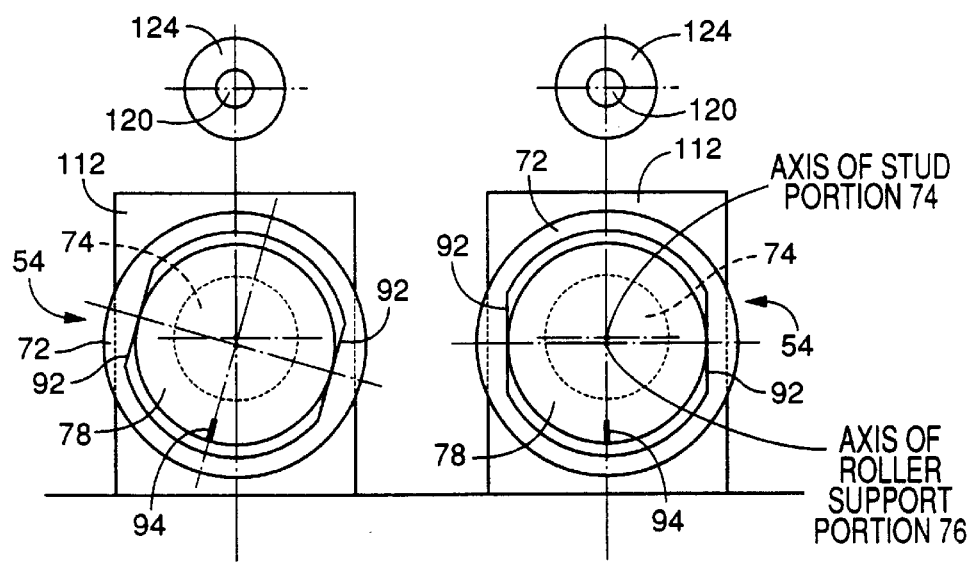

In the presence of eccentricity of the roller support portion 76 with respect to the stud portion 74, the clockwise rotation of the roller shaft 70 as seen in FIG. 8 will cause the axis of the roller support portion 76 to rotate about the axis O of the stud portion 74 to a point P1 so that the angular interval of the roller 70 in question with respect to the downstream roller 70 is reduced. On the other hand, the counterclockwise rotation of the roller shaft 70 will cause the axis of the roller support portion 76 to rotate about the axis O of the stud portion 74 to a point P2 so that the angular interval of the roller 70 in question with respect to the downstream roller 70 is increased.

Where the angular interval between the two adjacent rollers 70 is larger than the nominal value, a angle $\alpha_1$ of rotation of the roller shaft 70 required to establish the nominal angular pitch is calculated according to the following equations (3) and (4):

$$\delta_1 = R \tan \beta_1 \tag{3}$$

$$\alpha_1 = \sin^{-1} \delta_1/\epsilon \tag{4}$$

wherein R, $\beta_1$, $\alpha_1$ and $\epsilon$ represent the following values, as indicated in FIGS. 10A and 10B:

R=radius of a pitch circle of the rollers 72, $\beta_1$=error of angular interval (a positive value equal to a difference between the actual angular pitch and the nominal value), $\alpha_1$=error of angular position of the roller 72 in question in a direction parallel to a line tangent to the pitch circle of the rollers 72, and $\epsilon$=eccentricity distance between the axes of the stud and roller support portions 74, 76.

The radius R and the eccentricity distance $\epsilon$ are known values of design of the roller gear 50, and the angular interval error $\beta_1$ is obtained from the output of the encoder 180. Based on these values R, $\epsilon$ and $\beta_1$, the angle $\alpha_1$ of rotation of the roller shaft 70 required to establish the nominal angular pitch can be calculated. It is noted that no clearance is actually left between the roller 72 and the surfaces 42 of the rib 40 even in the presence of the error of the angular position of the roller 72, since the roller 72 is held in engagement with the rib 40 with a pre-load applied therebetween. In FIG. 10A, however, some clearance is shown between the roller 72 and the rib 40, for easy understanding.

Where the angular interval between the two adjacent rollers 70 is smaller than the nominal value, a angle $\alpha_2$ of rotation of the roller shaft 70 required to establish the nominal angular pitch is calculated according to the following equations (5) and (6):

$$\delta_2 = R \tan \beta_2 \tag{5}$$

$$\alpha_2 = \sin^{-1} \delta_2/\epsilon \tag{6}$$

wherein $\beta_2$ and $\alpha_2$ represent the following values:

$\beta_2$=error of angular interval (a negative value equal to a difference between the actual angular pitch and the nominal value), and $\alpha_2$=error of angular position of the roller 72 in question in a direction parallel to a line tangent to the pitch circle of the rollers 72.

Figure 11A:
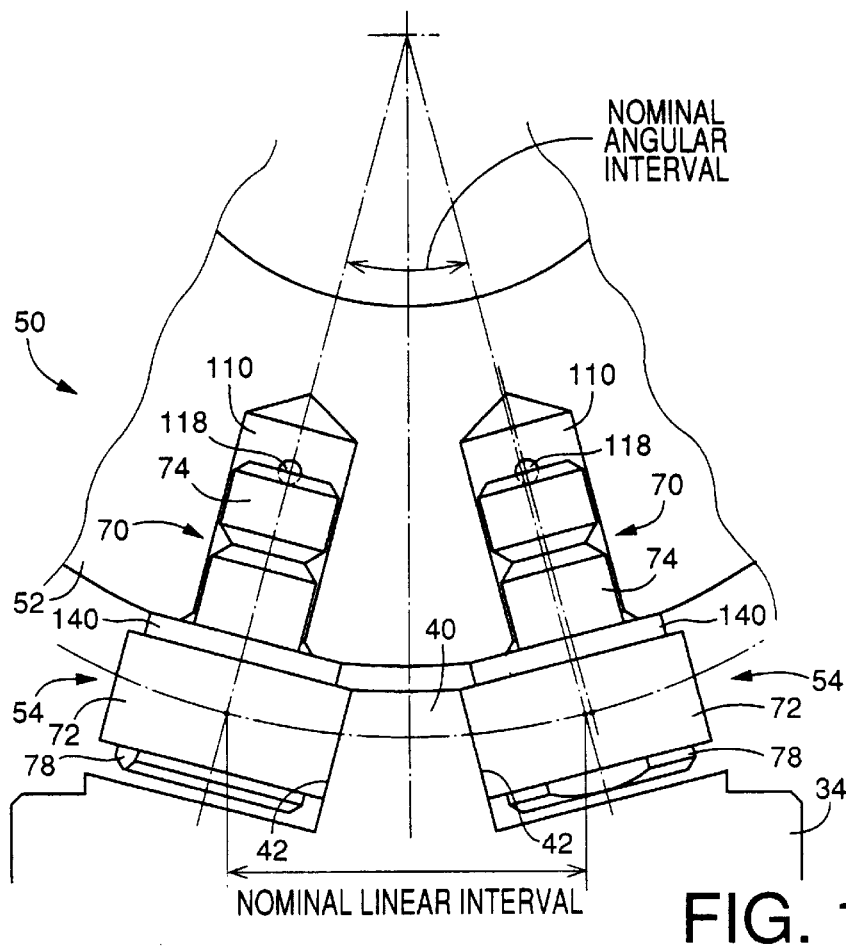
FIGS. 11A and 11B are views for explaining the adjustment of the pitch error between the adjacent rollers, showing the rollers after the adjustment.
Figure 11B:
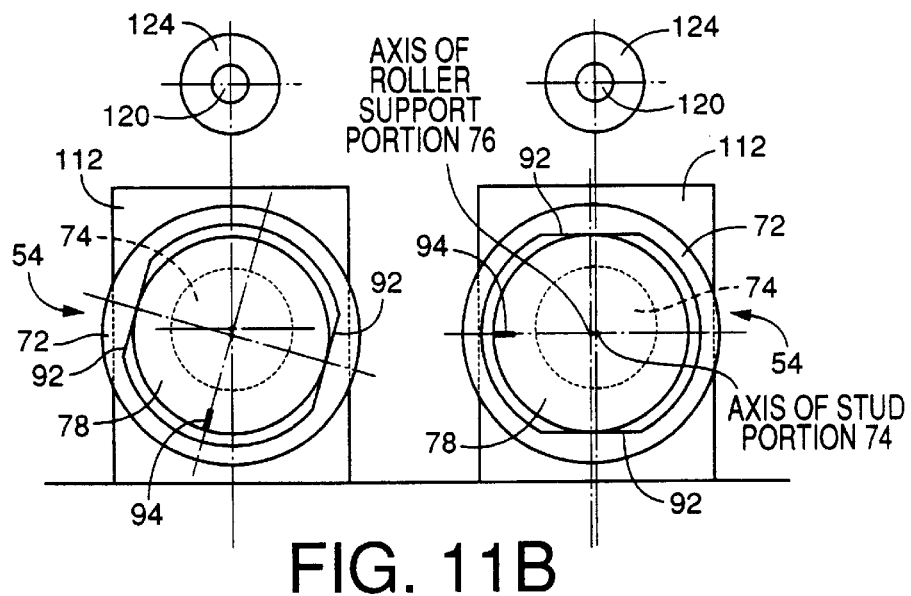
Figure 12:
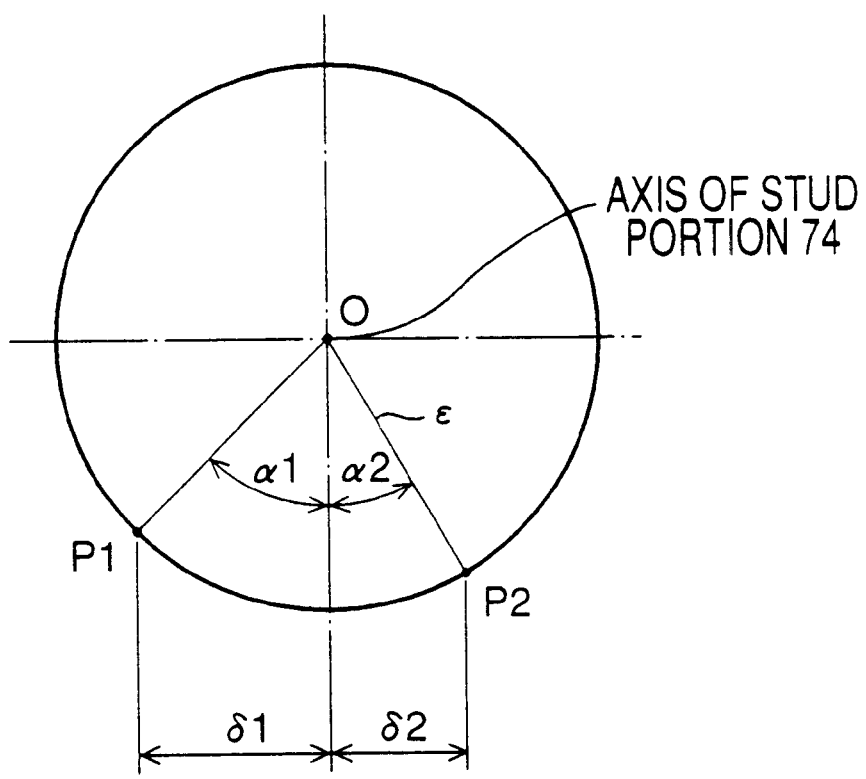
FIG. 12 is a view for explaining a relationship between the axes of a stud portion and a roller support portion of the roller shaft upon adjustment of an angular pitch between the adjacent rollers.

FIGS. 10A and 10B illustrate an example wherein the detected angular interval is larger than the nominal value. In FIG. 10A, the roller gear 50 is rotated in the clockwise direction when the angular interval is detected at each angular or indexing position. It is supposed that the angular pitch adjustment for the left one of the two adjacent rollers 72 has been completed, while the axis of the right roller 72 is offset from the nominal position with a result of the detected angular interval being larger than the nominal value (nominal pitch of 30°). The angle $\alpha_1$ of rotation of the roller shaft 70 required to establish the nominal angular interval is calculated according to the equations (3) and (4), as described above, and the roller shaft 70 is rotated in the clockwise direction through by calculated angle $\alpha_1$, as indicated in FIG. 11B. As a result, the axis of the roller support portion 76 of the roller shaft 70 is rotated by the angle $\beta_1$ about the axis of the roller gear 50 toward the left roller 72, as indicated in FIG. 11A, so that the roller 72 in question is shifted by the distance of $\delta_1$ in a direction perpendicular to the axis of the stud portion 74 and the axis of the turret body 52, as indicated in FIGS. 11A and 11B. Accordingly, the angular interval between the two adjacent rollers 72 is adjusted to the nominal value. With the rotation of the roller shaft 70, the position of the indicator 94 in the circumferential direction of the head portion 78 is accordingly changed, so that the pitch adjusting direction is known by the position of the indicator 94.

It is noted that since the rotation of the roller shaft 70 causes the roller 72 to be translated in the direction which is perpendicular to both of the axis of rotation of the roller shaft 70 (namely, the axis of the stud portion 74) and the axis of the turret body 52, the parallelism of the outer circumferential surface of the roller 72 and the surface 42 of the rib 40 is lost, in a strict sense. As a result, there arises a tendency that the roller 72 contacts the surface 42 of the rib 40 only locally at its outer circumferential surface. However, the distance of shifting of the roller 72 to adjust the angular interval between the adjacent rollers 72 is extremely small, and the loss of the parallelism indicated above is accordingly small, so that the loss can be absorbed by elastic deformation of the roller 72 and the rib 40 which is caused by the pre-load applied therebetween. Therefore, the roller 72 does not actually suffer from a local contact with the rib 40.

After the angular pitch adjustment for the roller 72 in question, the worker tightens the setscrew 142 to fix the roller shaft 70 to the turret body 52, and rotate the cam shaft 12 to rotate the roller gear 50 until the roller 72 in question and the adjacent roller 72 downstream of the roller 72 in question as seen in the rotating direction of the roller gear 50 are brought into engagement with the radial portion 46 of the rib 40 in the dwelling portion 49 of the globoidal cam 34. The angle of rotation of the roller gear 50 from the reference angular position is detected. Then, a difference of the detected angle of rotation with respect to the angle of rotation which was detected for the preceding two successive rollers 72 downstream of the roller 72 in question is calculated. This difference which represents the angular pitch between the roller 72 in question and the adjacent downstream roller 72. If this angular pitch is equal to the nominal value, it means that the angular pitch adjustment for the roller 72 in question has been correctly made, that is, the angular pitch adjustment has established the nominal angular interval between the roller 72 in question and the adjacent downstream roller 72, and the nominal linear interval or distance between points of intersection of the axes of these two rollers 72 and the pitch circle of the rollers 72, as indicated in FIG. 11A. Then, the angular pitch adjustment is made for the next upstream roller 72.

If the angular pitch adjustment for the roller 72 in question has not established the nominal angular interval, the cam follower 54 including the roller 72 in question is again brought to the pitch adjusting circumferential position, and the angular pitch adjustment is again implemented through the window 160. The angular pitch adjustment is repeatedly implemented until the nominal angular pitch has been established by the roller 72 in question and the adjacent downstream roller 72. The angular pitch adjustment step is implemented for each of the remaining rollers 72.

After the angular pitch adjustment procedure is completed for all of the rollers 72 (cam followers 54), the angles of rotations of the roller gear 50 at the 12 angular positions corresponding to the respective 12 sets of two adjacent rollers 72 are detected to obtain the 12 angular intervals. If any of these angular intervals is not substantially equal to the nominal value, the angular pitch adjustment procedure is repeated, until all of the 12 nominal angular intervals are adjusted to the nominal value. Then, the encoder 180 is removed from the housing 10, and the adhesive agent 150 under pressure is injected as a filler material, through the adhesive filler inlet 124, the communication passage 120 and the Vee-groove 84, into the gap between the outer circumferential surface 82 of the stud portion 74 of each roller shaft 70 and the inner circumferential surface 122 of the corresponding mounting hole 110. As indicated in FIG. 5B, the adhesive agent 150 is forced to flow from the Vee-groove 84 formed in the stud portion 74, into an outer portion of the above-indicated gap on the side of the opening of the mounting hole 110, and an inner portion of the gap on the side of the bottom of the mounting hole 110. As described above, the Vee-groove 84 is partially defined by the tapered surface 90 which is inclined relative to a plane perpendicular to the axis of the stud portion 74, so that the roller shaft 70 is displaced in both the axial and radial directions when the setscrew 142 is forced onto the tapered surface 90. This Vee-groove 84, which is formed along the entire circumference of the outer circumferential surface 82 of the stud portion 74, also functions as a passage for facilitating the flow of adhesive agent 150 in the circumferential direction through the substantially annular gap between the outer circumferential surface 82 and the inner circumferential surface 122, so that the entirety of the gap is filled with the adhesive agent 150.

As the adhesive agent 150 is injected into the above-indicated gap within the mounting hole 110, air present in an outer portion of the gap between the Vee-groove 84 and the open end of the hole 110 is discharged through the annular chamfer portion 114 and the air breather grooves 116, while air present in an inner portion of the gap between the Vee-groove 84 and the bottom of the hole 110 is discharged through the air breather hole 118. The two air breather grooves 116 communicating with the annular chamfer portion 114 permit easy discharge of the air from the entire circumference of the outer portion of the gap between the outer circumferential surface 82 of the stud portion 74 and the inner circumferential surface 122 of the mounting hole 110, so that the entirety of the outer portion of the gap can be filled with the adhesive agent 150.

Further, the air breather hole 118 communicating with the space between the inner end of the stud portion 74 and the bottom of the mounting hole 110 permits easy discharge of the air from the entire circumference of the inner portion of the gap between the outer circumferential surface 82 of the stud portion 74 and the inner circumferential surface 122 of the mounting hole 110, so that the entirety of the inner portion of the gap can be filled with the adhesive agent 150.

With the injected mass of the adhesive agent 150 being hardened or cured, the stud portion 74 is bonded to the turret body 52 with the roller shaft 70 held in the appropriate circumferential position that establishes the nominal angular interval between the adjacent rollers 72. Thus, all of the roller shafts 70 are fixed to the turret body 52 so as to maintain the nominal angular pitch of the rollers 72.

It will be understood that the fixing step of fixing the roller shafts 70 includes a step of filling the gap between the outer circumferential surface 82 of the stud portion 74 and the inner circumferential surface 122 of the mounting hole 110, with the adhesive agent 150, and a step of hardening the adhesive agent 150. The manufacture of the globoidal cam index device is completed with the step of fixing the roller shafts 70 with the adhesive agent 150.

As described above, the angular intervals of the adjacent rollers 72 of the roller gear 50 are adjusted one after another to the nominal value, by measuring the angles of rotation of the roller gear 50 at the individual angular positions. This adjustment permits the globoidal cam index device to assure a sufficiently high degree of angular positioning or indexing accuracy of the roller gear 50.

If none of the 12 angular intervals obtained based on the detected angles of rotation of the roller gear 50 at the angular positions is substantially equal to the nominal angular pitch of the rollers 72, the angular pitch adjustment is initially implemented for the three adjacent rollers 72 whose angular interval is closer to the nominal value, and the pitch adjustment is then implemented for the remaining rollers 72, with respect to the initially adjusted angular interval.

Figure 13:
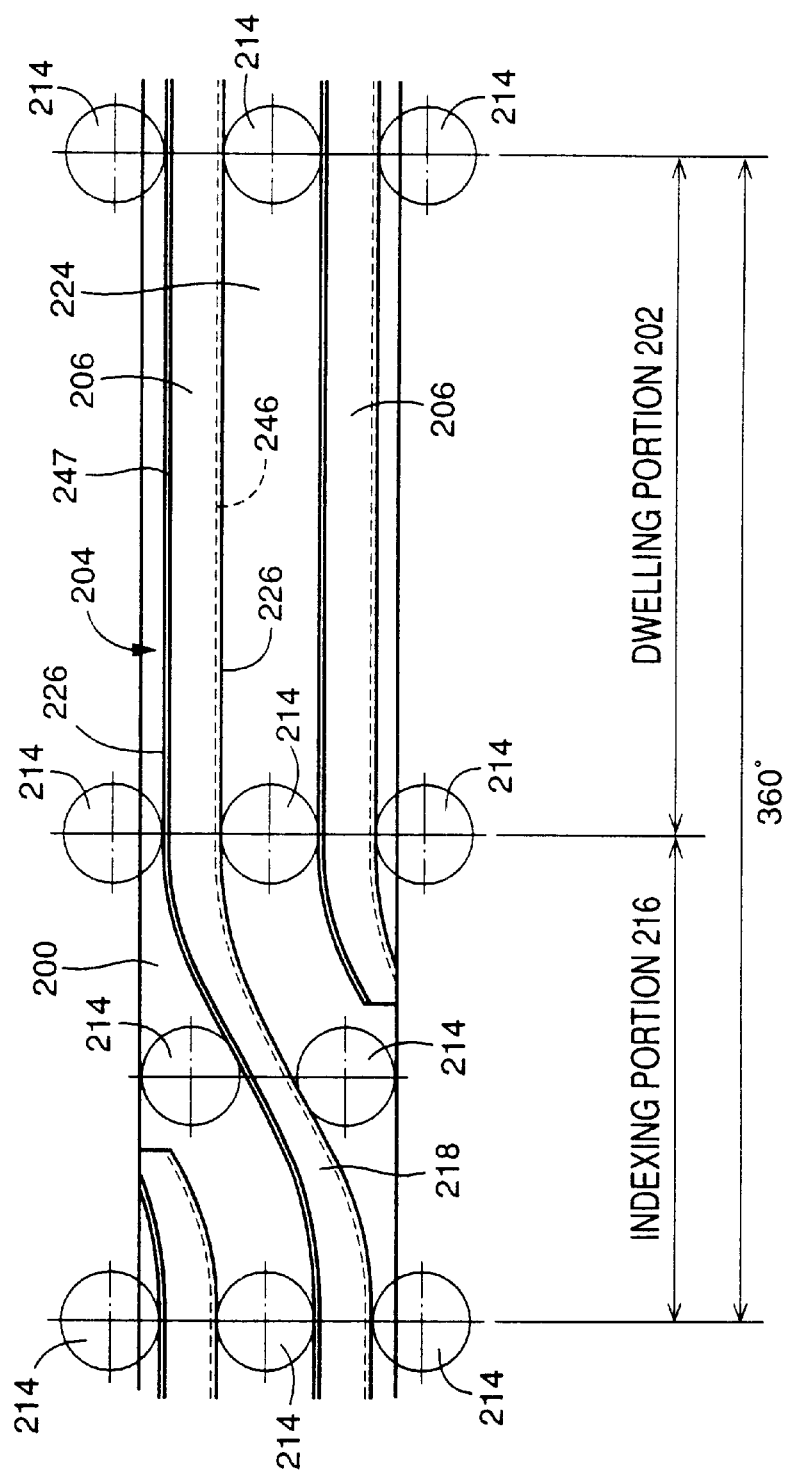
FIG. 13 is a developed view of a globoidal cam incorporated in a globoidal cam index device according to another embodiment of this invention.
Figure 14:
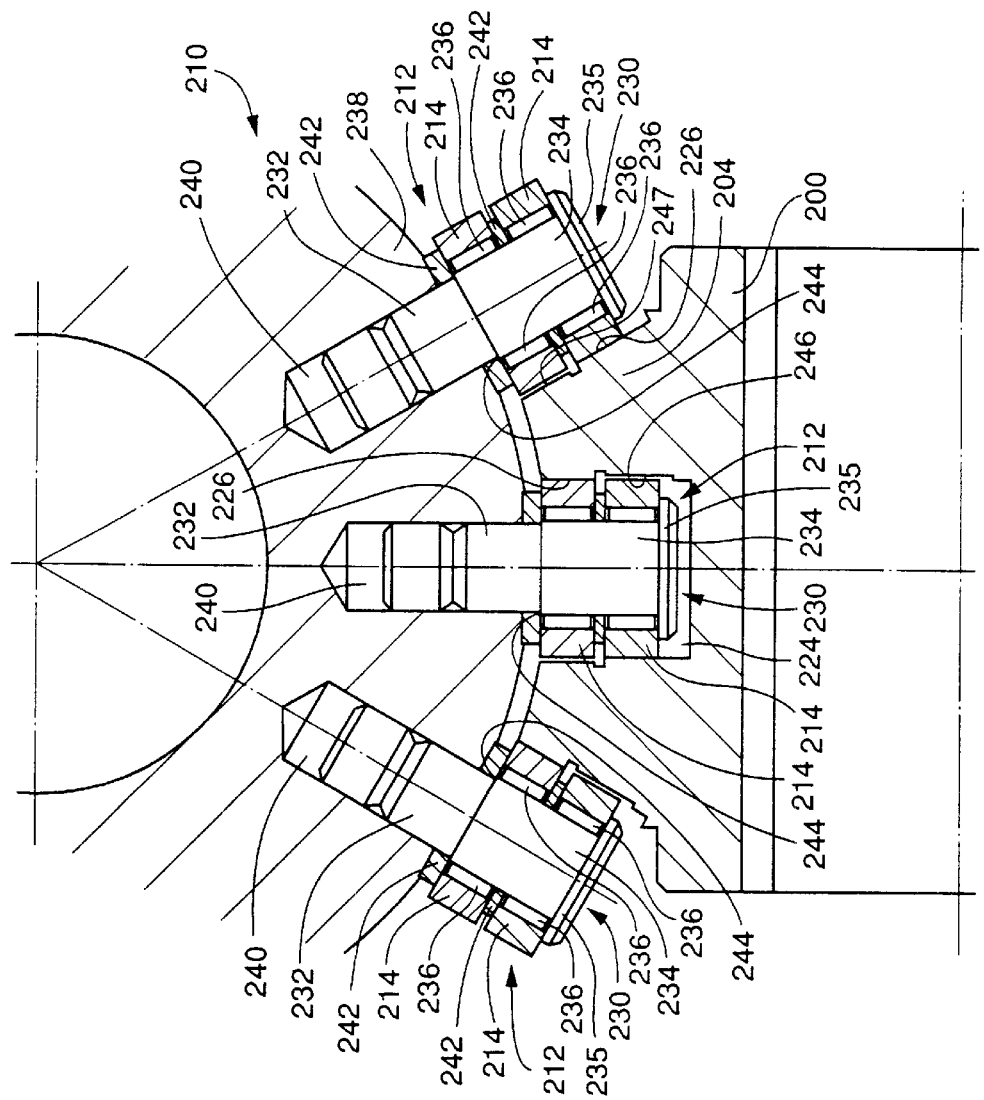
FIG. 14 is a fragmentary plan view in cross section of the globoidal cam of FIG. 13 in meshing engagement with a roller gear.

Referring next to FIGS. 13–16, there will be described a globoidal cam index device constructed according to a second embodiment of this invention. This globoidal cam index device includes a globoidal cam 200 of twin dwell type wherein a rib 204 has two radial or non-lead portions 206 in a dwelling portion 202, as shown in FIG. 13. The globoidal cam 200 is in meshing engagement with a roller gear 210 having 12 cam followers 212, as shown in FIG. 14. In the present globoidal cam index device, rollers 214 of the three adjacent cam followers 212 mesh with the radial portions 206 of the rib 204 in the dwelling portion 202, as indicated in FIGS. 13 and 14, and the rollers 214 of the two adjacent cam followers 212 mesh with an intermediate part of the helical portion 218 in an indexing portion 216 of the cam 200, as indicated in FIG. 13.

In the globoidal cam 200 of twin dwell type, the two radial portions 206 of the rib 204 which extend in the radial direction of the cam 200 and are spaced apart from each other in the axial direction of the cam 200 define a groove 224 with which the intermediate one of the three adjacent rollers 214 meshes, as indicated in FIGS. 13 and 14. In the globoidal cam 34 used in the first embodiment, the two helical portions 44 in the indexing portion 47 define the groove 48 with which the intermediate one of the three adjacent rollers 72 meshes in the indexing portion 47 of the cam 34. The helical portions 44 are designed and the diameter of the rollers 72 is determined such that there is left some amount of clearance between the outer circumferential surface of the intermediate roller 72 and the surfaces of the groove 48. Accordingly, there is left a clearance also between the rollers 72 and the surfaces 42 of the radial portion 46 in the dwelling portion 49. To eliminate this latter clearance which adversely affects the indexing accuracy of the roller gear 50, the center distance adjusting device 30 is provided to adjust the distance between the axes of the globoidal cam 34 and the roller gear 50, so that the rollers 72 may contact the radial portion 46 in the dwelling portion 49, without a clearance therebetween, for the purpose of improving the angular positioning or indexing accuracy. However, some amount of clearance is still left between the rollers 72 and the helical portions 44 in an intermediate part of the indexing portion 47 of the cam 34.

In the globoidal cam of twin dwell type, the angle of contact of the roller with the rib in the indexing portion is smaller than that in the dwelling portion. Therefore, the distance of radial movement of the globoidal cam toward the axis of the roller gear required to bring the rollers into contact with the rib in the indexing portion is larger than that required to bring the rollers into contact with the rib in the dwelling portion, for the same reason as explained above with respect to the first embodiment by reference to FIGS. 9A and 9B. If the distance between the axes of the globoidal cam and the roller gear is adjusted to eliminate the clearance between the rollers and the rib in the indexing portion, the clearance is eliminated also in the dwelling portion, but the pre-load between the rollers and the rib is excessively large. The pre-load may be optimized to some extent by modifying the automatic machining control program used to shape the rib of the globoidal cam so that the amount of the pre-load in the dwelling portion is substantially the same as in the indexing portion. However, this modification of the machining program requires a complicated three-dimensional analysis by a computer, and the machining equipment used to shape the rib according to the modified machining control program is required to have a larger number of controllable axes. Accordingly, the shaping of the rib according to the modified machining control program is limited, and the profile of the shaped rib is still approximate to the ideal profile. Up to the present, the shaping of the rib is not successful and satisfactory, so that the globoidal cam of twin type presently available is arranged such that the rollers contact the rib without an clearance in the dwelling portion, while there is left an undesirable clearance between the rollers and the rib in the indexing portion.

In the light of the drawback of the conventional globoidal cam of twin type, each of the 12 cam followers 22 provided on the roller gear 210 according to the present second embodiment has two rollers 214, as shown in FIG. 14 (wherein only three cam followers 212 are shown), so that the globoidal cam 200 and the roller gear 310 do not suffer from a backlash in the indexing portion 216 and in the dwelling portion 202. Described more specifically, each cam follower 212 includes a roller shaft 230, which includes a stud portion 232, a roller support portion 234, and a head portion 235. As in the roller shaft 70, the stud portion 232 and the roller support portion 234 are eccentric with respect to each other, and the head portion 235 is concentric with the roller support portion 234. The two rollers 214 are rotatably mounted on the roller support portion 234 through a cylindrical array of needle rollers 236, such that the two rollers 214 are concentric or coaxial with each other and are rotatable independently of each other. Thus, the cam follower 212 is of double-roller type having a roller assembly consisting of the two rollers 214.

The roller gear 210 includes a turret body 238 which has 12 mounting holes 240 similar to the mounting holes 110 provided in the first embodiment. The mounting holes 240 are equiangularly spaced apart from each other in the circumferential direction of the turret body 238. As in the first embodiment, the turret body 238 carries a setscrew, an adhesive filler passage, an air breather passage, etc., and the stud portion 232 of the roller shaft 230 is fixed to the turret body 238 by the setscrew and an adhesive agent. Each cam follower 212 is identical with the cam follower 54 in the first embodiment, except that the cam follower 212 includes the two rollers 214 and two thrust pieces 242. One of the two thrust pieces 242 is sandwiched between an abutting surface 244 of the roller support portion 234 and the outer circumferential surface of the turret body 238, while the other thrust piece 242 is sandwiched between the two rollers 214.

Figure 15:
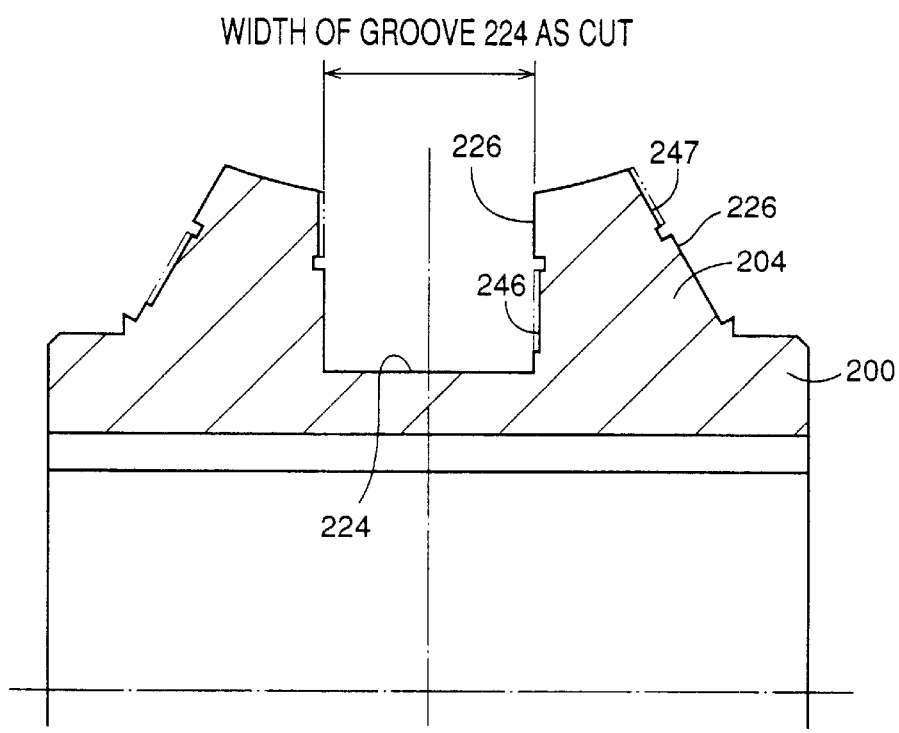
FIG. 15 is a fragmentary plan view in cross section of the globoidal cam of FIG. 13.

The rib 204 of the globoidal cam 200 has opposite surfaces 226 which have recessed portions 246, 247, respectively, as shown in FIGS. 13 and 14. The groove 224 is defined by the surface 226 having the recessed portion 246 and the surface 226 having the recessed portion 247. One of the two rollers 214 of the intermediate one of the three adjacent cam followers 212 contacts the surface 226 having the recessed portion 246, without a clearance, while the other of the two rollers 214 contacts the surface 226 having the recessed portion 247, without a clearance, as indicated in FIG. 14. The groove 224 is cut by a machining operation with high accuracy, so as to have a width equal to or slightly smaller than the outside diameter of the rollers 214, as indicated in FIG. 15. Then, one of the opposite surfaces 226 of the rib 204 is cut at a proximal portion thereof relatively distant from the top of the rib 204 (relatively close to the bottom of the groove 224), to form the recessed portion 246 which extends in the longitudinal direction of the rib 204, as shown in FIG. 15. The other surface 226 of the rib 204 is cut at a distal portion thereof relatively near the top of the rib 204 (relatively distant from the bottom of the groove 224), to form the recessed portion 246 which also extends in the longitudinal direction of the rib 204, as shown in FIG. 15. The recessed portions 246, 247 are indicated by two-dot chain lines in FIG. 15. These recessed portions 246, 247 are formed from a point at which the rollers 214 come into contact with the rib 204, to a point at which the rollers 214 are released from the rib 204.

In the indexing portion 216 of the globoidal cam 200, one of the two rollers 214 of one of the two adjacent cam followers 212 contacts one of the opposite surfaces 226 of the helical portion 218 of the rib 204, while one of the two rollers 214 of the other of the two adjacent cam follows 212 contacts the other of the opposite surfaces 226 of the helical portion 218, whereby the helical portion 218 is sandwiched by and between the rollers 214. In the dwelling portion 202, the two rollers 214 of the intermediate one of the three adjacent cam followers 212 contact the groove 224, more specifically, contact the portions of the surfaces 226 other than the recessed portions 246, 247, without a clearance, while there are left some amounts of clearance between the rollers 214 and the recessed portions 246, 247, as shown in FIG. 14. One of the two rollers 214 of each of the other two non-intermediate cam followers 212 contacts the rib 204. For one of the two non-intermediate cam followers 212, the outer one of the two rollers 214 which is on the side of the head portion 235 contacts the proximal portion of the surface 226 of the rib 204, while there is left a clearance between the other, inner roller 214 on the side of the stud portion 232 and the recessed portion 247 of the same surface 226. For the other non-intermediate cam follower 212, the inner one of the two rollers 214 which is on the side of the stud portion 232 contacts the distal portion of the surface 226 of the rib 204, while there is left a clearance between the other, outer roller 214 on the side of the head portion 235 and the recessed portion 246 of the same surface 226. The two rollers 214 of the intermediate cam follower 212 contact the respective opposite surfaces 226 of the rib 204, and there is left a clearance between each roller 214 and one of the opposite surfaces 226. This clearance facilitates the rolling action of each roller 214. However, a roller assembly consisting of the two rollers 214 of the intermediate cam follower 212 does not have a clearance with respect to the surfaces 226. Accordingly, the globoidal cam 200 does not suffer from a backlash at any angular position of the globoidal cam 200 during its one full rotation.

In the present embodiment wherein the rib 204 of the globoidal cam 200 has the recessed portions 246, 247, each of the two rollers 214 of each cam follower 212 contacts only one of the opposite surfaces 226 of the rib 204. This arrangement permits the roller assembly 214 of each cam follower 212 to contact the opposite surfaces 226 defining the groove 224, without a clearance or with some amount of pre-load, by cutting the groove 224 such that the width of the groove 224 is equal to or slightly smaller than the outside diameter of the rollers 214, with variations of the above-indicated width and diameter being held within predetermined tolerances. The present arrangement, which does not require shaping of the rib 204 by a machining operation under a complicated control, assures smooth rolling of the rollers 214 without a backlash with respect to the rib 204.

Further explanation in detail on the present second embodiment of the invention is deemed necessary. Assuming that the rollers 214 of the roller gear 210 and the groove 224 of the globoidal cam 200 are respectively manufactured and cut such that the outside diameter of each roller 214 is exactly equal to the width of the groove 224 at its surface portions other than the recessed portions 246, 247, the two rollers 214 of the intermediate one of the three adjacent cam followers 212 in the dwelling portion 202 just contact the portions of the surfaces 226 of the groove 224 other than the recessed portions 246, 247. Further, by adjusting the distance between the axes of the roller gear 210 and the globoidal cam 200, one of the two rollers 212 of each of the two non-intermediate cam followers 212 just contact the non-recessed portions of the surfaces 226 which are opposite to the surfaces 226 defining the groove 224 between the two radial portions 206 in the dwelling portion 202. Similarly, one of the two rollers 214 of each of the two adjacent cam followers 212 in the indexing portion 216 just contacts the non-recessed portion of the corresponding one of the opposite surfaces 226 of the helical portion 218 of the rib 204. Thus, if the assumption indicated above is true, the rollers 214 of the roller gear 210 contact the rib 204 of the globoidal cam 200 without a clearance, more precisely, with the clearance being zero, at any angular position of the globoidal cam 200 during one full rotation thereof. If the distance between the axes of the globoidal cam 200 and the roller gear 210 is slightly reduced, in this condition, the clearance between the cam 200 and the roller gear 210 becomes negative, that is, the pre-load therebetween is increased, at any angular position of the cam 200. In this case, the amount of pre-load is inevitably larger in the dwelling portion 202 than in the indexing portion 216, for the reason explained above by reference to FIGS. 9A and 9B. However, the difference between the amounts of pre-load in the dwelling and indexing portions 202, 216 is smaller in the present case, than in the case where the helical portions 44 of the rib 40 in the first embodiment of FIGS. 1–12 are not shaped by a machining or grinding operation, which inevitably deteriorates the accuracy of rotary motion transmission between the roller gear 50 and the globoidal cam 34. In the absence of such a machining operation, the deterioration of the rotary motion transmission can be reduced in the present second embodiment.

Figure 16:
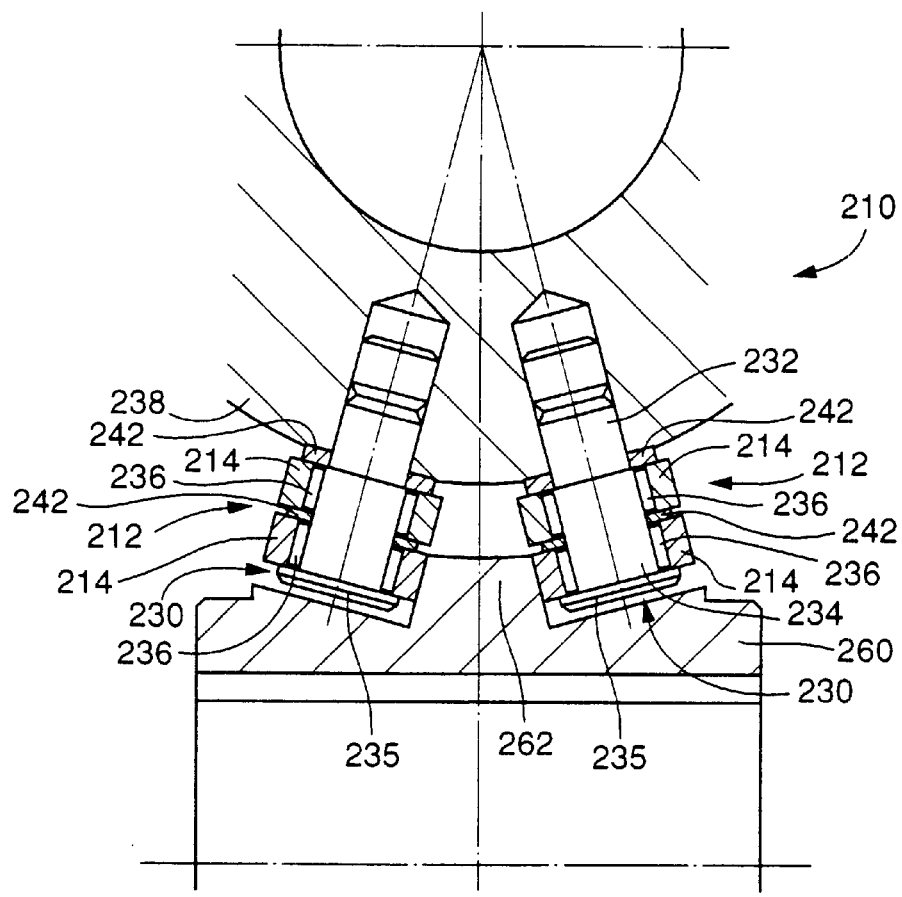
FIG. 16 is a plan view in cross section showing the roller gear of FIG. 14 meshing with a master globoidal cam used for adjusting the pitch of rollers of the roller gear.

As in the first embodiment, the manufacture of the globoidal cam index device according to the second embodiment includes a step of preparing the turret body 238, a step of preparing the roller shafts 230, a step of preparing a preliminary roller gear assembly, and a step of adjusting the pitch of the rollers 214. In the pitch adjusting step, the roller gear 210 is installed on a jig equipped with a master roller turret cam in the form of a master globoidal cam 260, as shown in FIG. 16. The master globoidal cam 260 is a single dwell type cam having a rib 262 whose height is determined so that the rib 262 contacts only the outer one of the two rollers 214 of each cam follower 212 which is on the side of the head portion 235.

The jig is identical with the globoidal cam index device according to the first embodiment, except in that the jig does not include the globoidal cam 34, the roller gear 50, and those components which are used for mounting the roller gear 50 in the housing 10, such as the bearings 58, 60, bearing cases, oil seals and oil seal cases, and in that the master globoidal cam 260 is installed in the housing of the jig, in place of the globoidal cam 34. In FIG. 16, only the master globoidal cam 260 of the jig is shown. The components of the jig including the master globoidal cam 260 are manufactured to have higher degrees of dimensional accuracy than those of the globoidal cam index device of the first embodiment.

When the angular pitch adjustment of the rollers 214 is implemented, the roller gear 210 is rotatably built in the housing of the jig, together with the bearing, bearing cases and other components which are provided in the housing 10 of the globoidal cam index device incorporating the roller gear 210. The roller gear 210 is built in the housing of the jig such that the roller gear 210 meshes with the master globoidal cam 260. Then, the distance between the axes of the master globoidal cam 260 and the roller gear 210 is adjusted, and the axial position of the master globoidal cam 260 are adjusted, so as to adjust the pre-load of the rollers 214, by using the center distance adjusting device and the axial shaft position adjusting device which are incorporated in the jig. The adjustment of the angular intervals between the adjacent cam followers 212 is implemented in the same manner as described above with respect to the first embodiment.

Thus, the angular pitch adjustment of the rollers 214 in this second embodiment is not implemented with the roller gear 210 in meshing engagement of the globoidal cam 200, but is implemented by using the jig equipped with the master globoidal cam 260, in order to avoid adverse influences of an interference between the rollers 214 of the three adjacent cam followers 212 and the rib 204 of the globoidal cam 200 during the angular pitch adjustment. For instance, the angular positions of the roller gear 210 are determined by a sum of amounts of elastic deformation of the three adjacent cam followers 212 and the radial portions 206 of the rib 204 when the rollers 214 of the three adjacent cam followers 212 contact the opposite surfaces 226 of the radial portions 206 of the two radial portions 206 which are spaced apart from each other in the axial direction of the cam 200. Due to this elastic deformation, the optimum determination of the angular positions of the roller shafts 230 to establish the nominal angular intervals of the adjacent rollers 214 is complicated, and therefore the adjustment of the angular positions is difficult to perform. Further, if the angular intervals between the three cam followers 212 before the angular pitch adjustment deviate from the nominal value in a relatively large degree, the resistance to rotations of the roller gear 210 and the globoidal cam 200 is accordingly large, while the rollers 214 of the three cam followers 212 are in contact with the radial portions 206 of the rib 204, so that the angular pitch adjustment is difficult, or even impossible in the worst case where the roller gear 210 and the globoidal cam 200 cannot be rotated.

On the other hand, the master globoidal cam 260 of single dwell type having only one radial portion does not suffer from such drawbacks as described just above. Like the globoidal cam 34 of the first embodiment, the helical portions of the rib in the indexing portion of the master globoidal cam 260 engage the rollers 214 of the three adjacent cam followers 214, with a suitable clearance therebetween, with the helical portions being suitably shaped as described with respect to the helical portions 44 of the cam 34. This clearance will not deteriorate the accuracy of the angular pitch adjustment of the roller gear 210 by using the master globoidal cam 260.

After the angular pitch adjustment of the rollers 214 is completed, the roller gear 210 is removed from the jig, and the adhesive agent is injected into the clearance between the outer circumferential surface of the stud portion 232 of each roller shaft 230 and the inner circumferential surface of the corresponding mounting hole 240, so that the roller shafts 230 are fixed to the turret body 238 with the adhesive agent being hardened. Thus, the pitch-adjusted roller gear 210 is obtained. The roller gear 210 is incorporated into the housing of the globoidal cam index device, in meshing engagement with the globoidal cam 200. Thus, the manufacture of the globoidal cam index device is completed.

As described above, each cam follower 212 of the roller gear 210 which has the two rollers 214 permits the angular pitch adjustment without a backlash between the rollers 214 and the rib 204 of the globoidal cam 200, at all angular positions of the roller gear 210, thereby minimizing a variation of the pre-load of the rollers 214 throughout one full rotation of the globoidal cam 200, and enabling the globoidal cam index device to operate with significantly reduced operating vibration and noise.

Further, each of the two rollers 214 of each cam follower 212 engages only one of the two opposite surfaces 226 of the rib 204 throughout the entire period of the engagement, so that the direction of rotation of each roller 214 will not be reversed. In a globoidal index device wherein a clearance is left between the rollers of a roller gear and the groove of a globoidal cam, the direction of rotation of each roller is necessarily reversed at a given point during the period of its engagement with the groove, whereby the roller slips on the surface of the groove, resulting in generation of heat due to the friction. The roller gear 210 used in the present second embodiment is free from this drawback, leading to an improvement in the service life of the globoidal cam index device.

In addition, the globoidal cam 200 of twin dwell type permits the cam followers 212 to provide a sufficiently large load capacity in the dwelling portion 202, even though each cam follower 212 has the two rollers 214. With the two rollers 214 provided on each cam follower 212, the area of contact of each roller 214 with the surface 216 of the rib 204 of the globoidal cam 200 is reduced to a half that in the case where each cam follower has only one roller. Accordingly, the load capacity in the dwelling portion of the cam is reduced to a half. However, since the rib 204 of the globoidal cam 210 of twin dwell type has the two radial portions 206, a total of four rollers 214 of the three adjacent cam followers 212 contact the surfaces 226 of the rib 204 in the dwelling portion 202. Namely, one of the two rollers 214 of each of the two non-intermediate ones of the three adjacent cam followers 212, and the two rollers 214 of the intermediate cam cam follower 212 contact the rib surfaces 226. Therefore, even though the width dimension of each roller 214 (as measured in the axis direction) is a half of the roller 72 of the single-roller cam follower 54 in the first embodiment, the total area of contact of the four rollers 214 is the same as in the case of the single-roller cam follower 54. Although the load capacity in the intermediate part of the indexing portion 216 of the globoidal cam 200 is reduced to a half, this does not cause a problem since the load in the indexing portion 216 is relatively small because the acceleration of the cam is zero in the intermediate part of the indexing portion.

Figure 17:
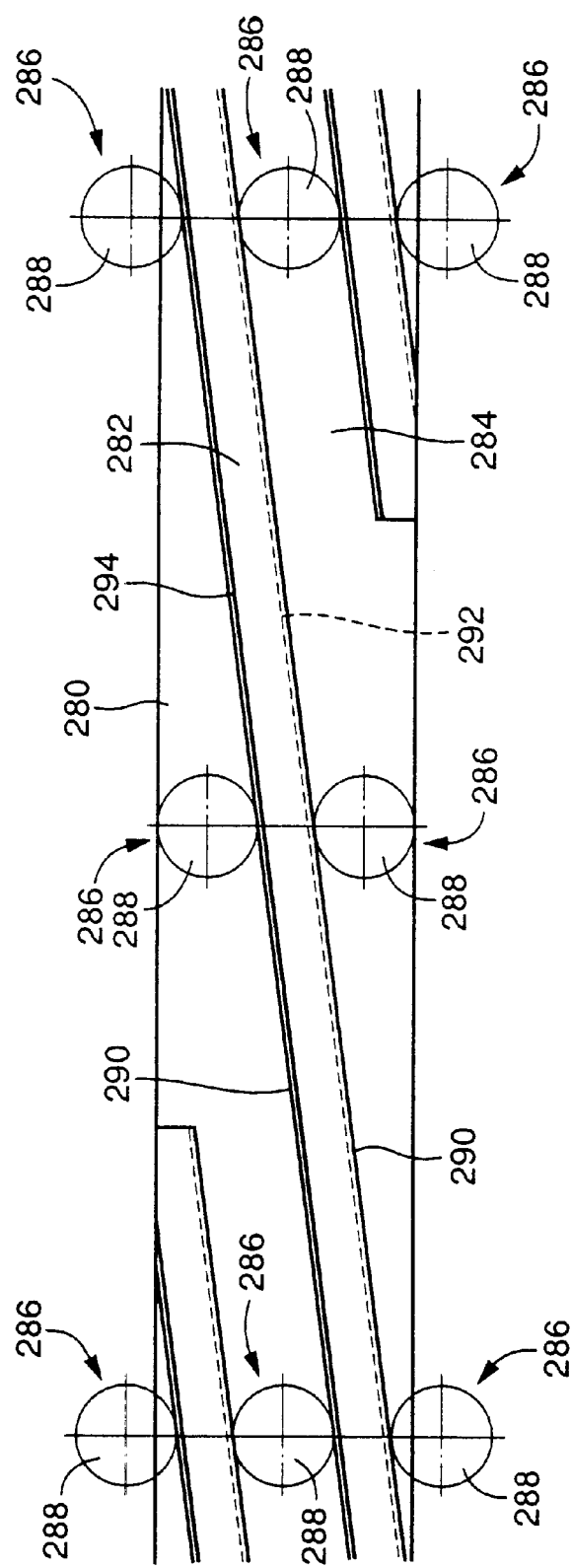
FIG. 17 is a developed view of a worm serving as a roller gear type speed reducing device according to a further embodiment of the invention.

Referring next to FIG. 17, there will be described a roller gear type speed reducing device constructed according to a third embodiment of this invention, and a method of manufacturing this roller gear type speed reducing device. This roller gear type speed reducing device includes a worm 280 and a roller gear (not shown) which engage each other. A rotary motion of the worm 280 as an input device is transmitted to the roller gear as an output device such that the rotating speed of the roller gear is reduced by a predetermined ratio with respect to the rotating speed of the worm 280. With the worm 280 stopped at a desired angular position, the roller gear is stopped at the corresponding angular position. The roller gear used in the present embodiment is a spur roller gear, and the speed reducing device including this spur roller gear is a spur roller gear type speed reducing device.

The present roller gear type speed reducing device is different from the globoidal cam index device of FIGS. 1–12, in that the double enveloping worm 280 is provided in place of the globoidal cam 34, while the roller gear 210 of FIGS. 13–16 is provided in place of the roller gear 50. As described above, the roller gear 210 is a spur roller gear wherein each cam follower 212 has two rollers 214. Since the roller gear 210 meshes with the double enveloping worm 280 in place of the globoidal cam 200, each roller shaft and the two rollers mounted thereon are collectively referred to as a roller unit, rather than the cam follower. The worm 280 is mounted on a worm shaft as an input shaft such that the worm 280 is not rotatable and axially movable relative to the worm shaft. Further, the roller gear 210 is mounted on a roller gear shaft as an output shaft. The distance between the axis of the worm 280 and the axis of the roller gear 210 is adjusted by a center distance adjusting device, while the axial position of the worm 280 is adjusted by an axial shaft position adjusting device, which is similar to the axial shaft position adjusting device 32 provided in the first embodiment for adjusting the axial position of the cam shaft 12.

The worm 280 has a tooth 282, which is a single helical or lead portion inclined with respect to a plane perpendicular to the axis of rotation of the worm 280, as shown in FIG. 17. The tooth or helical portion 282 has two circumferential portions which are spaced apart from each other in the axial direction of the worm 280. These two circumferential portions define a groove 286. The two circumferential portions of the tooth 282 contact rollers 288 of three adjacent roller units 286, while the other portion of the tooth 282 contacts rollers 288 of two adjacent roller units 286. Like the rib 204 of the globoidal cam 200, the tooth 282 has opposite surfaces 290 which have respective recessed portions 292, 294, so that one of the rollers 288 of the roller unit 286 contacts one of the opposite surfaces 290 defining the groove 284, without a clearance, while the other of the rollers 288 of the roller unit 286 contacts the other of the opposite surfaces 290, without a clearance. The two rollers 288 of each roller unit 286 constitute a double-roller assembly.

In the present roller gear type speed reducing device, each roller unit 286 has the two rollers 288 for the following reason:

In the roller gear speed reducing device, the roller gear 210 is stopped at a desired angular position by stopping the rotation of the worm 280 at the corresponding angular position. To improve the angular positioning or indexing accuracy of the roller gear 210, it is preferable to eliminate the backlash between the rollers 288 and the surfaces 290 of the tooth 282, for minimizing a rotary motion transmitting error, at any angular position of the worm 280 throughout the full 360° angular range. However, it is almost impossible by the arrangement provided in the first embodiment using the globoidal cam 34 of single dwell type, namely, by adjusting the distance between the axes of the worm 280 and the roller gear 200 so that the rollers 288 contact the tooth 282 without a clearance, and by shaping the tooth 282 by local cutting, so as to prevent an excessive pre-load between the rollers 288 and the tooth 282. Even if the tooth 282 can be locally shaped with high accuracy to optimize the pre-load, it is extremely difficult to assure a sufficiently high degree of rotary motion transmitting accuracy in the shaped portion of the tooth 282, that is, a sufficiently high degree of angular positioning accuracy of the roller gear 210.

In the present third embodiment wherein each roller unit 286 has the two rollers 288, the clearance between the rollers 288 and the tooth 282 can be zeroed at any angular position of the worm 280, without local shaping or profiling of the tooth 282, for the reason which has been described with respect to the second embodiment of FIGS. 13–16. With the thus zeroed clearance, the distance between the axes of the roller gear 210 and the worm 280 is adjusted so as to optimize the pre-load between the rollers 288 and the tooth 282 at any angular position of the worm 280, namely, so as to minimize the variation in the pre-load during rotation of the worm 280. By reducing the distance between the axes of the roller gear 210 and the worm 280 while the clearance between the rollers 188 and the tooth 282 is zero, the amount of pre-load is larger by an extremely small amount at the angular position of the worm 280 at which the rollers 288 of the three adjacent roller units 286 contact the tooth 282, than at the angular position at which the rollers 288 of the two adjacent roller units 826 contact the tooth 282. The difference between the amounts of pre-load at these angular positions is extremely smaller than where the distance between the axes is reduced while some clearance is left between the rollers 288 and the tooth 282, as in the embodiment of FIGS. 13–15. Therefore, the present roller gear type speed reducing device has improved rotary motion transmitting accuracy and angular positioning accuracy, without significant pulsation. Further, since the direction of rotation of the rollers 288 is not reversed during the entire period of engagement with the worm 280, the service lives of the rollers 288 and the worm 280 are advantageously improved.

The method of manufacturing the present roller gear type speed reducing device includes a step of preparing the turret body 238, a step of preparing the roller shafts of the roller units 286, a step of preparing a preliminary roller gear assembly in the form of a preliminary roller turret assembly, and a step of implementing the angular pitch adjustment of the rollers 288. The angular pitch adjustment is implemented by using a jig incorporating a globoidal cam. This jig is similar in construction to the jig used for implementing the angular pitch adjustment of the rollers 214 of the globoidal cam index device shown in FIGS. 13–16. Namely, the jig used in the present third embodiment includes a master globoidal cam of single dwell type, which is similar to the master globoidal cam 260. This master globoidal cam used in the present embodiment is obtained by modifying the double enveloping worm 280 such that the tooth 282 has a radial or non-lead portion or a dwelling portion. Although the the angular pitch adjustment can be implemented while the roller gear 210 is in meshing engagement with the worm 280, the angular pitch adjustment is not easy in this case. That is, the angular pitch adjustment requires the roller gear 210 to be stopped at each of the angular positions (whose number is equal to the number of the roller units 286), such that each of the roller units 286 contacts the tooth 282 of the worm 280 at the same angular position of the worm 280. However, it is difficult to stop the rotation of the worm 280 such that each roller unit 286 contacts the same portion of the tooth 282 with high accuracy, and to thereby stop and maintain the roller gear 210 at the corresponding angular position. On the other hand, the use of the master globoidal cam permits easy positioning of the roller gear at each of the angular positions determined by the dwelling portion of the master globoidal cam, even where the angular positioning accuracy of the master globoidal cam is not so high. Thus, the master globoidal cam built in the jig facilitates the angular pitch adjustment of the roller gear 210. The roller gear 210 whose roller pitch has been adjusted by using the jig equipped with the master globoidal cam is built in the roller gear type speed reducing device such that the roller gear 210 meshes with the worm 280. The thus obtained speed reducing device has improved angular positioning accuracy. The angular pitch adjustment of the roller gear 210 is implemented in the same manner as described above with respect to the first embodiment.

After the angular pitch adjustment, the roller gear 210 is removed from the jig, and the roller shafts of the roller units 286 are fixed to the turret body 238 of the roller gear 210. The roller gear 210 is then built in the housing of the speed reducing device, in meshing engagement with the worm 280. Thus, the manufacture of the roller gear type speed reducing device according to the third embodiment is completed.

Figure 18:
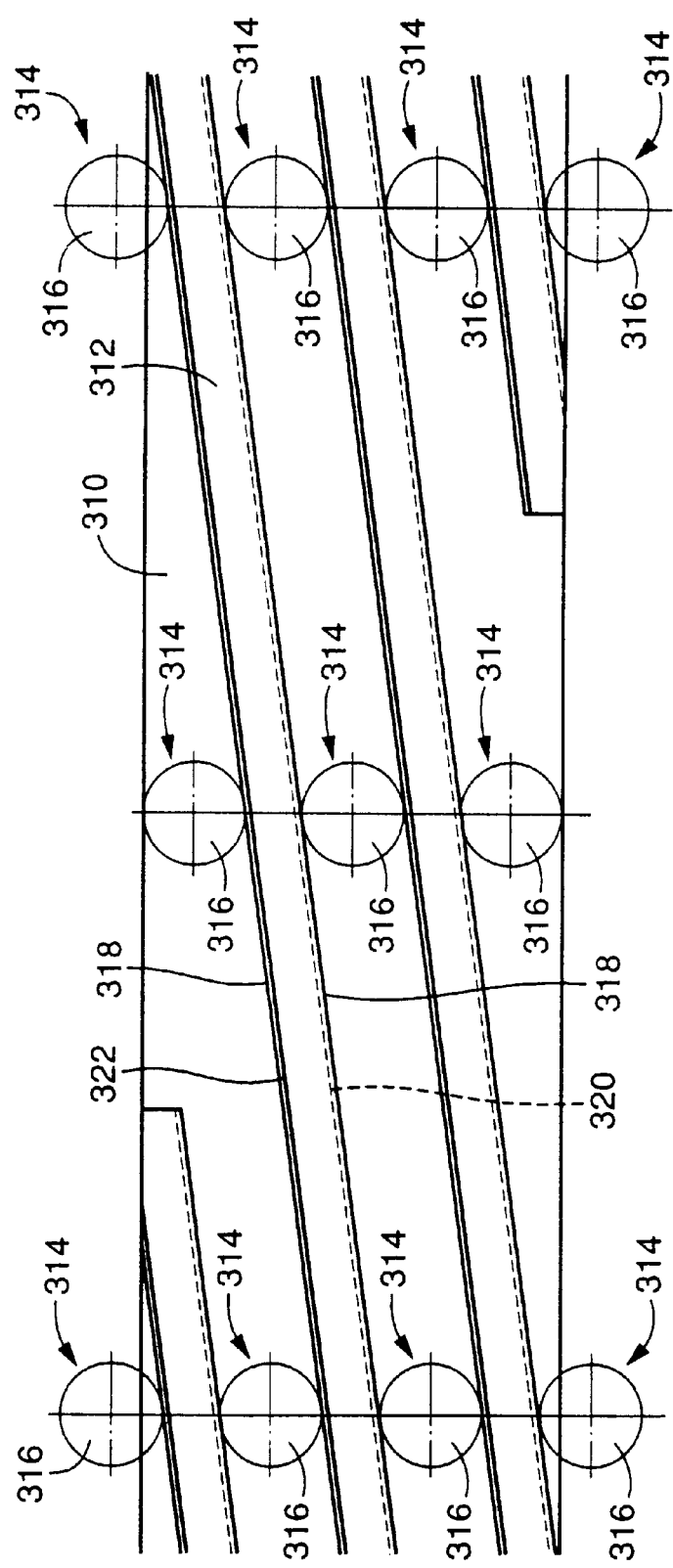
FIG. 18 is a developed view of a worm serving as a roller gear type speed reducing device according to a still further embodiment of the invention.
Figure 19:
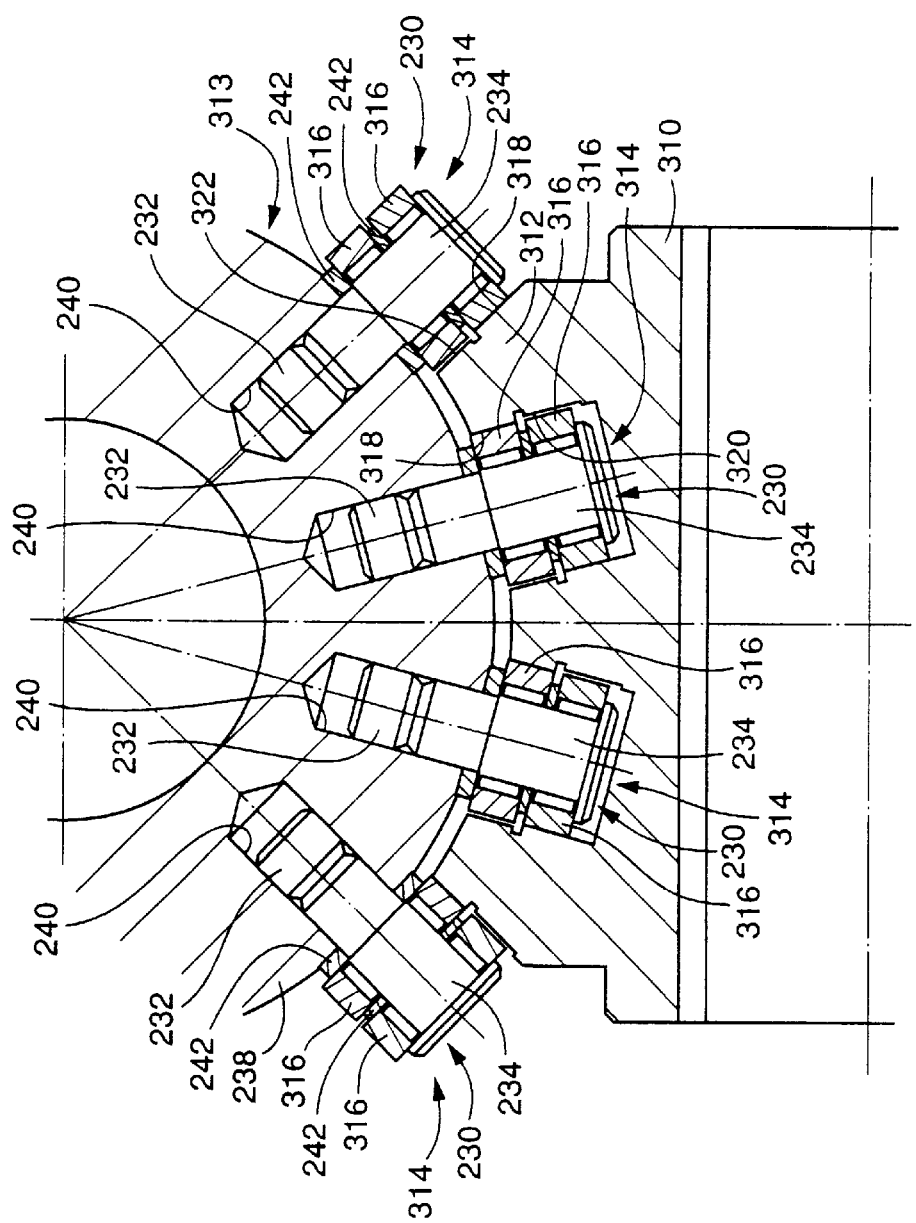
FIG. 19 is a fragmentary plan view in cross section of the worm of FIG. 18 in meshing engagement with a roller gear.

The roller gear type speed reducing device according to the present invention may use a worm 310 according to a fourth embodiment of this invention. The worm 310 has a tooth 312 including two circumferential portions which contact rollers 316 of three adjacent roller units 314 of a roller gear 313, and three circumferential portions which contact the rollers 316 of the four adjacent roller units 314 of the roller gear 313, as shown in FIGS. 18 and 19. Each of the roller units 314 has two rollers 316 which constitute a double-roller assembly. The tooth 312 has opposite surfaces 318 which have respective recessed portions 320, 322. The roller gear 313 is identical in construction with the roller gear 50 of the first embodiment of FIGS. 1–12, except in that each roller unit 314 has the two rollers 316 and two thrust pieces. That is, the roller gear 323 is identical with the roller gear 210 used in the embodiment of FIGS. 13–16. In FIG. 19, the same reference numerals as used in FIG. 14 is used to identify the functional corresponding components, which will not be described.

When the rollers 316 of the four adjacent roller units 314 contact the tooth 312 of the worm 310, as shown in FIG. 19, one of the two rollers 316 of each of the two outer roller units 314 contacts one of opposite surfaces 318 of the tooth 312, while the two rollers 316 of the two inner roller units 314 contact the respective opposite surfaces 318 of the tooth 312. Accordingly, the load capacity of the four adjacent roller units 314 is larger than the load capacity of four adjacent roller units each having only one roller contacting the tooth. Where each roller unit has only one roller, there must be left a clearance between each roller of the two inner roller units of the four adjacent roller units and the tooth of the worm. If a sum of the widths of the two rollers 316 of each double-roller roller unit 314 is the same as the width of the single-roller roller unit, the former load capacity is 1.5 times the latter load capacity.

Figure 20:
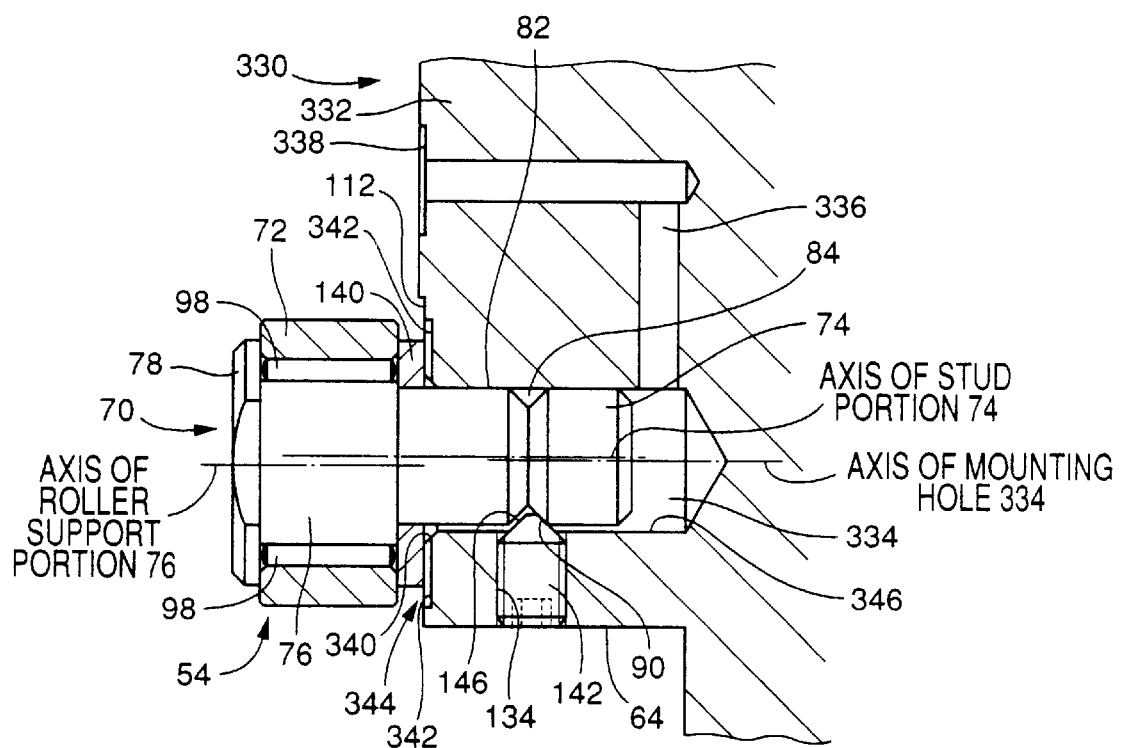
FIG. 20 is a front elevational view in cross section of a roller shaft provided on a turret body of a roller gear according to a yet further embodiment of this invention.

In the embodiments described above, the adhesive filler passage 126 is open at an intermediate portion of each mounting hole 110, 240, to inject the adhesive agent into the gap between the outer circumferential surface 82 of the stud portion 74 of each roller shaft 70, 230 and the inner circumferential surface 122 of the mounting hole 110, 240. However, the turret body of the roller gear may have an adhesive filler passage open to the bottom portion of the mounting hole 110. An example of this turret body according to a fifth embodiment of this invention is shown in FIG. 20 showing a fifth embodiment of this invention, wherein a turret body 332 of a roller gear 330 has an adhesive filler passage 332 which communicates at an inner end thereof with the bottom portion of each mounting hole 334 and at the outer end with the atmosphere. In a portion of the outer circumferential surface of the turret body 332 in which the adhesive filler passage 332 is open at its outer end, there is formed an adhesive filler inlet 338 having a relatively large diameter. Each mounting hole 334 has an annular chamfer portion 340 at its open end, and two communication holes 342 are formed in the outer circumferential surface of the turret body 332, in communication with the annular chamfer portion 340 such that the two communication holes 342 extend in the axial direction of the roller gear 330 from two diametrically opposite circumferential positions of the annular chamfer portion 340. The communication holes 342 are open to the atmosphere even while the thrust piece 140 is held in contact with the flat seat 112 in which the mounting hole 334 is open. The annular chamfer portion 340 and the communication holes 342 define an air breather passage 344. In the other aspects, the roller gear 330 is identical with the roller gear 50, and the same reference numerals as used in FIGS. 5A and 5B are used in FIG. 20 to identify the functionally corresponding components, redundant description of which will not be provided.

After the angular pitch adjustment of the cam followers 54 of the roller gear 330, the roller shafts 70 are fixed to the turret body 332 by tightening the setscrews 142, and the adhesive agent is injected through the adhesive filler passage 336 into the gap between the outer circumferential surface 82 of the stud portion 74 and an inner circumferential surface 346 of the mounting hole 334. The adhesive filler initially injected into the bottom portion of the mounting hole 334 is forced to flow from the bottom portion toward the open end of the hole 334 through the above-indicated gap, while forcing air from the bottom portion toward the annular chamfer portion 340 at the open end of the hole 334, from which the air is discharged into the atmosphere through the communication holes 342. In FIG. 20, the gap between the outer and inner circumferential surfaces 82, 346 is shown larger than it is, for easier understanding.

Figure 21:
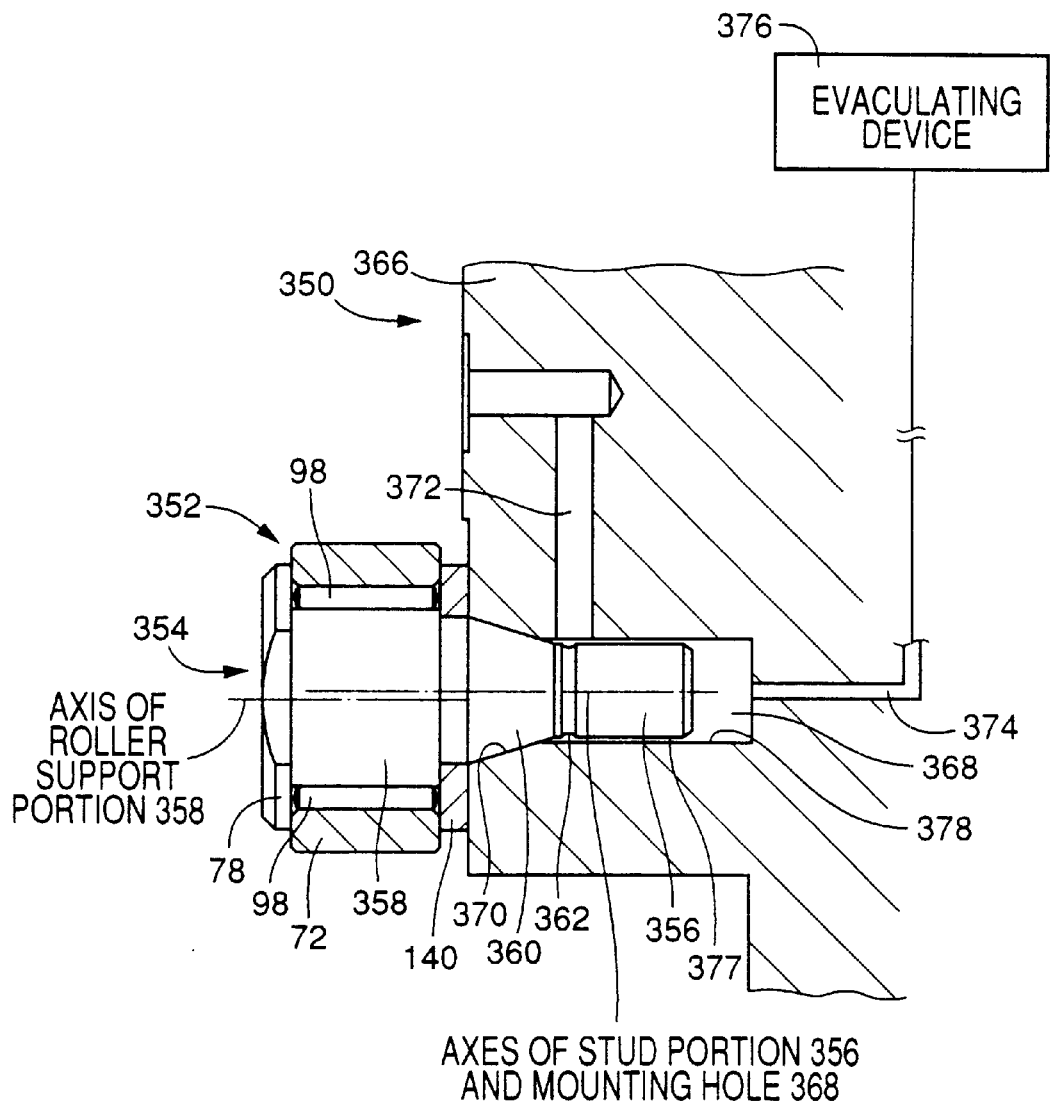
FIG. 21 is a front elevational view in cross section of a roller shaft and a roller provided on a turret body of a roller gear according to still another embodiment of the invention.

In the above embodiments, the roller shafts 70, 230 are fixed to the turret body 52, 238, 332 by the setscrews 142 and bonded thereto by the adhesive agent 150. However, the use of the setscrews 142 to fix the roller shafts is not essential. An example of this modification according to a sixth embodiment of the invention is shown in FIG. 21, wherein a roller gear 350 has a plurality of cam followers 342 each having a roller shaft 354. The roller shaft 354 has a stud portion 356 and a roller support portion 358. The stud portion 356 includes a tapered part 360 whose diameter decreases in an axial direction away from the roller support portion 358. The stud portion 456 has an annular groove 362 formed adjacent to one of the opposite axial ends of the tapered part 360 which is remote from the roller support portion 358.

The roller gear 350 has a turret body 366 having mounting holes 368 formed in its radial direction and open in its outer circumferential surface. Each mounting hole 368 has a tapered portion 370 formed adjacent to its open end and having a taper angle corresponding to the tapered part 360. The straight part of the stud portion 356 has a diameter slightly smaller than that of the straight part of the mounting hole 368. The turret body 366 has a plurality of adhesive filler passages 372 corresponding to the mounting holes 368. Each adhesive filler passage 372 is open at its outer end in the outer circumferential surface of the turret body 366, and at its inner end with to a portion of the mounting hole 368 which is adjacent to the inner or smaller end of the tapered part 360. The bottom portion of the mounting hole 368 is connected to an evacuating device 376 through a connecting passage 374, via a rotary joint (not shown). In other aspects, the roller gear 350 is identical with the roller gear 50 of the first embodiment of FIGS. 1–12. The same reference numerals as used in FIGS. 5A and 5B are used in FIG. 21, to identify the functionally corresponding components, redundant description of which will not be provided.

The roller shaft 354 is fitted at its stud portion 356 in the mounting hole 368 such that the tapered part 360 of the stud portion 356 engages the tapered portion 370 of the mounting hole 368. The engagement of the tapered part 360 with the tapered portion 370 assures a high degree of alignment of the axis of the roller shaft 354 with the centerline of the mounting hole 368, even in the presence of a gap between an outer circumferential surface 377 of the inner straight part of the stud portion 356 and an inner circumferential surface 378 of the inner straight part of the hole 368. The air in the mounting hole 368 is sucked by the evacuating device 376, so that the stud portion 356 is positioned in the mounting hole 368 in both the radial and axial directions. Thus, each roller shaft 354 is fixed to the turret body 366, in concentric relationship with the mounting hole 368. The mounting hole 368 is evacuated even while the angular pitch adjustment of the rollers 72 is implemented. After the angular pitch adjustment is completed, a filler material in the form of an adhesive agent under pressure is injected through the adhesive filler passage 372, by an amount sufficient to fix the roller shaft 354 to the turret body 366. The adhesive agent initially fed into the annular groove 362 is forced to flow in the circumferential direction, filling the annular gap between the outer circumferential surface 377 of the stud portion 356 and the inner circumferential surface 378 of the mounting hole 368. In FIG. 21, the clearance is shown larger than it is, for easier understanding.

Since the air in the mounting hole 368 is sucked by the evacuating device 376 even while the adhesive agent is injected through the adhesive filler passage 372, the adhesive agent is drawn into the above-indicated clearance, under a reduced pressure in the bottom portion of the mounting hole 368 and the above-indicated clearance. After the stud portion 356 is fixed to the turret body 366 by the adhesive agent, the evacuating device 376 is turned off.

Figure 22:
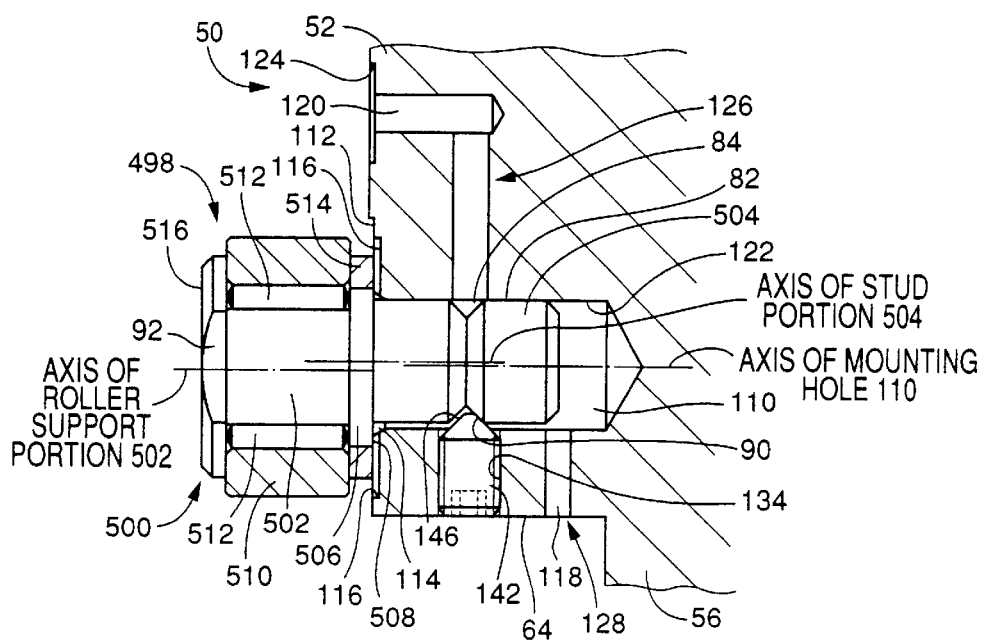
FIG. 22 is a front elevational view in cross section of a roller shaft and a roller of a globoidal cam index device according to yet another embodiment of this invention.

In the above embodiments, the roller support portion 76, 234 of the roller shaft 70, 230 has a larger diameter than that of the stud portion 74, 232, and the abutting surface 90, 244 is provided between the roller support portion 76, 234 and the stud portion 74, 232. However, the roller shaft may have a radially outwardly extending flange portion between the roller support and stud portions, so that one of the opposite surfaces of the flange portion which is on the side of the stud portion is used as an abutting surface. In this case, the diameter of the roller support portion may be equal to or even smaller than the diameter of the stud portion. An example of this roller shaft according to a seventh embodiment of this invention is shown in FIG. 22, wherein a roller shaft 500 of a cam follower 498 includes a roller support portion 502 whose diameter is smaller than that of a stud portion 504 and which is eccentric with respect to the stud portion 504. Further, the roller shaft 500 further includes a radially outwardly extending flange portion 506 which is located between the roller support and stud portions 502, 504 and which is concentric with the roller support portion 502. One of the opposite surfaces of the flange portion 506 serves as an abutting surface 508 for abutting contact with the flat seat 112 formed on the outer circumferential surface of the turret body 52. The flange portion 506 has a diameter smaller than the inside diameter of a roller 510, so that the roller 510 can be axially moved over the outer circumferential surface of the flange portion 506, when the roller 510 is fitted on a cylindrical array of needle rollers 512 fitted on the roller support portion 502.

When each roller shaft 500 is fixed to the turret body 52, a ring-shaped spacer 514 is fitted on the flange portion 506, and the stud portion 504 is fitted in the mounting hole 110. The setscrew 142 is screwed into the tapped hole 134, with the tapered surface 146 in pressing contact with the tapered surface 90 of the Vee-groove 84, so that the stud portion 504 is moved toward the bottom of the mounting hole 110, and the abutting surface 508 is brought into abutting contact with the flat seat 112. The spacer 512 has the same axial dimension as the flange portion 506. Between the opposite axial end faces of the roller 502 and the head portion 516 of the roller shaft 500 and the spacer 514, there are left small amounts of clearance, so as to permit rotation of the roller 510 relative to the head portion 156 and the spacer 514, while substantially inhibiting axial movement of the roller 510. The diameter of the spacer 514 is larger than the inside diameter of the roller 510 and smaller than the outside diameter of the same. In the other aspects, the embodiment of FIG. 22 is identical with the embodiment of FIGS. 1–12. The same reference numerals as used in FIGS. 5A and 5B are used in FIG. 22 to identify the functionally corresponding components, redundant description of which will not be provided.

In the embodiments of FIGS. 13–16, FIG. 17 and FIGS. 18–19 wherein each cam follower or roller unit has two rollers, the roller shaft may have a radially outwardly extending flange portion between the roller support and stud portions, so that one of the opposite surfaces of the flange portion which is on the side of the stud portion is used as an abutting surface. In this case, too, the diameter of the roller support portion may be equal to or even smaller than the diameter of the stud portion.

Figure 23:
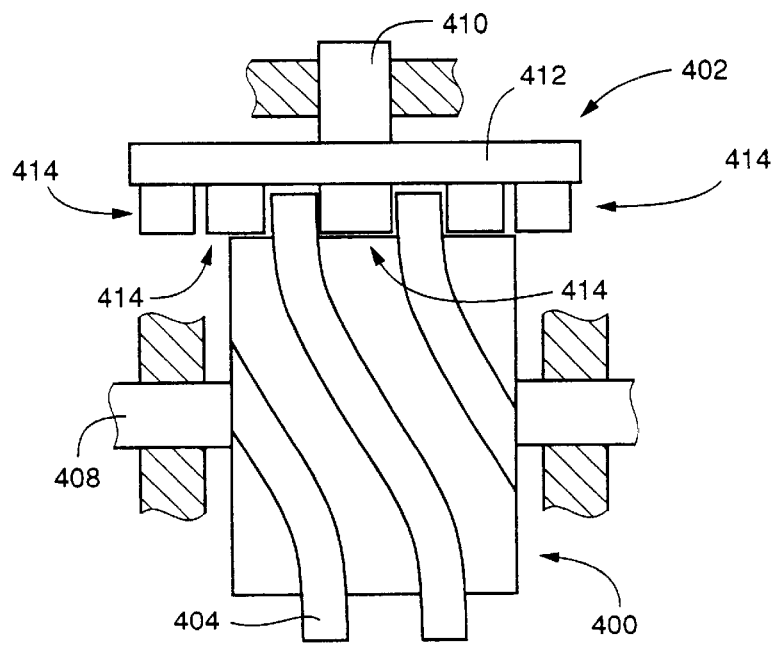
FIG. 23 is a plan view partly in cross section schematically illustrating a barrel cam index device according to yet a still further embodiment of this invention.

Referring next to FIG. 23, there will be described an eighth embodiment of the present invention in the form of a barrel cam index device. The barrel cam index device includes a barrel cam 400 and a roller turret 402. The roller turret 402 serves as a face roller gear. The barrel cam 400 has a rib 404 including an indexing portion and a dwelling portion, and is rotatably supported by a cam shaft 408.

The roller turret 402 is supported by a roller turret shaft 410 rotatably about an axis thereof which is perpendicular to an axis of rotation of the barrel cam 400. The roller turret 402 includes a turret body 412 which carries a plurality of cam followers 414. The turret body 412 and the cam followers 414 are respectively identical with the turret body 52 and the cam followers 54 of the roller gear 50 described above, except that the cam followers 414 equiangularly arranged in the circumferential direction of the turret body 412 have their axes parallel to the axis of rotation of the turret body 412, unlike the cam followers 54 whose axes extend in the radial direction of the turret body 52. The turret body 412 has a plurality of mounting holes formed therein so as to extend in the axial direction of the turret body 412, so that the roller shafts of the cam followers 414 are fitted at their stud portions in the respective mounting holes, such that the axes of the roller shafts extend in the axial direction of the turret body 412.

In the barrel cam index device of FIG. 23, the plane of rotation of the roller turret 402 is substantially parallel to a direction of tangency to the outer circumferential surface of the barrel cam 400, and is slightly spaced from the circumference of the barrel cam 400 in the axial direction of the turret body 412. The angular intervals between the rollers of the adjacent cam followers 414 can be adjusted as described above with respect to the first embodiment of FIGS. 1–12, and the roller shafts are fixed to the turret body 412, in the same manner as described above with respect to the first embodiment. Thus, the roller turret 402 has a high degree of angular pitch accuracy, and the barrel cam index device including the roller turret 402 assures a high degree of angular positioning or indexing accuracy.

The barrel cam used in the barrel cam index device may be either a single dwell type or a double dwell type. The roller shaft of each cam follower 414 may be either a single-roller type having only one roller or a double-roller type having two rollers.

Figure 24:
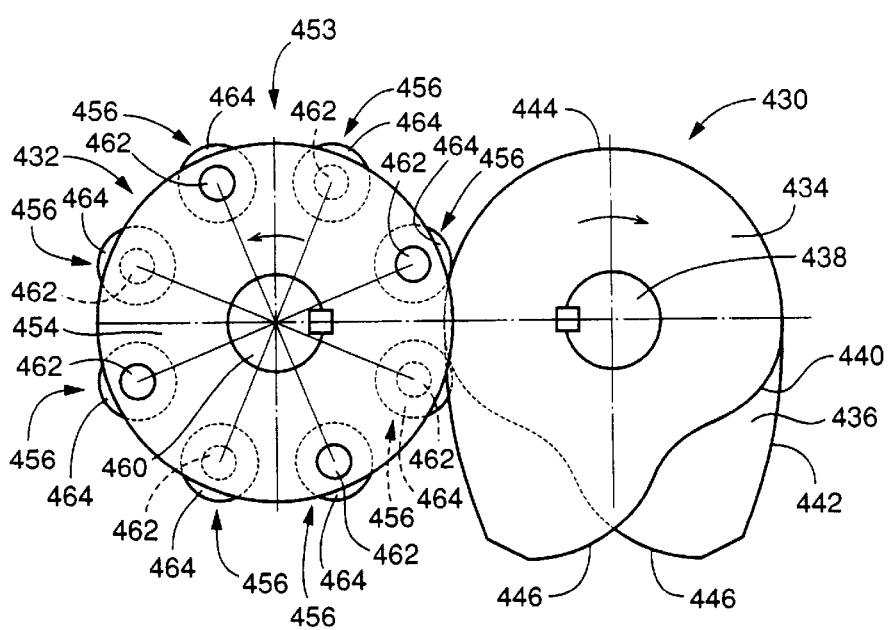
FIG. 24 is a plan view schematically illustrating a barrel cam index device according to a yet further further embodiment of this invention.

Reference is now made to FIG. 24 showing a ninth embodiment of this invention in the form of a parallel cam index device including a zigzag type roller turret. The barrel cam index device includes a plate cam unit 430, and a roller turret in the form of a roller turret 432 of zigzag type. The plate cam unit 430 includes a first plate cam 434 and a second plate cam 436. These two plate cams 434, 436 are mutually concentrically attached to a shaft 438 so that the plate cams 434, 436 are rotated with the shaft 438. The first and second plate cams 434, 436 have respective cam surfaces 440, 442 each of which has a dwelling portion 444 and an indexing portion 446. These cam surfaces 440, 442 are symmetrical with each other with respect to a straight line (indicated by one-dot chain line in FIG. 23) perpendicular to the axis of the shaft 438.

The zigzag type roller turret 432 includes a turret body 453 which carries eight cam followers 456. The turret body 453 includes three plate members 454 (only one of which is shown in FIG. 24), which are mutually concentrically attached to a shaft 460 such that these plate members 454 are rotated with the shaft 460. The three plate members 454 are spaced apart from each other in the axial direction of the shaft 460. The shaft 460 has an axis parallel to the axis of the shaft 438, so that the plate cam unit 430 and the zigzag type roller turret 432 are rotated about the respective two axes parallel to each other.

The eight cam followers 456 consist of four first cam followers supported by the intermediate plate member 454 and one of the two outer plate members 454, and four second cam followers supported by the intermediate plate and the other of the two outer plate members 454. These eight cam followers 456 are equiangularly spaced from each other in the circumferential direction of the turret body 453, such that the first and second cam followers 454 are arranged alternately in the circumferential direction of the turret body 453. Namely, the angular interval between the adjacent first and second cam followers 456 is 45°, while the angular interval between the adjacent first or second cam followers 456 is 90°.

Each cam follower 456 includes a roller shaft 462 and a roller 464. The roller shaft 462 consists of an intermediate roller support portion for rotatably supporting the roller 464 between the adjacent plate member 454, and two concentric shaft portions extending from the respective opposite ends of the intermediate roller support portion such that the two shaft portions are eccentric with respect to the roller support portion. The two shaft portions engage the two adjacent plate members 454 such that the shaft portions are parallel to the axis of the shaft 460. The roller shaft 462 is fixed to the outer one of the two adjacent plate members 454, at one of its two shaft portions which engages the outer plate member 454. Each of the three plate members 454 has mounting holes formed therein so as to extend in the axial direction of the turret body 453. The roller shaft 462 is fixed at the above-indicated one of the two shaft portions in the corresponding mounting hole formed in the outer plate member 454, by a setscrew and an adhesive agent, in the same manner as described above with respect to the preceding embodiments. It will be understood that the above-indicated one of the two shaft portions functions as a stud portion of the roller shaft 462, while the other shaft portion functions as an auxiliary support portion for supporting the roller shaft 462. Thus, each roller 464 is supported between the two adjacent plate members 454, rotatably about an axis thereof parallel to the axis of the zigzag type roller turret 432.

It will be understood that the intermediate plate member 454 cooperates with one of the two outer plate members 454 to constitute a turret body of a first roller turret portion, and cooperates with the other outer plate member 454 to constitute a turret body of a second roller turret portion, and that each of the first and second roller turret portions includes the four first or second cam followers, and fixing means including corresponding sets of the setscrews and the masses of the adhesive agent. The first and second roller turret portions are superposed on each other in the axial direction of the roller turret 432. The rollers 464 of the first cam followers 456 of the first roller turret portion engage the cam surface 440 of the first plate cam 434, while the rollers 464 of the second cam followers 456 of the second roller turret portion engage the cam surface 442 of the second plate cam 436. The rollers 464 of the first cam followers 456 and the rollers 464 of the second cam followers 456 are arranged alternately in the circumferential direction of the roller turret 432 and are located at respective two axial positions of the roller turret 432.

When the first and second plate cams 434, 436 are rotated, the indexing portion 446 of the cam surface 440 of the first plate cam 434 pushes the roller 464 of one of the two adjacent cam followers 456, to thereby rotate the zigzag type roller turret 432, while the roller 464 of the other of the adjacent two cam followers 456 engages the indexing portion 446 of the cam surface 442 of the second plate cam 436, to thereby prevent free rotation of the roller turret 432 by the first cam plate 434. When the indexing portion 446 of the cam surface 436 of the second plate cam 436 pushes the roller 464 of the above-indicated other cam follower 456, the roller turret 432 is rotated, while the roller 456 of the above-indicated one cam follower 456 engages the indexing portion 446 of the cam surface 440 of the first plate cam 434, to thereby prevent free rotation of the roller turret 432 by the second cam palate 436. Thus, the first and second cam plates 434, 436 function as positive motion cams. When the two adjacent cam followers 456 are brought into engagement with the dwelling portions 444 of the first and second plate cams 434, 436, the roller turret 432 is stopped at a predetermined angular position.

The adjustment of the angular intervals between the rollers 464 of the adjacent cam followers 456 in the present zigzag roller turret 432 according to the ninth embodiment is implemented by rotating the roller shafts 462 of the cam followers 456, in the same manner as described with respect to the first embodiment of FIGS. 1–12. Thus, the roller turret 432 has a high degree of angular pitch accuracy, and the parallel cam index device including the roller turret 432 assures a high degree of angular positioning or indexing accuracy.

The roller shaft of each cam follower 456 may be fixed in the corresponding mounting holes in the two adjacent plate members 454 by the fixing means, at both of the two shaft portions. In this case, both of the two shaft portions serve as the stud portion of the roller shaft 462.

Further, the roller shaft of each cam follower 456 may be fixed in the mounting hole in the intermediate plate member 454 by the fixing means, at the corresponding one of the two shaft portions. In this case, the shaft portion fixed to the intermediate plate member 454 functions as the stud portion of the roller shaft 462, while the other shaft portion functions as an auxiliary support portion.

The turret body of the zigzag roller turret may consist of two plate members fixed to the shaft 460 such that the two plate members are spaced apart from each other in the axial direction. In this case, the cam followers are supported by the two plate members such that the cam followers are equiangularly arranged in the circumferential direction of the turret body, and such that the rollers of the cam followers are alternately located at two different axial positions which are relatively nearer to the respective two plate members. In this arrangement, one of the two plate member, the cam followers whose rollers are nearer to that one plate member and the corresponding fixing means constitute a first roller turret portion, while the other plate member, the cam followers whose rollers are near to this other plate member and the corresponding fixing means constitute a second roller turret portion.

Figure 25:
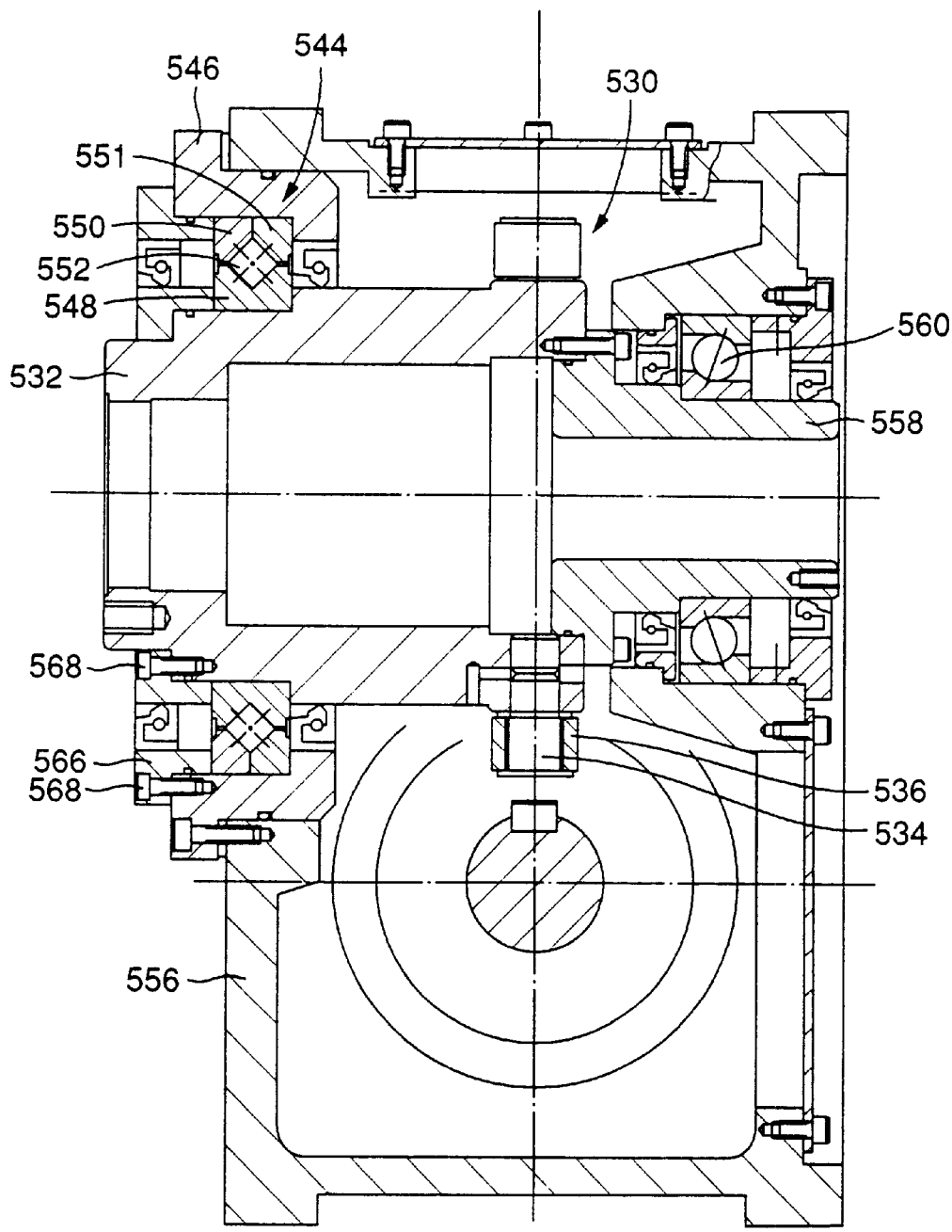
FIG. 25 is a front elevational view in cross section of a roller gear type rotary motion transmitting device according to yet another embodiment of this invention.
Figure 26:
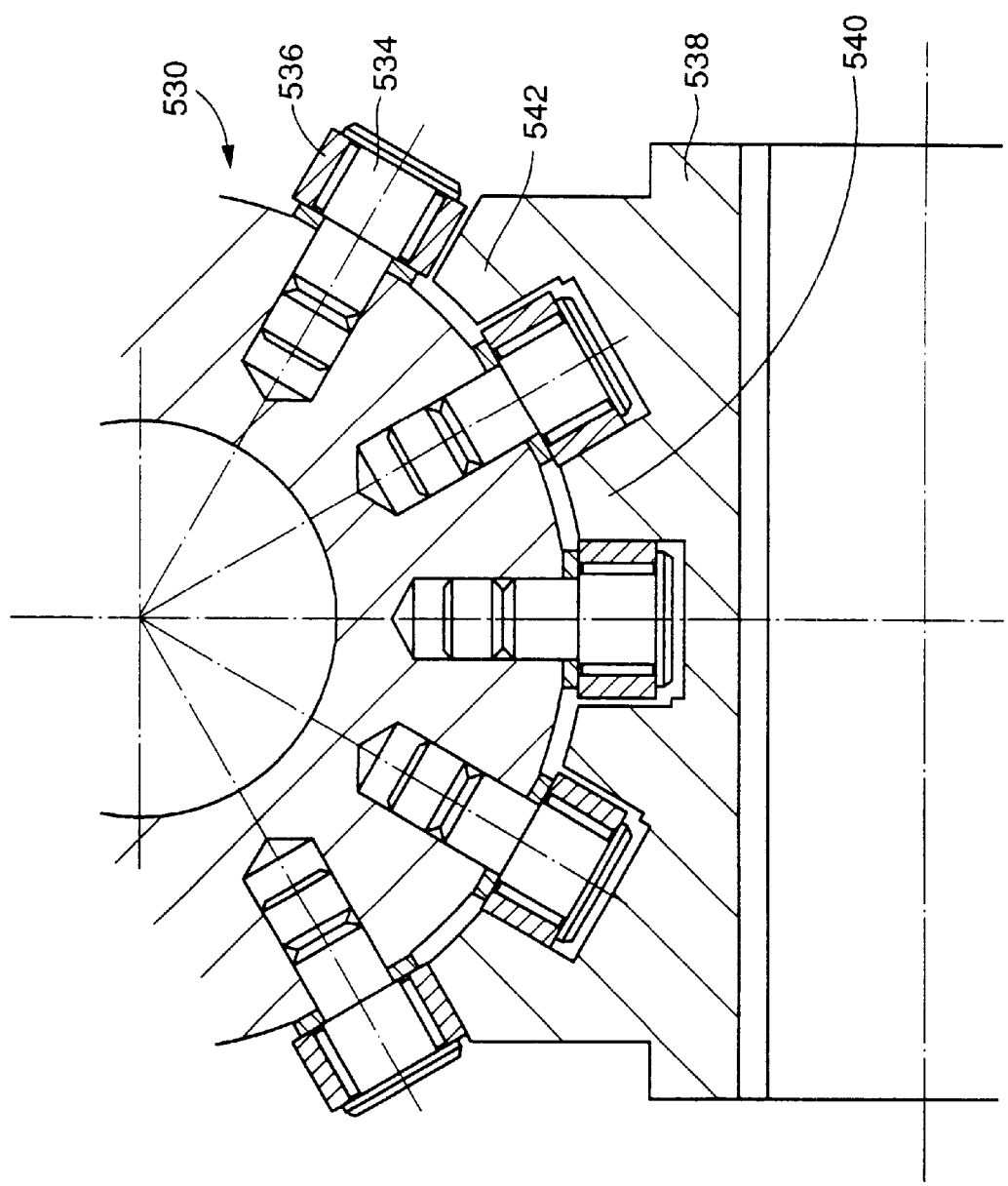
FIG. 26 is a fragmentary plan view in cross section of a worm in meshing engagement with a roller gear in the embodiment of FIG. 25.
Figure 27:
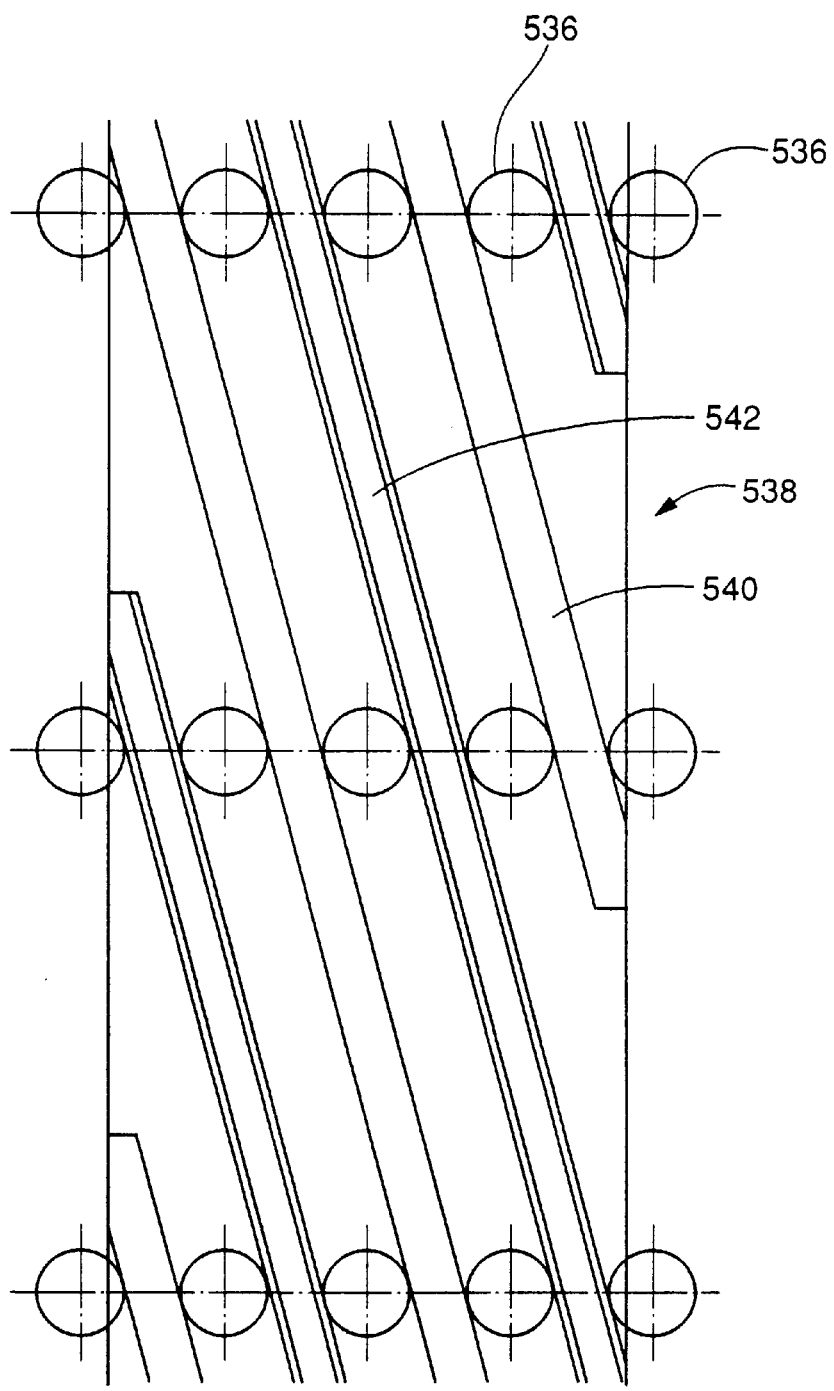
FIG. 27 is a developed view of the worm of FIG. 25.

Referring next to FIGS. 25–28, there will be described a roller turret type rotary motion transmitting device in the form of a roller gear type speed reducing device according to a tenth embodiment of this invention. This speed reducing device is characterized in particular by (a) a support structure for supporting a roller gear shaft 532 which is formed integrally with a roller gear 530, as shown in FIG. 25, (b) that each cam follower of the roller gear 530 includes a single roller 536 rotatably mounted on a roller shaft 534, as shown in FIG. 26, and (c) that a worm 538 which meshes with the roller gear 530 has two differently shaped ribs 540, 542, as shown in FIGS. 27 and 28.

As shown in FIG. 25, the roller gear shaft 532 is supported one axial end portion by a bearing housing 546 through a cross roller bearing 544. The cross roller bearing 544 consists of an inner race 548, two outer races 550, 551, and a circular array of rollers 552 interposed between the inner and outer races 548, 550, 551 such that the axes of the rollers 552 are inclined at two different angles with respect to the axis roller gear shaft 532. More specifically described, the rollers 552 consist of first rollers whose axes are inclined at +45°, and second rollers which are interposed between the adjacent first rollers and whose axes are inclined at −45°, so that the rollers 552 are alternately inclined at +45° and −45°. The single cross roller bearing 544, which rotatably supports the roller gear shaft 532, also functions to inhibit radial and axial movements of the roller gear shaft 532 and inclination of its axis in all directions relative to the bearing housing 646, that is, relative to a housing body 556 of the speed reducing device in which the roller gear 530 and the worm 538 are incorporated. Each roller 552 of the cross roller bearing 544 has an axial length which is slightly smaller than its diameter. Since the cross roller bearing 544 has a sufficiently large diameter, this single bearing 544 is capable of preventing the inclination of the roller gear shaft 532 in any direction relative to the bearing housing 546, as well as the radial and axial movements of the roller gear shaft 532 relative to the bearing housing 546.

The roller gear shaft 532 has an auxiliary shaft member 532 fixed to its free end. This auxiliary shaft member 532 may be considered to be a part of the roller gear shaft 532. The roller gear shaft 532 is also supported at the auxiliary shaft member 532 by the housing body 556 through an auxiliary bearing 560 in the form of an angular ball bearing. Although the roller gear shaft 532 appears to be supported at its opposite axial end portions by the housing body 556 through the cross roller bearing 544 and the auxiliary bearing 560, the auxiliary bearing 560 does not actually function to position the auxiliary shaft member 558 or the roller gear shaft 532, since the auxiliary bearing 560 has a comparatively large amount of clearance. The function of the auxiliary bearing 560 is to prevent a large amount of inclination of the roller gear shaft 532, by supporting the roller gear shaft 532 at its free end through the auxiliary shaft portion 558, when the roller gear shaft 532 or the cross roller bearing 544 has a large amount of elastic deformation due to a large load acting on the roller gear shaft 532 in the radial direction. Thus, the roller gear shaft 532 is practically supported at its one axial end portion in a cantilever fashion, by the housing body 556 of the speed reducing device through the cross roller bearing 544 and the bearing housing 546.

Owing to the unique support structure for supporting the roller gear shaft 532 as described above, the body of the roller gear 530 carrying the rollers 536, the roller gear shaft 532, the cross roller bearing 544 and the bearing housing 546 can be easily installed on and removed from the housing body 556, as a sub-assembly. This sub-assembly is obtained by installing the roller gear shaft 532 (with the cam followers consisting of the roller shafts and the rollers 536), the cross roller bearing 544 and the bearing housing 546, in an assembling jig equipped with a master globoidal cam having a dwelling portion, which is used in place of the worm 538. The angular pitch of the rollers 536 is adjusted by rotating the master globoidal cam, as described above with respect to the second embodiment of FIGS. 13–16. Then, the sub-assembly consisting of the roller gear shaft 532 (with the cam followers), the cross roller bearing 544 and the bearing housing 546 is removed from the assembling jig. The thus obtained sub-assembly whose angular pitch of the rollers 536 has been adjusted can be readily incorporated in the housing body 556 such that the roller gear 530 meshes with the worm 530.

Since the cross roller bearing 544 has high degrees of accuracy in various aspects, repeated assembling and disassembling of the sub-assembly indicated above will not cause a significant problem regarding the positioning accuracy of the roller gear shaft 532, where the speed reducing device is used for ordinary application or where the required accuracy of the speed reducing device is not so high. However, the required accuracy of the speed reducing device may be high. For instance, the required accuracy is so high that it is necessary to avoid even a slight amount of misalignment of the roller gear shaft 532 relative to the bearing housing 546 due to a variation in the tightening force applied to different bolts 568 for fixing a bearing cover 566 for securing the cross roller bearing 544 to the bearing housing 546. In this case, it is desirable not to disassemble the above-indicated sub-assembly after the angular pitch of the rollers 536 has been adjusted by using the assembling jig. In the first embodiment of FIGS. 1–12 wherein the roller gear shaft 56 is supported at its opposite axial end portions by the housing 10 through the pair of bearings 58, 60, as shown in FIG. 3, at least the bearing 58 must be removed from the assembling jig to remove the roller gear shaft 56 from the assembly jig, if the angular pitch adjustment is made using the assembling jig. In the present tenth embodiment, the roller gear shaft 532, cross roller bearing 544 and bearing housing 546 can be removed from the assembling jig, as the sub-assembly, namely, without disassembly the sub-assembly into its components after the angular pitch adjustment.

On the other hand, the worm 538 has the two ribs 540, 542 as indicated above. As shown in FIG. 28, the two ribs 540, 540 are initially formed by machining as indicated by two-dot chain lines, and then one of the thus formed two ribs 540, 540 is subjected at its opposite surfaces to an operation to provide respective recessed portions, so that the rib 542 having the recessed portions at its opposite surfaces is eventually formed. These two different ribs 540, 542 define two grooves each of which is defined by two opposite surfaces. One of these opposite surfaces of each groove is engageable with the roller 536 while the other of these surfaces is not engageable with the roller 536 in the presence of the recessed portion in that other surface, as indicated in FIG. 27. Namely, the two adjacent rollers 536 of the roller gear 530 on the opposite sides of the rib 540 contact the opposite surfaces of that rib 540, while the two adjacent rollers 536 on the opposite sides of the rib 542 having the recessed portions do not contact the opposite surfaces of that rib 542. In other words, the roller 536 engaging each groove contacts the non-recessed surface of the rib 540 on one of its opposite sides, but does not contact the recessed surface of the rib 542 on the other side. Thus, each roller shaft 534 has the single roller 536 rotatably mounted thereon, unlike the roller shaft 230 having two rollers 214 in the second embodiment of FIG. 14.

In the present tenth embodiment, the roller gear shaft 532 is supported by the single bearing housing 544 is through the single cross roller bearing 544. However, the roller gear shaft 532 may be supported by the single bearing housings through two bearings, for example, two tapered roller bearings whose tapered rollers are tapered in opposite directions, or or two angular bearings, provided the bearing device permits rotation of the roller gear shaft 532 but inhibits radial and axial movements and inclination in all directions of the roller gear shaft 532 relative to the bearing housing.

While the worm 534 has the two ribs 540, 542, the worm 534 may have any desired number of ribs. The speed ratio of the roller gear 530 and the worm 534 changes toward "1" as the number of the ribs is increased. For instance, roller gear type rotary motion transmitting device (in the narrow sense) whose speed ratio (speed reducing ratio) is "1" can be obtained by using the worm which has twelve ribs including six recessed ribs, and the roller gear having twelve rollers rotatably mounted on respective roller shafts. This rotary motion transmitting device has a wide range of applications, for instance, for transmitting a rotary motion between two shafts or connecting two shafts without a backlash in various automation machines.

While the presently preferred embodiments of this invention have been described above, it is to be understood that the invention may be otherwise embodied with various changes and modifications.

In the roller turret cam index device including a globoidal cam of single dwell type or a barrel cam, for instance, the provision of two rollers on each cam follower and the provision of recessed portions on the surfaces of the rib of the cam are not essential. Namely, such roller turret cam index device may be adapted such that each cam follower has only one roller, while the rib does not the recessed portions.

While the illustrated embodiments are provided with the center distance adjusting device for adjusting the distance between the axis of the globoidal cam, barrel cam or worm and the axis of the roller gear (spur roller gear) or the roller turret (face roller gear), the center distance adjusting device may be incorporated in the roller gear or roller turret.

However, the provision of the center distance adjusting device or the adjustment of the distance between the axis of the globoidal or barrel cam or the worm and the axis of the roller gear or roller turret (spur or face roller gear) is not essential, although the adjustment is desirable to assure optimum engagement of the rollers with the rib of the cam or the tooth of the worm, and to lower the required dimensional accuracy of the rollers and the accuracy of shaping or profiling of the rib of the cam or the tooth of the worm.

Although the roller gear 50, 210, 313, 330, 350, 530 are formed integrally with the roller gear shaft 56, 532 in the illustrated embodiments, the roller gear and the roller gear shaft may be separate pieces, which are fixed together by suitable fixing means after the roller gear is coaxially fitted on the roller gear shaft. For instance, the roller gear shaft may be a stepped shaft, so that the roller gear is fitted on the small-diameter portion of the stepped shaft and bolted or otherwise fixed to the large-diameter portion.

In the roller turret type rotary motion transmitting device, a larger number of adjacent roller units, for example, five adjacent roller units may be engageable with the rib of the cam or the tooth of the worm.

The rib or tooth of the globoidal cam, barrel cam or worm need not be of a single-start thread type, but may be of a multiple-start thread type wherein the number of thread starts is equal to two or more.

While the encoder is used to detect the angular positions of the roller turret during the angular pitch adjustment of the adjacent rollers in the illustrated embodiments, other rotation angle detectors such as an autocollimetor may be used, provided that the detectors have a high degree of angular position detecting accuracy.

The roller turret cam or worm, which is driven by an electric motor equipped with a brake in the illustrated embodiments, may be driven by other drive sources such as an electric motor equipped with a clutch, an induction motor, and a servomotor, which are capable of controlling its angle and speed of rotation.

The arrangements shown in FIGS. 20 and 21 are equally applicable to a face roller gear and a zigzag roller turret, as well as a spur roller gear. That is, these arrangements are applicable to any type of roller turret used in a roller turret cam index device and a roller turret rotary motion transmitting device.

To facilitate air breathing upon injecting an adhesive agent into the gap between the outer circumferential surface of the stud portion of each roller shaft and the inner circumferential surface of the corresponding mounting hole, it is preferable to provide a plurality of air breather passages (air breather grooves, holes and communication passages) for each mounting hole. However, the provision of a single air breather passage is desirable to permit easier and stable filling of the entire gap with the adhesive agent while preventing a leakage of the adhesive agent from the mounting hole. In this case, the single air breather passage is preferably open to a circumferential portion of the mounting hole which is diametrically opposite to a circumferential portion at which the tapped hole for the setscrew is open and at which the stud portion of the roller shaft is forced against the inner circumferential surface of the mounting hole. In the embodiments of FIGS. 5A and 20, the two air breather grooves 116 or communication passages 342 are provided in communication with the annular recess in the form of the annular chamfer portion 114, 340 at the open end of the mounting hole 110, 334. However, each mounting hole may be provided with only one of these two grooves 116 or passages 342 which communicates with the annular chamfer portion 114, 340 at the circumferential position at which the stud portion is forced against the inner circumferential surface of the mounting hole.

Where the angular pitch adjustment of the rollers is effected by using the jig equipped with the master globoidal cam, the roller shafts may be fixed to the turret body of the roller turret by injecting the adhesive agent after the angular pitch adjustment, while the roller turret is built in the jig. In this case, the roller turret is removed from the jig after the roller shafts are fixed to the turret body. However, the roller shafts are preferably fixed to the turret body by the adhesive agent after the roller turret is removed from the jig after the angular pitch adjustment. In this latter case, the angular pitch adjustment for the next non-adjusted roller turret can be effected with the jig simultaneously with the operation to fix the roller shafts to the turret body of the present adjusted roller turret, so that the efficiency of use of the jig is accordingly improved.

In the angular pitch adjustment of the rollers is implemented while the roller turret is in meshing engagement with the dwelling portion of the roller turret cam, in the illustrated embodiments. However, the angular pitch adjustment in the roller turret type rotary motion transmitting device may be implemented with the roller turret in meshing engagement with a worm. This adjustment can be implemented relatively easily where the worm used has a single-start thread tooth, as shown in FIG. 17. The tooth of the worm does not have a dwelling portion, and the rotation of the roller gear will not be stopped unless the rotation of the worm is stopped. In the roller turret type rotary motion transmitting device, the ratio of the output speed to the input speed is constant, and the angular position of the worm linearly changes with the angular position of the roller turret. Accordingly, the relationship between the angular positions of the worm and the roller turret is detected by rotation angle detectors provided for the worm and the roller turret. Namely, the angular position relationship of the worm and the roller turret when one of the rollers of the roller turret comes into engagement with the tooth of the worm is compared with the angular position relationship when the next adjacent roller comes into engagement with the tooth. Thus, the angular interval between these two adjacent rollers can be detected. For instance, if only one change in the set of adjacent rollers engaging the tooth of the worm takes place during one full rotation of the worm, an error in the angular interval between the two adjacent rollers can be detected based on the nominal angular pitch and a difference between the angular position of the roller turret detected at a given angular position of the worm at which a given set of adjacent rollers is in meshing engagement with the tooth of the worm during a given rotation of the worm, and the angular position of the roller turret detected at the same angular position of the worm at which another set of adjacent rollers is meshing engagement with the tooth during the next rotation of the worm. To avoid a detecting error of the angular positions, the angular position of the roller turret is desirably detected two or more times for the same set of the adjacent rollers engaging the worm. In this case, the angular positions of the roller turret are desirably detected at different angular positions of the worm (at which the set of the adjacent rollers engaging the worm remains the same). Where the drive device for rotating the worm is a servomotor or other drive device which is capable of accurately controlling its angle of rotation, the predetermined angular position or positions of the worm at which the angular positions of the roller turret are detected can be established by so controlling the drive device so as to stop the worm at the appropriate angular position or positions. However, the error in the angular interval between the adjacent rollers can be detected without accurately controlling the angular position at which the worm is stopped. That is, the worm is stopped at a position almost close to the predetermined angular position, and the actual angular position of the roller turret corresponding to this actual angular position of the worm is detected. This actual angular position of the roller turret is compared with the calculated nominal angular position of the roller turret which corresponds to the predetermined angular position of the worm, so that the angular interval error can be obtained based on a difference between the actual and calculated values of the angular position of the roller turret. Further, the angular interval error can be obtained without stopping the rotations of the worm and the roller turret. In this case, the computer reads in the detected angular positions of the roller turret when the predetermined angular position of the worm is established during the successive rotations of the worm.

The use of the jig equipped with a master roller turret cam of single dwell type is not essential to adjust the angular pitch of the roller turret of a roller turret cam index device wherein the roller turret cam is a twin dwell type and each cam follower of the roller turret has two rollers. The angular pitch adjustment may be implemented while the roller turret is in meshing engagement with the roller turret cam of twin dwell type which constitutes a part of the roller turret cam index device. For instance, the roller turret is initially brought into meshing engagement with the twin dwell type roller turret cam with a relatively large distance between the axes of the roller turret and the cam. In this state, the roller turret cam is rotated to rotate the roller turret, to find angular ranges of the roller turret in which the resistance to rotation of the roller turret cam is relatively large. Then, the angular intervals between the adjacent cam followers in the above-indicated angular ranges of the roller turret are adjusted to the nominal value. After this adjustment, the distance between the axes of the roller turret and the cam is reduced by a given amount, and the above steps are repeated until the amounts of clearance between the rollers and the cam are held to within a predetermined range of tolerance, for instance, to within a range of 0–5$\mu$ at all angular positions of the roller turret.

The principle of the present invention is applicable not only to a roller turret cam index device and a roller turret type rotary motion transmitting device, but also to other devices, roller turrets including such other devices, and methods of manufacturing those other devices. In the roller turret cam index device, the roller turret includes a dwelling portion or portions, and is stopped at predetermined angular positions. The roller turret type rotary motion transmitting device is adapted to transmit a rotary motion from an input side to an output side such that the input speed is increased or reduced to the output speed at a predetermined constant ratio, or is held equal to the output speed. The other devices indicated above include a cam or worm whose rib or tooth does not have a dwelling portion and whose lead angle is not constant so that the ratio of the output speed to the input speed is not constant.

It will be understood that the present invention may be otherwise embodied, by changing, modifying or improving the various modes, forms, arrangements or embodiments of the invention which have been described above, or by changing the combinations of the arrangements or features described above, or by adding further arrangements or features.

What is claimed is:

1. A roller turret, comprising:
    a turret body having a plurality of mounting holes formed therein such that said mounting holes are arranged in a rotating direction of said turret body;
    a plurality of roller shafts each including a roller support portion and a stud portion eccentric with respect to said roller support portion and fitted in a corresponding one of said plurality of mounting holes;
    a plurality of rollers rotatably mounted on the roller support portions of said plurality of roller shafts, respectively; and
    fixing means provided for each of said mounting holes, for fixing said stud portion of a corresponding one of said roller shafts to said turret body, at a desired angular position of said corresponding one of said roller shafts, wherein said fixing means includes a plurality of setscrews provided for said plurality of roller shafts, respectively, each of said setscrews being disposed in said turret body such that said each setscrew is movable toward a centerline of a corresponding one of said mounting holes, in a direction intersecting said centerline, for forcing said stud portion of said corresponding roller shaft onto an inner circumferential surface of said corresponding one of said mounting holes.

2. A roller turret according to claim 1, wherein said roller shaft has an abutting surface which faces in an axial direction of said roller shaft from said roller support portion toward a distal end of said stud portion, and said stud portion has a tapered surface which is inclined such that a distance between said tapered surface and said distal end of said stud portion in an axial direction of said stud portion decreases in a radially outward direction of said stud portion, said each setscrew being held in engagement with said tapered surface for holding said abutting surface in abutting contact with a surface of said turret body which faces in an axial direction of the roller shaft from said distal end of said stud portion toward said roller support portion.

3. A roller turret according to claim 2, wherein said stud portion includes an axially intermediate part which has an annular groove formed in an outer circumferential surface thereof, said tapered surface consisting of one of opposite surfaces defining said annular groove.

4. A roller turret according to claim 2, wherein said roller support portion has a larger diameter than said stud portion, and said abutting surface consists of a shoulder surface between said roller support portion and said stud portion.

5. A roller turret according to claim 2, wherein said each setscrew has a tapered end face engageable with said tapered surface of said stud portion.

6. A roller turret according to claim 2, further comprising a thrust piece interposed between said abutting surface of said roller shaft and said surface of said turret body, so that said abutting surface is held in abutting contact with said surface of said turret body through said thrust piece.

7. A roller turret according to claim 1, wherein said fixing means includes a filler material for filling a gap between an outer circumferential surface of said stud portion and an inner circumferential surface of said corresponding one of said mounting holes, so that said roller turret is fixed by said filler material to said turret body at said stud portion.

8. A roller turret according to claim 7, wherein said filler material is an adhesive agent for bonding said stud portion to said turret body.

9. A roller turret according to claim 7, wherein said roller shaft has an abutting surface which faces in an axial direction of said roller shaft from said roller support portion toward a distal end of said stud portion, and said stud portion has a tapered surface which is inclined such that a distance between said tapered surface and said distal end of said stud portion in an axial direction of said stud portion decreases in a radially outward direction of said stud portion, said each setscrew being held in engagement with said tapered surface for holding said abutting surface in abutting contact with a surface of said turret body which faces in an axial direction of the roller shaft from said distal end of said stud portion toward said roller support portion.

10. A roller turret according to claim 9, wherein said stud portion includes an axially intermediate part which has an annular groove formed in an outer circumferential surface thereof, said tapered surface consisting of one of opposite surfaces defining said annular groove.

11. A roller turret according to claim 9, wherein said roller support portion has a larger diameter than said stud portion, and said abutting surface consists of a shoulder surface between said roller support portion and said stud portion.

12. A roller turret according to claim 9, wherein said each setscrew has a tapered end face engageable with said tapered surface of said stud portion.

13. A roller turret according to claim 9, further comprising a thrust piece interposed between said abutting surface of said roller shaft and said surface of said turret body, so that said abutting surface is held in abutting contact with said surface of said turret body through said thrust piece.

14. A roller turret according to claim 7, wherein said turret body has a filler passage formed for each of said plurality of mounting holes, said filler passage being open at one of opposite ends thereof in an outer surface of said turret body and at the other end to said corresponding mounting hole.

15. A roller turret according to claim 14, wherein said stud portion of said each roller shaft has an annular groove formed in said outer circumferential surface, and said filler passage is open at said other end thereof to a portion of said corresponding mounting hole which is substantially aligned with said annular groove in said stud portion in an axial direction of said stud portion.

16. A roller turret according to claim 15, wherein said roller shaft has an abutting surface which faces in an axial direction of said roller shaft from said roller support portion toward a distal end of said stud portion, and said fixing means includes a plurality of setscrews provided for said plurality of roller shafts, respectively, each of said setscrews being disposed in said turret body such that said each setscrew is movable toward a centerline of a corresponding one of said mounting holes, in a direction intersecting said centerline, said annular groove being defined by opposite surfaces one of which is a tapered surface which is inclined such that a distance between said tapered surface and said distal end of said stud portion in an axial direction of said stud portion decreases in a radially outward direction of said stud portion, said each setscrew being held in engagement with said tapered surface for holding said abutting surface of said roller shaft in abutting contact with a surface of said turret body which faces in an axial direction of the roller shaft from said distal end of said stud portion toward said roller support portion.

17. A roller turret according to claim 14, wherein said turret body has at least one air breather passage which is open at one of opposite ends thereof to an atmosphere and at the other end to said corresponding mounting hole.

18. A roller turret according to claim 17, wherein said at least one air breather passage includes an air breather hole which is open at said other end to a portion of said corresponding mounting hole which is near a bottom of said corresponding mounting hole.

19. A roller turret according to claim 17, wherein said at least one air breather passage includes at least one air breather groove formed in at least one of (a) an abutting surface formed on said roller shaft so as to face in an axial direction of said roller shaft from said roller support portion toward a distal end of said stud portion, and (b) a surface of said turret body which is in abutting contact with said abutting surface.

20. A roller turret according to claim 7, wherein at least one of (a) an intermediate part of said outer circumferential surface of said stud portion and (b) an intermediate part of said inner circumferential surface of said mounting hole which corresponds to said intermediate part of said outer circumferential surface has an annular groove, and said turret body has a communication hole which communicates at one of opposite ends thereof with said annular groove and is open at the other end in an outer surface of said turret body, said annular groove and said communication hole cooperating to define a filler passage for filling said gap with said filler material, and wherein at least one of said turret body and said roller shaft has an annular recessed portion communicating with an open end of said mounting hole, and further has a first air passage which communicates at one of opposite ends thereof with said annular recessed portion and is open at the other end thereof to an atmosphere, and said turret body has a second air passage which is open at one of opposite ends thereof to a bottom portion of said mounting hole and at the other end thereof to the atmosphere, said first and second air passages providing an air breather passage for permitting air to be discharged from said mounting hole.

21. A roller turret according to claim 7, wherein said turret body has a filler passage for filling said gap with said filler material, said filler passage being open at one of opposite ends thereof to an atmosphere and at the other end thereof to a bottom portion of said mounting hole, and at least one of said roller shaft and said turret body has at least one air breather passage which is open at one of opposite ends thereof to an open end of said mounting hole and at the other end thereof to the atmosphere.

22. A roller turret according to claim 21, wherein said at least one air breather passage includes an annular recessed portion communicating with said open end of said mounting hole, and a communication passage which communicates at one of opposite ends therefor to said annular recessed portion and is open at the end therefor to the atmosphere.

23. A roller turret, comprising:
a turret body having a plurality of mounting holes formed therein such that said mounting holes are arranged in a rotating direction of said turret body;
a plurality of roller shafts each including a roller support portion and a stud portion eccentric with respect to said roller support portion and fitted in a corresponding one of said plurality of mounting holes;
a plurality of rollers rotatably mounted on the roller support portions of said plurality of roller shafts, respectively; and fixing means provided for each of said mounting holes, for fixing said stud portion of a corresponding one of said roller shafts to said turret body, at a desired angular position of said corresponding one of said roller shafts wherein said fixing means includes a filler material for filling a gap between an outer circumferential surface of said stud portion and an inner circumferential surface of a corresponding one of said mounting holes, so that said roller turret is fixed by said filler material to said turret body at said stud portion.

24. A roller turret according to claim 23, wherein said filler material is an adhesive agent for bonding said stud portion to said turret body.

25. A roller turret according to claim 23, wherein said turret body has a filler passage formed for each of said plurality of mounting holes, said filler passage being open at one of opposite ends thereof in an outer surface of said turret body and at the other end to said corresponding mounting hole.

26. A roller turret according to claim 25, wherein said stud portion of said each roller shaft has an annular groove formed in said outer circumferential surface, and said filler passage is open at said other end thereof to a portion of said corresponding mounting hole which is substantially aligned with said annular groove in said stud portion in an axial direction of said stud portion.

27. A roller turret according to claim 26, wherein said roller shaft has an abutting surface which faces in an axial direction of said roller shaft from said roller support portion toward a distal end of said stud portion, and said fixing means includes a plurality of setscrews provided for said plurality of roller shafts, respectively, each of said setscrews being disposed in said turret body such that said each setscrew is movable toward a centerline of a corresponding one of said mounting holes, in a direction intersecting said centerline, said annular groove being defined by opposite surfaces one of which is a tapered surface which is inclined such that a distance between said tapered surface and said distal end of said stud portion in an axial direction of said stud portion decreases in a radially outward direction of said stud portion, said each setscrew being held in engagement with said tapered surface for holding said abutting surface of said roller shaft in abutting contact with a surface of said turret body which faces in an axial direction of the roller shaft from said distal end of said stud portion toward said roller support portion.

28. A roller turret according to claim 25, wherein said turret body has at least one air breather passage which is open at one of opposite ends thereof to an atmosphere and at the other end to said corresponding mounting hole.

29. A roller turret according to claim 28, wherein said at least one air breather passage includes an air breather hole which is open at said other end to a portion of said corresponding mounting hole which is near a bottom of said corresponding mounting hole.

30. A roller turret according to claim 28, wherein said at least one air breather passage includes at least one air breather groove formed in at least one of (a) an abutting surface formed on said roller shaft so as to face in an axial direction of said roller shaft from said roller support portion toward a distal end of said stud portion, and (b) a surface of said turret body which is in abutting contact with said abutting surface.

31. A roller turret according to claim 23, wherein at least one of (a) an intermediate part of said outer circumferential surface of said stud portion and (b) an intermediate part of said inner circumferential surface of said mounting hole which corresponds to said intermediate part of said outer circumferential surface has an annular groove, and said turret body has a communication hole which communicates at one of opposite ends thereof with said annular groove and is open at the other end in an outer surface of said turret body, said annular groove and said communication hole cooperating to define a filler passage for filling said gap with said filler material, and wherein at least one of said turret body and said roller shaft has an annular recessed portion communicating with an open end of said mounting hole, and further has a first air passage which communicates at one of opposite ends thereof with said annular recessed portion and is open at the other end thereof to an atmosphere, and said turret body has a second air passage which is open at one of opposite ends thereof to a bottom portion of said mounting hole and at the other end thereof to the atmosphere, said first and second air passages providing an air breather passage for permitting air to be discharged from said mounting hole.

32. A roller turret according to claim 23, wherein said turret body has a filler passage for filling said gap with said filler material, said filler passage being open at one of opposite ends thereof to an atmosphere and at the other end thereof to a bottom portion of said mounting hole, and at least one of said roller shaft and said turret body has at least one air breather passage which is open at one of opposite ends thereof to an open end of said mounting hole and at the other end thereof to the atmosphere.

33. A roller turret according to claim 32, wherein said at least one air breather passage includes an annular recessed portion communicating with said open end of said mounting hole, and a communication passage which communicates at one of opposite ends thereof to said annular recessed portion and is open at the other end thereof to the atmosphere.

34. A roller turret, comprising:
a turret body having a plurality of mounting holes formed therein such that said mounting holes are arranged in a rotating direction of said turret body;
a plurality of roller shafts each including a roller support portion and a stud portion eccentric with respect to said roller support portion and fitted in a corresponding one of said plurality of mounting holes;
a plurality of rollers rotatably mounted on the roller support portions of said plurality of roller shafts, respectively; and
fixing means provided for each of said mounting holes, for fixing said stud portion of a corresponding one of said roller shafts to said turret body, at a desired angular position of said corresponding one of said roller shafts, wherein each of said plurality of roller shafts carries two mutually concentric rollers mounted on said roller support portion such that said two mutually concentric rollers are rotatable independently of each other.

* * * * *